United States Patent
Khwaja et al.

(10) Patent No.: US 11,049,218 B2
(45) Date of Patent: Jun. 29, 2021

(54) SEAMLESS IMAGE STITCHING

(71) Applicant: Samsung Electronics Company, Ltd., Gyeonggi-do (KR)

(72) Inventors: Ayesha Khwaja, Santa Clara, CA (US); Haiyue Yu, Menlo Park, CA (US); Rahul Budhiraja, Mountain View, CA (US); Sajid Sadi, San Jose, CA (US); Iliya Tsekov, Sunnyvale, CA (US)

(73) Assignee: SAMSUNG ELECTRONICS COMPANY, LTD., Gyeonggi-Do (KR)

( * ) Notice: Subject to any disclaimer, the term of this patent is extended or adjusted under 35 U.S.C. 154(b) by 0 days.

(21) Appl. No.: 15/994,994

(22) Filed: May 31, 2018

(65) Prior Publication Data

US 2020/0020075 A1    Jan. 16, 2020

Related U.S. Application Data

(60) Provisional application No. 62/544,463, filed on Aug. 11, 2017.

(51) Int. Cl.
*G06T 3/40* (2006.01)
*G06T 5/00* (2006.01)

(52) U.S. Cl.
CPC ............ *G06T 3/4038* (2013.01); *G06T 5/002* (2013.01); *G06T 2207/20221* (2013.01)

(58) Field of Classification Search
CPC .............. G06T 3/4038; G06T 5/002; G06T 2207/20221
USPC ........................................................ 345/634
See application file for complete search history.

(56) References Cited

U.S. PATENT DOCUMENTS

| 4,751,570 A | 6/1988 | Robinson |
| 8,280,191 B1 * | 10/2012 | Avidan ................. G06T 3/0012 382/298 |
| 8,908,055 B2 | 12/2014 | Furumura |
| 2002/0028003 A1 | 3/2002 | Krebs |

(Continued)

FOREIGN PATENT DOCUMENTS

| CN | 1666525 A | 9/2005 |
| CN | 1965578 A | 5/2007 |

(Continued)

OTHER PUBLICATIONS

International Search Report and Written Opinion for International Application No. PCT/KR2018/009096, dated Nov. 19, 2018.

(Continued)

*Primary Examiner* — Jin Ge
(74) *Attorney, Agent, or Firm* — Baker Botts L.L.P.

(57) ABSTRACT

In one embodiment, a method includes accessing a first image and a second image, where at least part of the first image overlaps with at least part of the second image. The first and second images are divided into portions associated with a first set of grid points, where each grid point in the first set corresponds to a portion of the first image or the second image. Differences in the region of overlap between the first and second images are determined. One or more grid points in the first set and the corresponding portions of the first image or the second image are moved relative to one or more other grid points in the first set based on the determined differences.

25 Claims, 37 Drawing Sheets

(56) References Cited

U.S. PATENT DOCUMENTS

| | | |
|---|---|---|
| 2002/0061131 A1 | 5/2002 | Sawhney |
| 2002/0064313 A1 | 5/2002 | Cheng |
| 2002/0075258 A1 | 6/2002 | Park |
| 2002/0163649 A1 | 11/2002 | Hirose |
| 2003/0179308 A1 | 9/2003 | Zamorano |
| 2003/0185340 A1 | 10/2003 | Frantz |
| 2004/0027451 A1 | 2/2004 | Baker |
| 2004/0027452 A1 | 2/2004 | Yun |
| 2004/0169663 A1 | 9/2004 | Bernier |
| 2004/0169870 A1 | 9/2004 | Ahmed |
| 2004/0189674 A1 | 9/2004 | Zhang |
| 2004/0246333 A1 | 12/2004 | Steuart, III |
| 2005/0063610 A1* | 3/2005 | Wu .................. G06T 7/32 382/294 |
| 2005/0078880 A1 | 4/2005 | Schroeder |
| 2005/0160368 A1 | 7/2005 | Liu |
| 2005/0226172 A1 | 10/2005 | Richardson |
| 2006/0018547 A1* | 1/2006 | Ouchi ............ G06T 3/4038 382/190 |
| 2006/0072020 A1 | 4/2006 | McCutchen |
| 2006/0125921 A1 | 6/2006 | Foote |
| 2006/0136229 A1 | 6/2006 | Kjoerling |
| 2006/0244826 A1 | 11/2006 | Chew |
| 2007/0014347 A1 | 1/2007 | Prechtl |
| 2007/0031062 A1 | 2/2007 | Pal |
| 2007/0071247 A1 | 3/2007 | Pang |
| 2007/0103558 A1 | 5/2007 | Cai |
| 2007/1595524 | 7/2007 | Kim |
| 2007/0291857 A1 | 12/2007 | Hussain |
| 2008/0033814 A1 | 2/2008 | Carignano |
| 2008/0268731 A1 | 10/2008 | Lahyani |
| 2009/0022419 A1 | 1/2009 | Molnar |
| 2009/0022422 A1 | 1/2009 | Sorek |
| 2009/0034086 A1 | 2/2009 | Montgomery |
| 2009/0051778 A1 | 2/2009 | Pan |
| 2009/0058988 A1 | 3/2009 | Strzempko |
| 2009/0163185 A1 | 6/2009 | Lim |
| 2010/0014780 A1* | 1/2010 | Kalayeh ............ G06T 1/00 382/284 |
| 2010/0194851 A1* | 8/2010 | Pasupaleti ......... G06T 3/4038 348/36 |
| 2010/0231738 A1 | 9/2010 | Border |
| 2010/0239172 A1 | 9/2010 | Akiyama |
| 2010/0245237 A1* | 9/2010 | Nakamura .......... A63F 13/02 345/156 |
| 2010/0293584 A1 | 11/2010 | Civanlar |
| 2010/0315539 A1 | 12/2010 | Azuma |
| 2011/0013018 A1 | 1/2011 | Leblond |
| 2011/0052093 A1 | 3/2011 | Porter |
| 2011/0128440 A1 | 6/2011 | Koike |
| 2011/0164111 A1 | 7/2011 | Karaoguz |
| 2011/0249100 A1 | 10/2011 | Jayaram |
| 2012/0051665 A1 | 3/2012 | Adams |
| 2012/0054664 A1 | 3/2012 | Dougall |
| 2012/0105574 A1 | 5/2012 | Baker |
| 2012/0169842 A1 | 7/2012 | Chuang |
| 2012/0169885 A1 | 7/2012 | Wang |
| 2012/0177302 A1* | 7/2012 | Habuka ............ H04N 1/3876 382/274 |
| 2012/0218376 A1 | 8/2012 | Athan |
| 2012/0229604 A1 | 9/2012 | Boyce |
| 2012/0274739 A1 | 11/2012 | Li |
| 2012/0293492 A1 | 11/2012 | Kuroume |
| 2012/0320152 A1 | 12/2012 | Seok |
| 2012/0320154 A1 | 12/2012 | Berger |
| 2013/0028472 A1* | 1/2013 | Pham .................. G06T 7/32 382/103 |
| 2013/0063468 A1 | 3/2013 | Hikida |
| 2013/0071012 A1 | 3/2013 | Leichsenring |
| 2013/0076856 A1 | 3/2013 | Wakabayashi |
| 2013/0083173 A1 | 4/2013 | Geisner |
| 2013/0148851 A1 | 6/2013 | Leung |
| 2013/0195182 A1 | 8/2013 | Kung |
| 2013/0222548 A1 | 8/2013 | Yang |
| 2013/0229546 A1* | 9/2013 | Furumura .......... G06T 3/4038 348/229.1 |
| 2013/0250040 A1 | 9/2013 | Vitsnudel |
| 2013/0278718 A1 | 10/2013 | Tsukagoshi |
| 2013/0293723 A1 | 11/2013 | Benson |
| 2013/0321393 A1 | 12/2013 | Winder |
| 2013/0321593 A1 | 12/2013 | Kirk |
| 2013/0328928 A1 | 12/2013 | Yamagishi |
| 2014/0085293 A1 | 3/2014 | Konoplev |
| 2014/0089398 A1 | 3/2014 | Zhang |
| 2014/0132705 A1 | 5/2014 | Kira |
| 2014/0205203 A1 | 7/2014 | Lackey |
| 2014/0267614 A1 | 9/2014 | Ding |
| 2014/0336848 A1 | 11/2014 | Saund |
| 2015/0002641 A1 | 1/2015 | Kim |
| 2015/0003532 A1 | 1/2015 | Fang |
| 2015/0080652 A1 | 3/2015 | Staples, II |
| 2015/0116453 A1 | 4/2015 | Hirata |
| 2015/0169990 A1 | 6/2015 | McLaughlin |
| 2015/0215626 A1 | 7/2015 | Kim |
| 2015/0233717 A1 | 8/2015 | Satti |
| 2015/0272547 A1 | 10/2015 | Freiburger |
| 2015/0373266 A1 | 12/2015 | Hsieh |
| 2016/0019018 A1 | 1/2016 | Xiong |
| 2016/0028950 A1 | 1/2016 | Perazzi |
| 2016/0037082 A1* | 2/2016 | Wang ................ A61B 1/00009 348/65 |
| 2016/0088287 A1 | 3/2016 | Sadi |
| 2016/0286137 A1 | 9/2016 | Marks |
| 2017/0116703 A1 | 4/2017 | Sundareson |
| 2017/0287184 A1* | 10/2017 | Pettersson ............ G06T 11/60 |
| 2019/0066305 A1* | 2/2019 | Liao .................... G06T 7/13 |

FOREIGN PATENT DOCUMENTS

| | | |
|---|---|---|
| CN | 101155267 A | 4/2008 |
| CN | 101300840 A | 11/2008 |
| CN | 102420898 A | 4/2012 |
| CN | 102625121 A | 8/2012 |
| CN | 102667911 A | 9/2012 |
| CN | 102692806 A | 9/2012 |
| CN | 102714739 A | 10/2012 |
| CN | 102714748 A | 10/2012 |
| CN | 102812497 A | 12/2012 |
| CN | 103026700 A | 4/2013 |
| CN | 103109537 A | 5/2013 |
| CN | 103260046 A | 8/2013 |
| CN | 103533326 A | 1/2014 |
| CN | 103534726 A | 1/2014 |
| CN | 103930817 A | 7/2014 |
| EP | 1519582 A1 | 3/2005 |
| JP | 5564300 | 5/1980 |
| JP | H07182535 | 7/1995 |
| JP | 2006515128 A | 5/2006 |
| JP | 2011082920 A | 4/2011 |
| JP | 2013-061848 | 4/2013 |
| KR | 0724134 | 7/2007 |
| KR | 10-0790890 B1 | 1/2008 |
| KR | 0934211 | 12/2009 |
| KR | 101055411 B1 | 8/2011 |
| KR | 10-2014-0089146 A | 7/2014 |
| KR | 2015-0001425 | 1/2015 |
| KR | 1606539 | 3/2016 |
| WO | WO 1996/031047 | 10/1996 |
| WO | WO 2004/068865 | 8/2004 |
| WO | WO 2009/085961 | 7/2009 |
| WO | WO 2009/094643 | 7/2009 |
| WO | WO 2013/173728 | 11/2013 |
| WO | WO 2016048014 | 3/2016 |

OTHER PUBLICATIONS

Partial European Search Report from the European Patent Office for EP Application No. 15186275.2, dated Feb. 26, 2016.
Partial European Search Report from the European Patent Office for EP Application No. 15186275.2 1972, dated May 25, 2016.
International Search Report and Written Opinion for International Application No. PCT/KR2015/009962, dated Jan. 15, 2016.

(56) References Cited

OTHER PUBLICATIONS

International Search Report and Written Opinion for International Application No. PCT/KR2015/009965, dated Jan. 14, 2016.
International Search Report and Written Opinion for International Application No. PCT/KR2015/009966, dated Jan. 6, 2016.
International Search Report and Written Opinion for International Application No. PCT/KR2015/009969, dated Jan. 6, 2016.
CN Office Action for Application No. 201580001945.8 (with English translation), dated Dec. 13, 2016.
Non-Final Office Action for U.S. Appl. No. 14/856,507, dated May 4, 2017.
Response to Non-Final Office Action for U.S. Appl. No. 14/856,507, dated Aug. 4, 2017.
CN Office Action for Application No. 201580001945.8 (with English translation), dated Aug. 10, 2017.
Extended EP Search Report for Application No. 15843162.7-1972, dated Aug. 25, 2017.
Extended EP Search Report for Application No. 15845458.7-1972, dated Aug. 29, 2017.
EP Search Report for Application No. 15844260.8-1972, dated Sep. 7, 2017.
Extended EP Search Report for Application No. 15845272.2-1972, dated Aug. 29, 2017.
Final Office Action for U.S. Appl. No. 14/856,507, dated Nov. 9, 2017.
CN Office Action for Application No. 201580051015.3, dated Feb. 5, 2018.
CN Office Action for Application No. 201580051097.1, dated Jan. 11, 2018.
KR Office Action for Application No. 10-2017-7009746 (with English translation), dated Jan. 8, 2018.
KR Office Action for Application No. 10-2017-7009747 (with English translation), dated Jan. 8, 2018.
KR Office Action for Application No. 10-2017-7009748 (with English translation), dated Jan. 8, 2018.
KR Office Action for Application No. 10-2017-7009749 (with English translation), dated Nov. 22, 2017.
Extended EP Search Report for Application No. 15844260.8-1972, dated Jan. 4, 2018.
Response to Final Office Action for U.S. Appl. No. 14/856,507, dated Feb. 9, 2018.
Final Office Action for KR Application No. 10-2017-7009749 (no English translation), dated Apr. 19, 2018.
Notice of Allowance for KR Application No. 10-2017-7009749 (no English translation), dated Jun. 8, 2018.
Notice of Allowance for KR Application No. 10-2017-7009746 (no English translation), dated Jun. 14, 2018.
Notice of Allowance for KR Application No. 10-2017-7009748 (no English translation), dated Jun. 14, 2018.
Notice of Allowance for KR Application No. 10-2017-7009747 (no English translation), dated Jun. 15, 2018.
CN Office Action for Application No. 201580051378.7, dated Jun. 1, 2018.
CN Office Action for Application No. 201580051097.1 (no English translation), dated Jun. 12, 2018.
Non-Final Office Action for U.S. Appl. No. 14/856,507, dated Sep. 11, 2018.
CN Office Action for Application No. 201580051378.7 (with English translation), dated Jun. 1, 2018.
Response to Non-Final Office Action for U.S. Appl. No. 14/856,507, dated Dec. 10, 2018.
CN Rejection Decision for Application No. 201580001945.8, dated Sep. 30, 2018.
CN Office Action for Application No. 201580051015.3, dated Oct. 15, 2018.
Notice of Allowance for U.S. Appl. No. 14/856,507, dated Jan. 17, 2019.
Extended European Search Report for EP Application No. 18844632.2, dated May 4, 2020.
Zhang Fan et al,: "Parallax-Tolerant Image Stitching," Conference on Computer Vision and Pattern Recognition, IEEE, Jun. 23, 2014 (Jun. 23, 2014), pp. 3262-3269 (8 pages), XP032649126.
Chen Yu-Sheng et al., "Natural Image Stitching with the Global Similarity Prior", Sep. 16, 2016 (Sep. 16, 2016), International Conference on Financial Cryptography and Data Security, Springer, Berlin, Heidelberg, pp. 186-201 (16 pages), XP047355068.
Pan Xin et al., "Parallax-tolerant image stitching based on mesh optimization", 2nd Advanced Information Technology, Electronic and Automation Control Conference (IAEAC), IEEE, Mar. 25, 2017 (Mar. 25, 2017), pp. 414-420 (7 pages), XP033158605.

* cited by examiner

FIG. 31B

Smoothness term $J_{smooth}$

For each $V_{prewarp,X}$ and a positively oriented triangle
$\Delta V_{prewarp,X} V_{prewarp,Y}, V_{prewarp,Z}$ in a single cell of the mesh find:

$V_{prewarp,X} - V_{prewarp,Y} =$
$= \upsilon(V_{prewarp,Z} - V_{prewarp,Y}) + R99 (V_{prewarp,Z} - V_{prewarp,Y})$ Vectorizing it:
$B^T_{X,*-ZYZ} \beta^T_{X,\nabla XYZ} V_{prewarp} = 0$ $J_{smooth}^T{}_{X,\nabla XYZ} = \omega^{\square}_{X,\nabla XYZ} \| \beta^T_{X,\nabla XYZ} V_{warp} \|^2$
where $\omega^{\square}_{\Delta XYZ}$ is the saliency of the cell containing $\Delta XYZ$ $J_{smooth} = \sum^{\square}_{X, \Delta XYZ} \omega \Delta XYZ \| \beta^T X, \Delta XYZ (V_{warp}) \|^2$ $J_{smooth} = V^T_{warp} \left( \sum^{\square}_{X, \Delta XYZ} \beta X, \Delta XYZ \beta^T X, \Delta XYZ \right) V_{warp}$ $\nabla J_{smooth} = 2 \left( \sum^{\square}_{X, \Delta XYZ} \beta X, \Delta XYZ \beta^T X, \Delta XYZ \right) V_{warp}$

SEAMLESS IMAGE STITCHING

PRIORITY

This application claims the benefit, under 35 U.S.C. § 119(e), of U.S. Provisional Patent Application No. 62/544,463 filed 11 Aug. 2017, which is incorporated herein by reference.

TECHNICAL FIELD

This disclosure generally relates to combining electronic images.

BACKGROUND

An electronic image of a scene may be captured by many different kinds of electronic devices. For example, images may be captured by a mobile device, such as a mobile phone or tablet, that has a camera built in to the device. At times, two or more images of a scene may be captured. An electronically captured image may include a portion of a scene that overlaps with a portion of a scene captured in another electronic image. However, the overlapping portions may be taken from different perspectives (e.g., different angles or distances) and so the overlapping portions of two images may not be identical. Those differences make it difficult to merge two images into one image of the scene, as it may not be possible to simply blend the images by superimposing a portion of a scene in one image over that portion of the scene in another image. In addition, even if that were possible, other portions of the scene may be distorted by taking that approach.

BRIEF DESCRIPTION OF THE DRAWINGS

FIGS. 31A-B illustrate a set of detailed example calculations for determining an overall cost function J.

DESCRIPTION OF EXAMPLE EMBODIMENTS

Figure 21:
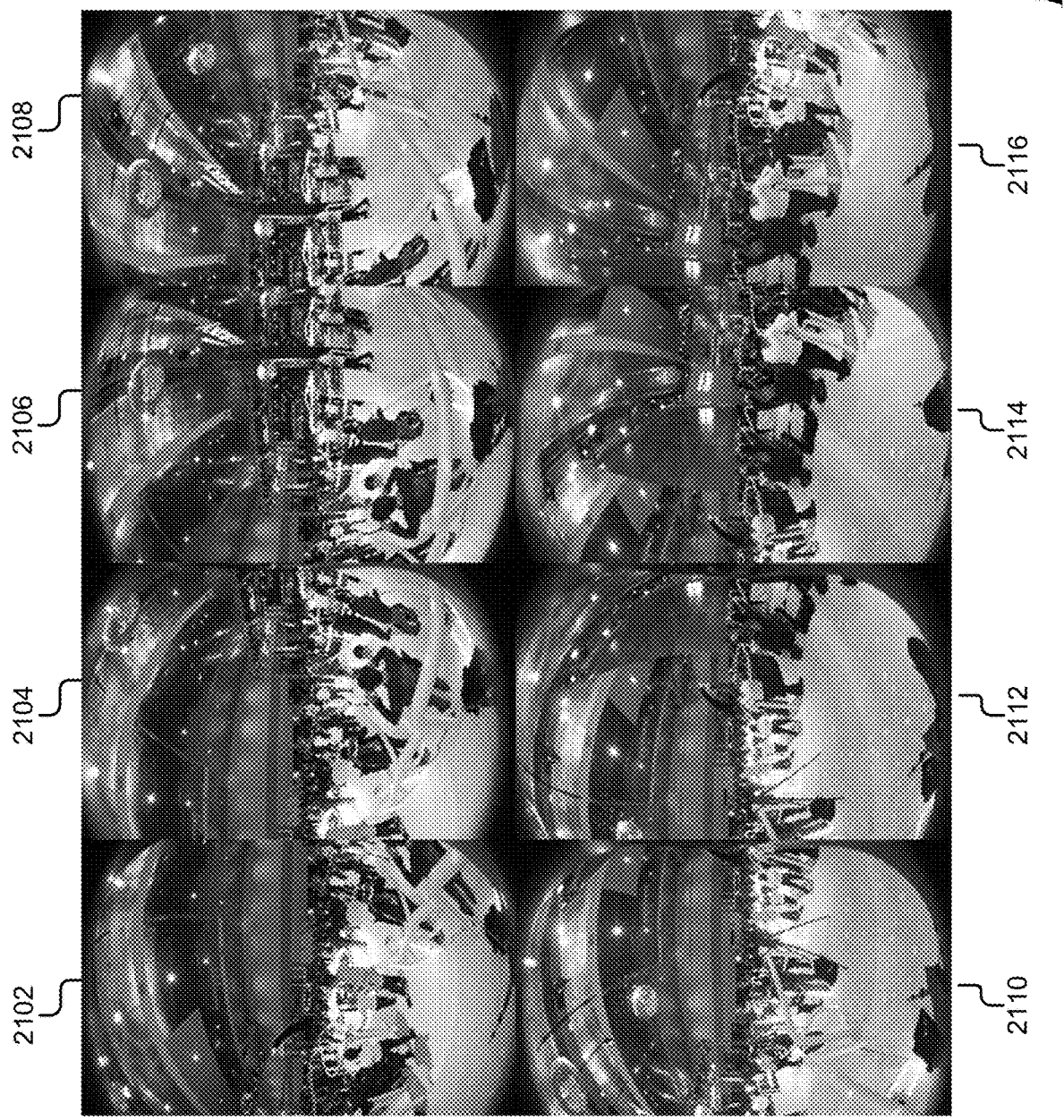
FIG. 21 illustrates example discrete images for stitching.

Particular embodiments discussed herein relate to systems, apparatuses, and methods for seamlessly stitching or combining two or more electronic images together to produce a stitched image (e.g., a panoramic image or a 360° image). In particular embodiments, a plurality of images may be received from a camera system (e.g., images 2102-2116 as shown in FIG. 21), from a single camera, or from a client or server device that stores the images. The images may have undergone some amount of initial stitching, for example according to the stitching techniques illustrated and described in relation to FIGS. 8-18. As another example, initial stitching may be performed by estimating camera parameters for all images in a scene by computing point-to-point correspondences between images and optimizing distances between them by varying various camera properties such as focal length, field of view, lens offset, etc.

Figure 1:
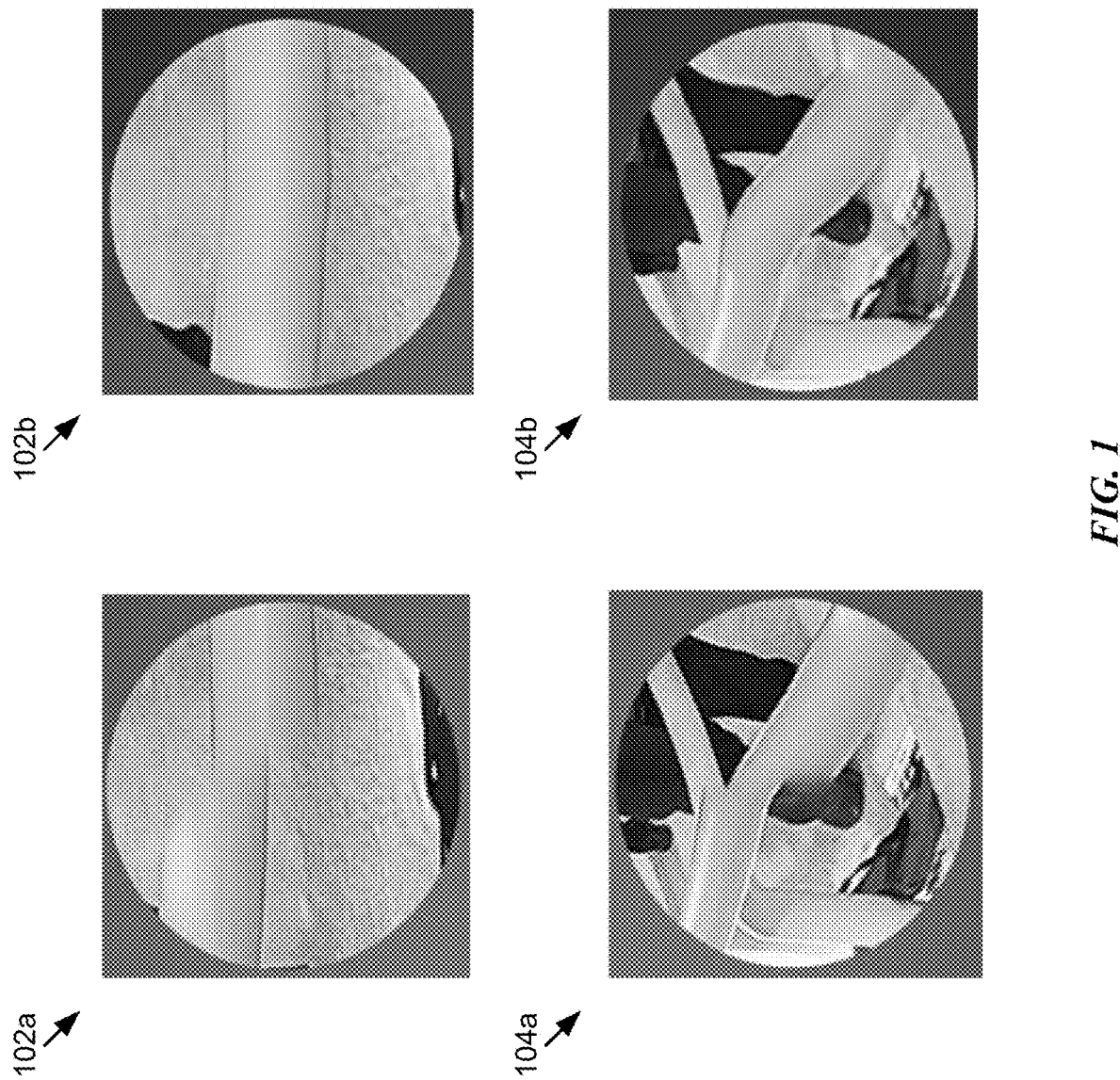
FIG. 1 illustrates example stitched images obtained using a prior/existing stitching technique and the result of an example improved stitching technique.
Figure 22:
FIG. 22 illustrates an example initial image with image artifacts.
Figure 28B:
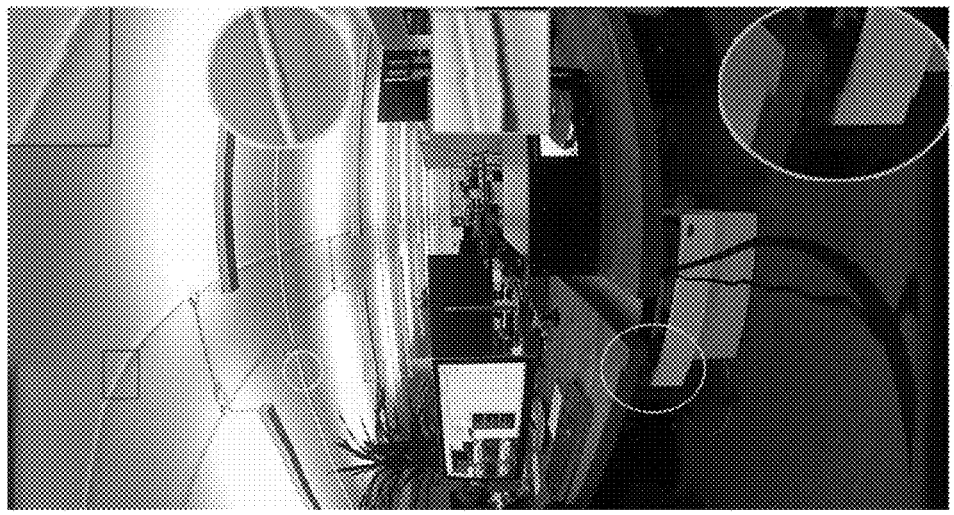
FIG. 28B illustrates the result of an example improved stitching technique.
Figure 28A:
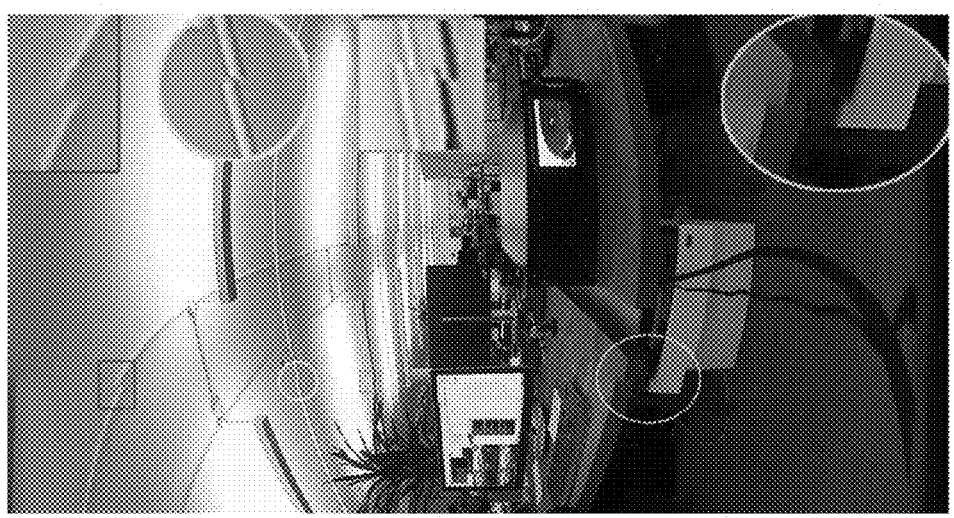
FIG. 28A illustrates example stitched images obtained using a prior/existing stitching technique.

Existing stitching techniques may not generate a smooth image and often produce image artifacts, as shown for example by reference numerals 212a and 214a in FIG. 1, and also image artifacts 2202-2210 as shown in FIG. 22. FIG. 28A also illustrates image artifacts caused by conventional stitching processes. Stitching artifacts may be introduced whenever any two types of images are stitched together, and the artifacts may be particularly acute in portions of a scene that are relatively close to the viewer and/or when stitching images that will be used to generate a 3D image. Stitching artifacts may be introduced by spatial movement of a camera taking a series of pictures or a spatial offset between multiple cameras taking different pictures. In addition, it is not always possible to compute a single 2D transformation that can satisfy all point correspondences between images such that the images perfectly align.

Figure 27:
FIG. 27 illustrates an example stitched image using the image stitching technique of the present disclosure.

One technical improvement of the stitching techniques discussed herein is to generate a seamless smooth image and remove/minimize these image artifacts, as shown for example by reference numerals 212b and 214b in FIG. 1. An example stitched image generated using an example technique discussed herein is shown in FIG. 27. In order to stitch two images, the images may be first warped onto a sphere and defished to produce rectilinear images. Edge detection may be performed on these images using sobel gradients to calculate image edges and contrast lines (see for example FIG. 23) such that images can be compared to each other. Grid optimization may be performed to minimize the difference between the normalized gradients of overlapping regions of the two images. In particular embodiments, grid optimization involves aligning the edge maps of the two images as much as possible. Specifically, grid optimization may include dividing each of the images into grid points (see for example, FIGS. 24A-24F) and recursively moving the grid points and corresponding portions of the images so as to minimize the difference in edge lines between features in the overlapping region of the two images or to minimize the difference between the normalized gradients of overlapping regions of the two images. In particular embodiments, a force model comprising a set of spring or smoothening constraints may be added that restricts the movement of grid points between two images or within the same image up to a certain threshold (e.g., a grid point may move only a certain pixels to the left/right/top/bottom from its original position). A pyramid level technique may be employed where the optimization (e.g., dividing image into grid regions and moving the grid points) may be done in multiple iterations or steps e.g., very coarse in the beginning (as shown for example in FIG. 24B) and gradually becomes finer (see for example, FIG. 24B to FIG. 24C or FIG. 24C to FIG. 24D) as pyramid level reduces. In the higher pyramid levels, the algorithm searches in a larger window, which reduces as the pyramid level reduces. New grid points may be added as the pyramid level decreases (see for example, FIGS. 24C-F). The new grid points' initial positions may be interpolated from the positions of the previous points, and the grid may then be optimized again. This process may be repeated until the difference between the normalized gradients of overlapping regions of the two images is within or less than a certain threshold. Once the difference is within the threshold (e.g., edges or edge lines of two images overlap with one another), seam estimation and blending may be performed to produce a combined or stitched image, as shown for example in FIG. 27. In some embodiments, prior to seam and blending, color correction may optionally be performed on the images. Color correction may include images' exposure, vignette removal, and white balance correction. The image stitching technique may be performed on a central processing unit (CPU) or a graphical processing unit (GPU) for faster implementation. The grid optimization method for image stitching discussed herein can also be applied for video stitching, for stitching a top image, and for 3D stitching.

In other embodiments, merging two or more images into a single image may be accomplished by adjusting the images based on a number of considerations. For example, misaligned portions of overlapping images may be corrected by adjusting (e.g., by warping or distorting) at least part of one or both of the images so as to minimize the misalignment. However, adjusting the images so that they are completely aligned may require so much adjustment that other portions of the images become misaligned and appear distorted to a viewer. Thus, considerations for merging two or more images together may include an analysis of the image distortion caused by aligning misaligned portions of an image. As explained below with reference to FIGS. 29-32, image distortion may include both local distortion, which refers to distortion of the image near the portions that are being aligned, and global distortion, which refers to distortion of portions of the image that are not near misaligned portions of the image. Thus, merging two or more images into a single image may balance the competing considerations of alignment and image distortion in order to reduce misalignment while also preserving image quality.

Figure 2:
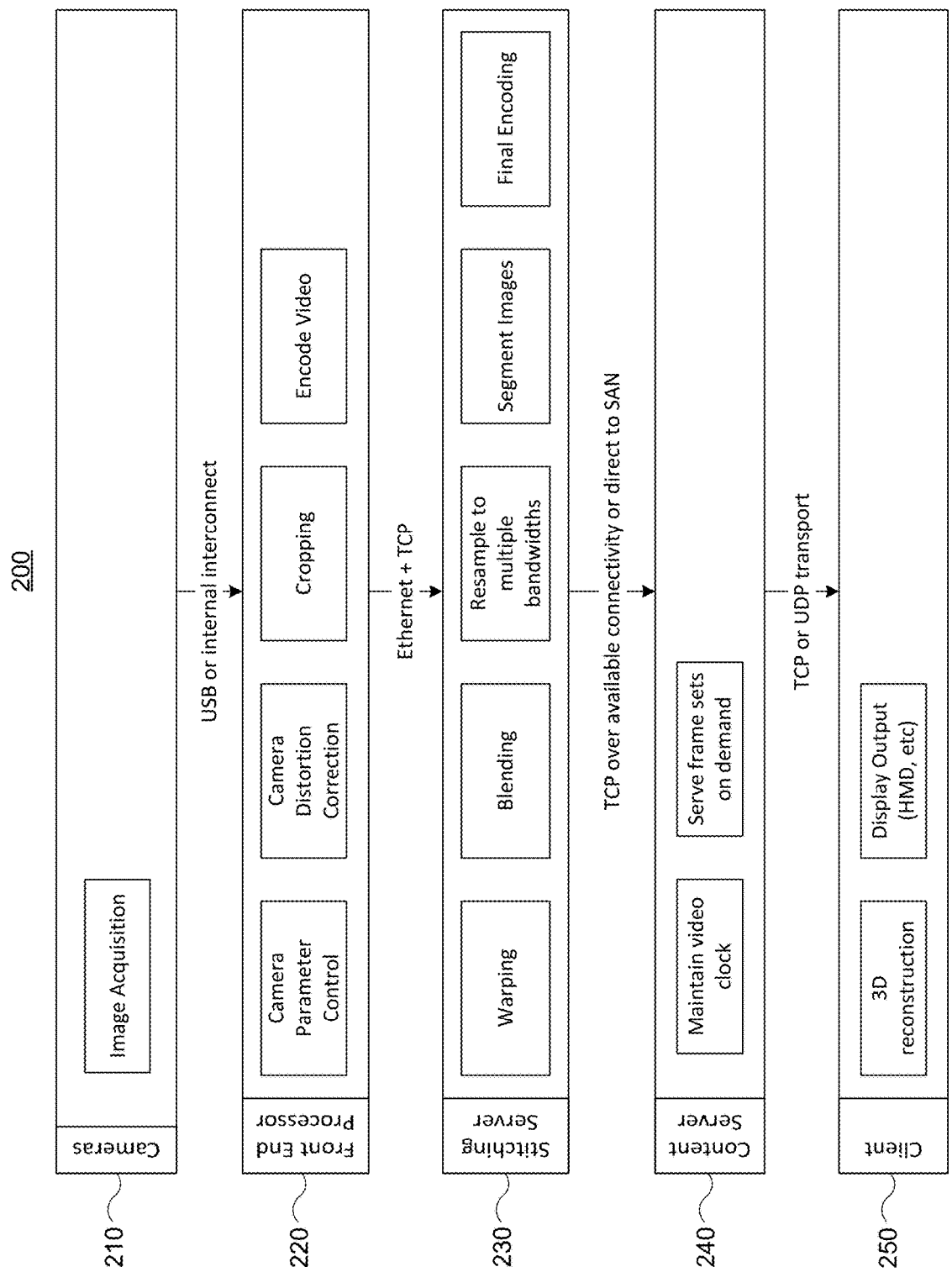
FIG. 2 illustrates an example 3-D imagery system architecture.

FIG. 2 illustrates an example 3-D imagery system architecture. In particular embodiments, a system architecture 200 for capturing, encoding, and rendering 360° 3-D video may include camera system 210, front-end processors 220, stitching server 230, content server 240, and client system 250. Although this disclosure describes and illustrates a particular 3-D imagery system composed of particular systems, this disclosure contemplates any suitable 3-D imagery system composed of any suitable systems. Moreover, while the description below describes particular components performing particular functionality, this disclosure contemplates that any suitable components may perform any suitable functionality. For example, this disclosure contemplates that the processing described below may be performed at a server device, at a client device, or both, as appropriate.

Camera system 210 may include a number of pairs of cameras 212 (see FIGS. 3-5) that are configured to digitally capture images. As an example and not by way of limitation, the captured images may correspond to 360° 3-D video that is captured and processed in real-time. Cameras 212 of camera system 210 may be connected (e.g., through universal serial bus (USB)) to a front-end processor 220. Front-end processor 220 may provide initial control of cameras 212 by synchronizing the starting and stopping of the images from the various cameras 212. Front-end processors 220 may also determine or set camera parameters, such as shutter speed or exposure time. Front-end processor 220 may normalize, correct distortion, compress or encode the incoming videos from camera system 210. In particular embodiments, the number of front-end processors 220 may be based on the number of cameras 212 of camera system 210 as well as the size of the incoming images (e.g., frame rate or frame size). The image data from front-end processors 220 may be transferred (e.g., through a transmission-control protocol (TCP) network) to a stitching server 230 that perform the stitching of the discrete images captured by camera system 210.

As described below, stitching server 230 may stitch together the discrete images from the various cameras to generate complete frames of 3-D video. In particular embodiments, stitching server 230 may compute image alignment of the discrete images and segment complete frames into vertical strips. Stitching server 230 may recompress strips at different sizes and bit rates for variable bit-rate control. A single stitching server 230 may be used when real-time performance is not needed, or up to tens or even hundreds of stitching servers 230 may be used when real-time performance on high-resolution, high-frame-rate, 3-D video is being consumed. The frames of 3-D video may be stored or transmitted to a content server 240.

Content Server 240 may act as content distribution network for client systems 250 and communicate with client systems 250 to stream the appropriate parts of the requested 3-D video to the viewer. Content server 240 may transmit requested 3-D video to client systems 250 on a per-frame basis. In particular embodiments, the number of content servers 240 may be proportional to the number of client systems 250 receiving the 3-D video.

Client systems 250 may function as a device for users to view the 3-D video transmitted by content servers 240. Furthermore, input from client systems 250 to content servers 240 may modify portions of the 3-D video transmitted to client systems 250. As an example, the 3-D video may be adjusted based on data from client system 250 indicating that a user's viewing angle has changed. In particular embodiments, client system 250 may request frames that correspond to the straight-on view plus additional frames on either side. In particular embodiments, client system 250 may request low-resolution, full-frame images and reconstruct 3-D for the viewer.

Figure 3:
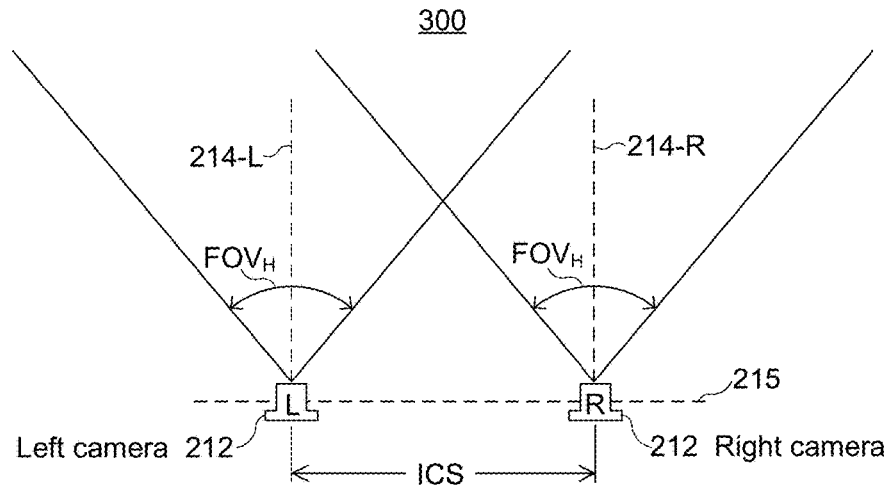
FIG. 3 illustrates an example stereoscopic pair of cameras.

FIG. 3 illustrates an example stereoscopic pair 300 of cameras 212. In particular embodiments, stereoscopic pair 300 may include two cameras 212 referred to respectively as left camera L and right camera R. Left camera L and right camera R may capture images that correspond to a person's left and right eyes, respectively, and video images captured by cameras L and R may be played back to a viewer as a 3-D video. In particular embodiments, stereoscopic pair 300 may be referred to as a pair, a stereo pair, a camera pair, or a stereo pair of cameras. As described below, camera system 210 may capture 3-D images using a number of pairs 300 of digital cameras ("cameras") 212, where camera system 210 may use integrated digital cameras or an interface to one or more external digital cameras. In particular embodiments, a digital camera may refer to a device that captures or stores images or videos in a digital format. Herein, the term "camera" may refer to a digital camera, and the term "video" may refer to digital video, or video recorded or stored in a digital format.

In particular embodiments, camera 212 may include an image sensor that is configured to capture individual photo images or a series of images as a video. As an example and not by way of limitation, camera 212 may include a charge-coupled device (CCD) image sensor or a complementary metal-oxide-semiconductor (CMOS) active-pixel image sensor. In particular embodiments, an image sensor of camera 212 may have an aspect ratio (e.g., a ratio of the sensor's width to height) of approximately 16:9, 4:3, 3:2, or any suitable aspect ratio. In particular embodiments, an image-sensor width of camera 212 may be greater than an image-sensor height. In particular embodiments, a width and height of an image sensor may be expressed in terms of a number of pixels along two axes of the image sensor, and the image sensor width may represent the longer dimension of the image sensor. As an example and not by way of limitation, an image sensor may have a width or height of between 500 and 8,000 pixels. As another example and not by way of limitation, an image sensor with a width of 1,920 pixels and a height of 1,080 pixels may be referred to as an image sensor with a 16:9 aspect ratio. In particular embodiments, camera 212 may include a lens or lens assembly to collect and focus incoming light onto the focal area of the image sensor. As an example and not by way of limitation, camera 212 may include a fisheye lens, ultra wide-angle lens, wide-angle lens, or normal lens to focus light onto the image sensor. Although this disclosure describes and illustrates particular cameras having particular image sensors and particular lenses, this disclosure contemplates any suitable cameras having any suitable image sensors and any suitable lenses.

In particular embodiments, camera 212 may have a field of view (FOV) that depends at least in part on a position, focal length, or magnification of a lens assembly of camera 212 and a position or size of an image sensor of camera 212. In particular embodiments, a FOV of camera 212 may refer to a horizontal, vertical, or diagonal extent of a particular scene that is visible through camera 212. Objects within a FOV of camera 212 may be captured by an image sensor of camera 212, and objects outside the FOV may not appear on the image sensor. In particular embodiments, FOV may be referred to as an angle of view (AOV), and FOV or AOV may refer to an angular extent of a particular scene that may be captured or imaged by camera 212. As an example and not by way of limitation, camera 212 may have a FOV between 30° and 200°. As another example and not by way of limitation, camera 212 having a 100° FOV may indicate that camera 212 may capture images of objects located within ±50° of a direction or orientation 214 in which camera 212 is pointing.

In particular embodiments, camera 212 may have two particular FOVs, such as for example a horizontal field of view ($FOV_H$) and a vertical field of view ($FOV_V$), where the two FOVs are oriented approximately orthogonal to one another. As an example and not by way of limitation, camera 212 may have a $FOV_H$ in a range of between 30° and 100° and a $FOV_V$ in a range of between 90° and 200°. In the example of FIG. 3, camera 212 has a $FOV_H$ of approximately 80°. In particular embodiments, camera 212 may have a $FOV_V$ that is wider than its $FOV_H$. As an example and not by way of limitation, camera 212 may have a $FOV_H$ of approximately 45° and a $FOV_V$ of approximately 150°. In particular embodiments, camera 212 having two unequal FOVs may be due at least in part to camera 212 having an image sensor with a rectangular shape (e.g., camera 212 may have an image sensor with a 16:9 aspect ratio). In particular embodiments, camera 212 may be positioned so that its $FOV_V$ is aligned with or corresponds to the width of camera 212's image sensor and its $FOV_H$ is aligned with the height of the image sensor. As an example and not by way of limitation, an image-sensor may have a height and width, where the width represents the longer of the two image-sensor dimensions, and camera 212 may be oriented so that the width axis of its image sensor corresponds to $FOV_V$. Although this disclosure describes and illustrates particular cameras having particular fields of view, this disclosure contemplates any suitable cameras having any suitable fields of view.

In particular embodiments, camera 212 may have an orientation 214 that represents an angle or a direction in which camera 212 is pointing. In particular embodiments, orientation 214 may be represented by a line or ray directed along a center of a FOV of camera 212. In particular embodiments, orientation line 214 of camera 212 may be directed approximately along a longitudinal axis of camera 212, approximately orthogonal to a surface of the camera's lens assembly or image sensor, or approximately orthogonal to axis 215, where axis 215 represents a line between cameras L and R of stereoscopic pair 300. In the example of FIG. 3, orientation 214-L and orientation 214-R are each approximately orthogonal to axis 215, and orientations 214-L and 214-R are each directed approximately along a respective center of $FOV_H$ of camera 212. In particular embodiments, each camera 212 of a stereoscopic pair 300 may have a particular orientation 214 with respect to one another. In particular embodiments, a left and right camera 212 of stereoscopic pair 300 may each point in approximately the same direction, and orientations 214 of the left and right cameras may be approximately parallel (e.g., angle between orientations 214 may be approximately 0°). In the example of FIG. 3, left camera orientation 214-L is approximately parallel to right camera orientation 214-R, which indicates that cameras L and R are pointing in approximately the same direction. Left and right cameras 212 with parallel orientations 214 may represent cameras pointing in the same direction, and cameras L and R may be referred to as having the same orientation. In particular embodiments, left camera L and right camera R having a same orientation may refer to orientations 214-L and 214-R, respectively, that are parallel to one another to within ±0.1°, ±0.5°, ±1°, ±2°, ±3°, or to within any suitable angular value. In particular embodiments, an orientation of stereoscopic pair 300 may be represented by an orientation 214 of parallel left and right cameras 212. As an example and not by way of limitation, a first stereoscopic pair 300 may be referred to as having a 30° degree orientation with respect to a second stereoscopic pair 300 when each camera of the first pair is oriented at 30° degrees with respect to the cameras of the second camera pair.

In particular embodiments, left camera L and right camera R may have orientations 214-L and 214-R with a particular nonzero angle between them. As an example and not by way of limitation, the two cameras of stereoscopic pair 300 may be oriented slightly toward or away from one another with an angle between their orientations of approximately 0.5°, 1°, 2°, or any suitable angular value. In particular embodiments, an orientation of stereoscopic pair 300 may be represented by an average of orientations 214-L and 214-R. Although this disclosure describes and illustrates particular cameras having particular orientations, this disclosure contemplates any suitable cameras having any suitable orientations.

In particular embodiments, an inter-camera spacing (ICS) between cameras 212 of a pair of cameras (e.g., L and R) may represent a distance by which the two cameras are separated from each other. In particular embodiments, stereoscopic pair 300 may have cameras 212 with an ICS between 6 and 11 cm, where ICS may be measured between two corresponding points or features of two cameras 212. As an example and not by way of limitation, ICS may correspond to a distance between middle points of two cameras 212, a distance between longitudinal axes of two cameras 212, or a distance between orientation lines 214 of two cameras 212. In particular embodiments, cameras L and R of stereoscopic pair 300 may be separated by an ICS distance along axis 215, where axis 215 represents a line connecting cameras L and R, and camera orientations 214-L and 214-R are approximately orthogonal to axis 215. In the example of FIG. 3, ICS is a distance between cameras L and R as measured along separation axis 215. In particular embodiments, an ICS may correspond to an approximate or average distance between the pupils, or the inter-pupillary distance (IPD), of a person's eyes. As an example and not by way of limitation, an ICS may be between 6 and 7 cm, where 6.5 cm corresponds to an approximate average IPD value for humans. In particular embodiments, stereoscopic pair 300 may have an ICS value that is higher than an average IPD value (e.g., ICS may be 7-11 cm), and this higher ICS value may provide a scene that appears to have enhanced 3-D characteristics when played back to a viewer. Although this disclosure describes and illustrates particular camera pairs having particular inter-camera spacings, this disclosure contemplates any suitable camera pairs having any suitable inter-camera spacings.

Figure 4:
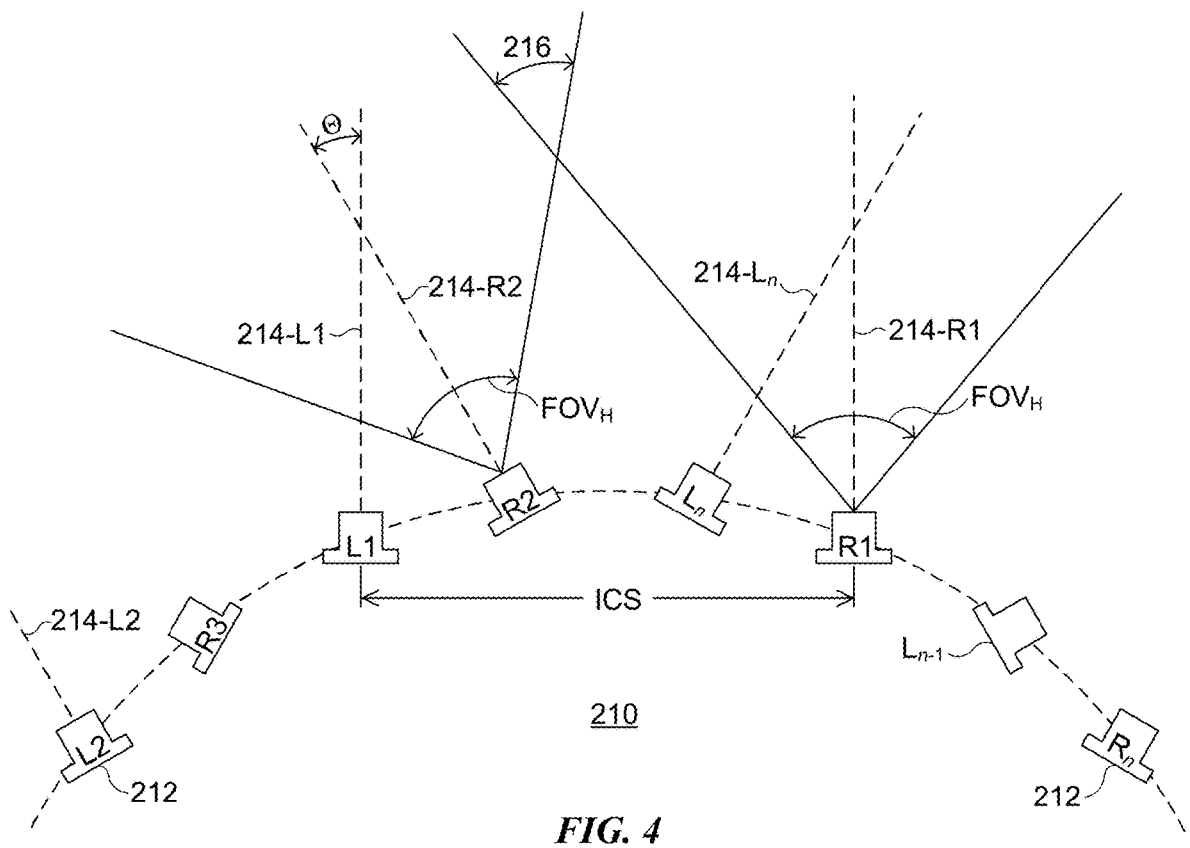
FIG. 4 illustrates a partial plan view of an example camera configuration of a camera system.

FIG. 4 illustrates a partial plan view of an example camera configuration of camera system 210. In the example of FIG. 4, camera system 210 includes a first camera pair 300 formed by L1 and R1, a second camera pair 300 formed by L2 and R2, and an n-th camera pair 300 formed by $L_n$ and $R_n$. In particular embodiments, camera system 210 may also include additional camera pairs, such as for example camera pair L3-R3 (where camera L3 is not shown in FIG. 4) or camera pair $L_{n-1}$-$R_{n-1}$ (where camera $R_{n-1}$ is not shown in FIG. 4). Although this disclosure describes and illustrates particular camera systems having particular numbers of camera pairs, this disclosure contemplates any suitable camera systems having any suitable numbers of camera pairs.

In particular embodiments, cameras 212 of camera system 210 may be arranged along a straight line, a curve, an ellipse (or a portion of an ellipse), a circle (or a portion of a circle), or along any other suitable shape or portion of any suitable shape. Camera system 210 with cameras 212 arranged along a circle may be configured to record images over a 360° panoramic view. In the example of FIG. 4, cameras 212 are arranged along a portion of a circle as represented by the circular dashed line in FIG. 4. Camera system 210 illustrated in FIG. 4 may record images over a half circle and provide approximately 180° of angular viewing. In particular embodiments, cameras 212 of camera system 210 may each be located in the same plane. As an example and not by way of limitation, each camera 212 of camera system 210 may be located in a horizontal plane, and each camera 212 may have its $FOV_H$ oriented along the horizontal plane and its $FOV_V$ oriented orthogonal to the horizontal plane. In the example of FIG. 4, cameras 212 are each located in the same plane, and the $FOV_H$ of each camera 212 is also oriented in that plane. In particular embodiments, cameras 212 of camera system 210 may each be located in the same plane, and orientation 214 of each camera 212 may also be located in that same plane. In the example of FIG. 4, cameras 212 are each located in the same plane, and camera orientations (e.g., 214-L1, 214-L2, 214-R1, and 214-R2) are also located in that same plane so that each camera points along a direction that lies in the plane. In particular embodiments, camera 212 may be positioned with the height dimension of camera 212's image sensor oriented along the horizontal plane so that the image-sensor height is aligned with and corresponds to $FOV_H$. Additionally, camera 212 may be positioned with the width dimension of camera 212's image sensor oriented orthogonal to the horizontal plane so that the image-sensor width corresponds to $FOV_V$. In particular embodiments, camera 212 may capture an image having an aspect ratio such that a vertical extent of the image is larger than a horizontal extent of the image.

In particular embodiments, camera system 210 may include a number of pairs 300 of cameras 212, where the camera pairs 300 are interleaved with one another. In particular embodiments, camera pairs 300 being interleaved may refer to a camera configuration where a first camera pair has one camera located between the cameras of an adjacent second camera pair. Additionally, the second camera pair may also have one camera located between the cameras of the first camera pair. In particular embodiments, an adjacent or adjoining camera pair 300 may refer to camera pairs 300 located next to one another or arranged such that a camera of one camera pair 300 is located between the two cameras of another camera pair 300. In particular embodiments, interleaved camera pairs 300 may refer to a camera configuration with first and second camera pairs, where the second pair of cameras are separated from each other by at least a camera of the first camera pair. Additionally, the first pair of cameras may also be separated from each other by at least a camera of the second camera pair. In the example of FIG. 4, camera pair L2-R2 is interleaved with camera pair L1-R1 and vice versa. Camera pairs L1-R1 and L2-R2 are interleaved such that camera R2 is located between cameras L1 and R1, and camera L1 is located between cameras L2 and R2. Similarly, camera pairs L1-R1 and $L_n$-$R_n$ are also interleaved with one another. Camera pairs L1-R1 and $L_n$-$R_n$ are interleaved such that cameras L1 and R1 are separated by at least camera $L_n$, and cameras $L_n$-$R_n$ are separated by at least camera R1. In the example of FIG. 4, camera pair L1-R1 is interleaved with two adjoining camera pairs, camera pair L2-R2 and camera pair $L_n$-$R_n$.

In particular embodiments, camera system 210 may include a first pair 300 of cameras 212, where the cameras of the first pair are separated from each other by at least one camera 212 of a second pair 300 of cameras 212. In the example of FIG. 4, cameras L1 and R1 of camera pair L1-R1 are separated from each other by camera R2 of camera pair L2-R2. Additionally, the first pair of cameras may have an orientation 214 that is different from an orientation 214 of the second pair of cameras. In the example of FIG. 4, the orientation of camera pair L1-R1 (which may be represented by orientation 214-L1 or 214-R1) is different from the orientation of camera pair L2-R2 (which may be represented by orientation 214-L2 or 214-R2). In particular embodiments, camera system 210 may also include a third pair of cameras (e.g., $L_n$-$R_n$ in FIG. 4), and the cameras of the first pair (e.g., L1-R1) may also be separated from each other by a camera (e.g., camera $L_n$) of the third pair of cameras (e.g., $L_n$-$R_n$). Additionally, the third pair of cameras may have an orientation 214 that is different from the orientations 214 of the first and second camera pairs. Although this disclosure describes and illustrates particular camera systems having particular cameras arranged in particular configurations, this disclosure contemplates any suitable camera systems having any suitable cameras arranged in any suitable configurations.

In particular embodiments, camera system 210 may include multiple interleaved camera pairs 300, where each camera pair 300 has a particular orientation 214. In particular embodiments, cameras 212 of each camera pair 300 may be arranged uniformly such that each camera pair 300 is oriented at an angle Θ with respect to one or more adjacent camera pairs 300. In particular embodiments, angle Θ may correspond to an angular spacing or a difference in orientations 214 between adjacent pairs 300 of cameras 212. In the example of FIG. 4, cameras L1 and R1 are pointing in the same direction as represented by their approximately parallel respective orientations 214-L1 and 214-R1. Similarly, cameras L2 and R2 are each pointing along a direction, as represented by their approximately parallel respective orientations 214-L2 and 214-R2, that is different from the orientation of camera pair L1-R1. In particular embodiments, angle Θ between adjacent camera pairs 300 may be approximately the same for each camera pair 300 of camera system 210 so that camera pairs 300 are arranged with a uniform difference between their respective orientations 214. As an example and not by way of limitation, adjacent camera pairs 300 of camera system 210 may each be oriented at an angle of approximately 26°, 30°, 36°, 45°, 60°, 90°, or any suitable angle with respect to one another. In the example of FIG. 4, camera pair L2-R2 is oriented at angle Θ≈30° with respect to camera pair L1-R1. In particular embodiments, for camera system 210 with n uniformly spaced camera pairs 300 (where n is a positive integer) arranged along a circle, angle Θ between each adjacent camera pair may be expressed as Θ≈360°/n. As an example and not by way of limitation, for camera system 210 with n=12 pairs of cameras distributed in a uniformly spaced circular configuration, angle Θ between each adjacent camera pair is approximately 360°/12=30°. As another example and not by way of limitation, for camera system 210 with n=8 pairs of cameras distributed in a uniformly spaced circular configuration, angle Θ between each adjacent camera pair is approximately 360°/8=45°.

In particular embodiments, a first and second camera pair 300 may be interleaved such that a right camera 212 of the second pair of cameras is adjacent to a left camera 212 of the first pair of cameras, and a center of a $FOV_H$ of the right camera 212 of the second pair of cameras intersects a center of a $FOV_H$ of the left camera 212 of the first pair of cameras. In the example of FIG. 4, first camera pair L1-R1 is interleaved with second camera pair L2-R2 such that right camera R2 is adjacent to left camera L1, and the center of the $FOV_H$ of camera R2 (as represented by orientation 214-R2) intersects the center of the $FOV_H$ of camera L1 (as represented by orientation 214-L1). In particular embodiments, a first and third camera pair 300 may be interleaved such that a left camera 212 of the third pair of cameras is adjacent to a right camera 212 of the first pair of cameras, and a center of a $FOV_H$ of the left camera 212 of the third pair of cameras intersects a center of a $FOV_H$ of the right camera 212 of the first pair of cameras. In the example of FIG. 4, first camera pair L1-R1 is interleaved with n-th camera pair $L_n$-$R_n$ such that left camera $L_n$ is adjacent to right camera $R_n$, and the center of the $FOV_H$ of camera $L_n$ (as represented by orientation 214-$L_n$) intersects the center of the $FOV_H$ of camera R1 (as represented by orientation 214-R1). Although this disclosure describes and illustrates particular camera pairs interleaved in particular manners, this disclosure contemplates any suitable camera pairs interleaved in any suitable manners.

In particular embodiments, angle Θ between adjacent camera pairs 300 may be different for one or more camera pairs 300 of camera system 210 so that camera pairs 300 may have a nonuniform angular spacing. As an example and not by way of limitation, the angular spacing or distribution of camera pairs 300 in camera system 210 may be varied based at least in part on the $FOV_H$ of each camera 212. For example, some camera pairs 300 of camera system 210 with a narrower $FOV_H$ may have an angular spacing of 30° while other camera pairs 300 with a wider $FOV_H$ have an angular spacing of 50°. Although this disclosure describes and illustrates particular camera systems having particular camera pairs with particular angular spacings, this disclosure contemplates any suitable camera systems having any suitable camera pairs with any suitable angular spacings.

In particular embodiments, each $FOV_H$ of a set of left cameras (e.g., cameras L1, L2, etc., which correspond to a person's left eye) or a set of right cameras (e.g., cameras R1, R2, R3, etc., which correspond to a person's right eye) may have an angular overlap 216 with neighboring cameras in the set. In the example of FIG. 4, angular overlap 216 represents a shared portion or an overlap between images captured by neighboring cameras R1 and R2. In FIG. 4, cameras R2 and R3, cameras $R_n$ and R1, cameras L1 and L2, and cameras $L_n$ and $L_{n-1}$ may also share similar angular overlaps. In particular embodiments, neighboring cameras 212 with an angular overlap 216 may have an overlap of their horizontal FOVs of between 10% and 30%. As an example and not by way of limitation, neighboring cameras with horizontal FOVs that overlap by 10-30% may each capture images that overlap by between 10% and 30%. As another example and not by way of limitation, neighboring cameras each with a $FOV_H \approx 50°$ and an angular overlap 216 of approximately 10° may be referred to as having an angular overlap or an image overlap of approximately 20% (=10°/50°). In particular embodiments, and as described below, angular overlap 216 may be used to identify image features and create a stitched image that seamlessly shows an entire view as captured by camera system 210. Although this disclosure describes and illustrates particular cameras having particular angular overlaps, this disclosure contemplates any suitable cameras having any suitable angular overlaps.

Figure 5:
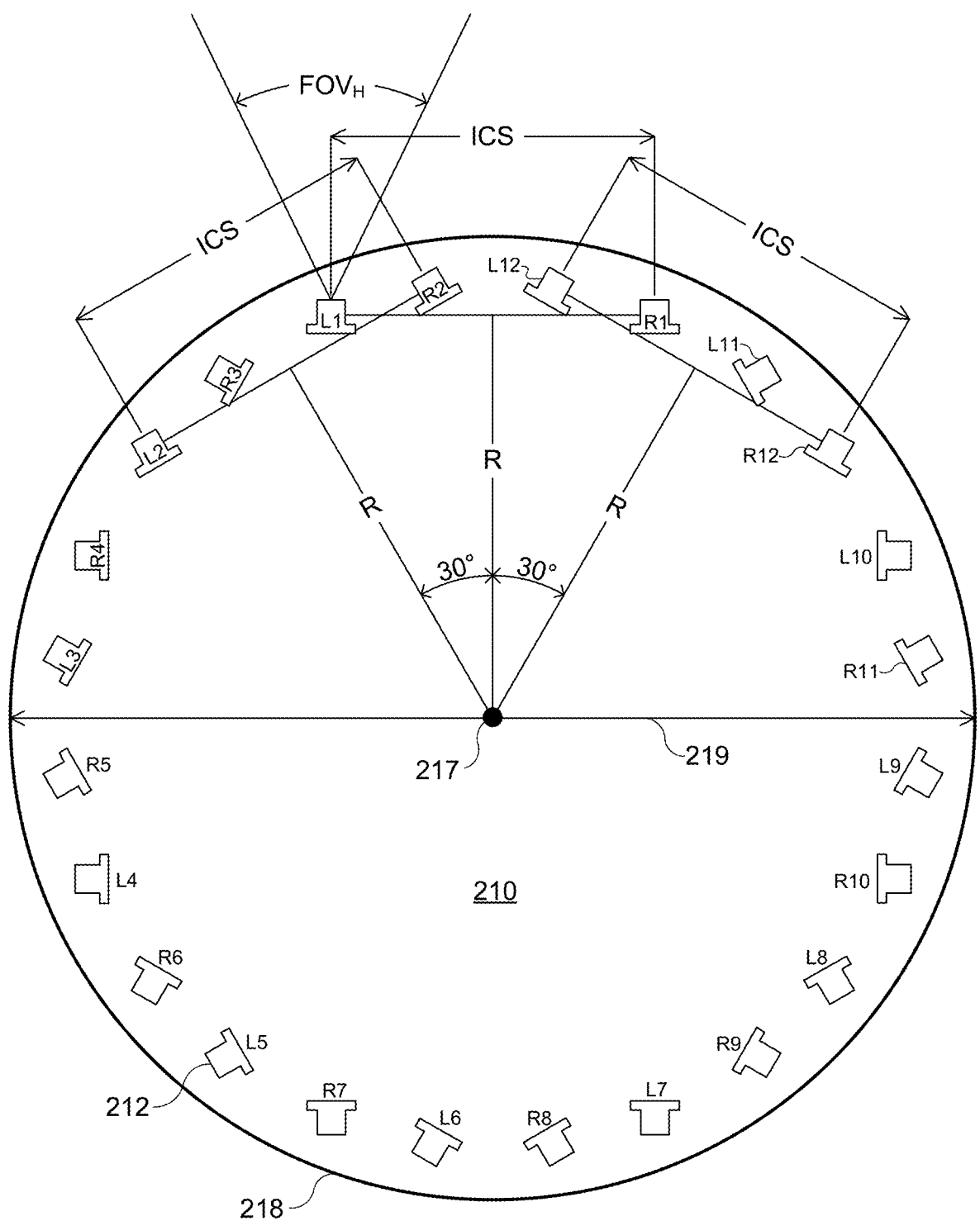
FIG. 5 illustrates a plan view of an example camera system.

FIG. 5 illustrates a plan view of an example camera system 210. As described below, camera system 210 may include a spatial arrangement of stereoscopic pairs 300 of cameras 212 configured to capture images and record or stream real-time video in 360 degrees and in stereoscopic 3-D format. In particular embodiments, camera system 210 may include 2n cameras 212 that form n camera pairs 300, where n is a positive integer. In particular embodiments, camera system 210 may include n=1, 2, 3, 4, 6, 8, 10, 12, 14, 16, or any suitable number of camera pairs 300. As examples and not by way of limitation, camera system 210 may include 8 cameras 212 that form n=4 camera pairs 300, or camera system 210 may include 16 cameras 212 that form n=8 camera pairs 300. In the example of FIG. 5, n equals 12, and camera system 210 includes 24 cameras 212 that form 12 camera pairs 300 (e.g., camera pair L1-R1 through camera pair L12-R12). As discussed above, camera pairs 300 of camera system 210 may be uniformly arranged so that adjacent camera pairs 300 are oriented at an angle of $\Theta \approx 360°/n$ with respect to one another. In the example of FIG. 5, n equals 12, and camera pairs 300 are oriented at approximately 30° (=360°/12) with respect to one another as represented by the 30° angles between radial lines R drawn from the center of camera system 210 to camera pairs 300.

In particular embodiments, cameras 212 of camera system 210 may be configured so that the horizontal FOVs of neighboring left cameras are overlapped and, similarly, the horizontal FOVs of neighboring right cameras are overlapped. In the example of FIG. 5, each pair of neighboring left cameras (e.g., cameras L1 and L2, cameras L2 and L3, etc.) may have an overlap of their horizontal FOVs of between 10% and 30%. Similarly, each pair of neighboring right cameras (e.g., cameras R1 and R2, cameras R2 and R3, etc.) may have an overlap of their horizontal FOVs of between 10% and 30%. In particular embodiments, each set of left cameras (e.g., cameras L1-L12 in FIG. 5) may be oriented to capture a corresponding set of left images that covers a full 360° view around camera system 210. Similarly, each set of right cameras (e.g., cameras R1-R12 in FIG. 5) may be oriented to capture a corresponding set of right images that covers a full 360° view around camera system 210.

In particular embodiments, cameras 212 of camera system 210 may be arranged in an approximately circular configuration with cameras 212 located at or near an outer edge or circumference of camera body 218. In particular embodiments, camera body 218 may represent a mechanical structure, enclosure, or casing that holds, contains, or encloses cameras 212 of camera system 210, as well as other devices that are part of camera system 210, such as for example, one or more power supplies or processors. In the example of FIG. 5, 14 cameras 212 of camera system 210 are arranged in a circular configuration near an outer edge of camera body 218, which has a circular shape. In particular embodiments, each camera pair 300 of camera system 210 may be aligned so its orientation 214 is directed away from, or radially outward from, a common center point 217. In the example of FIG. 5, center point 217 represents a center of body 218 of camera system 210, and the orientation of each camera pair, as represented by radial line R, is directed radially outward from center point 217. In particular embodiments, camera body 218 of camera system 210 may have a size, width, or diameter 219 of approximately 10 cm, 15 cm, 20 cm, 25 cm, 30 cm, or any suitable size. In the example of FIG. 5, camera body 218 may have an outer edge with a diameter 119 of approximately 20 cm. In particular embodiments, camera system 210 may have a size comparable to that of a human head as it turns. As an example and not by way of limitation, camera body 218 may have a diameter of approximately 20 cm, and camera pairs 300 may be positioned to correspond to the location of a person's eyes as the person rotates their head. Although this disclosure describes and illustrates particular camera systems having particular sizes, widths, or diameters, this disclosure contemplates any suitable camera systems having any suitable sizes, widths or diameters.

In particular embodiments, two or more cameras 212 of camera system 210 may be referred to as being adjacent to one another. In particular embodiments, two cameras 212 that are adjacent to one another may refer to two cameras located next to or nearby one another with no other camera located between the two cameras. In the example of FIG. 5, cameras L1 and R3 are adjacent to one another, and cameras L2 and R3 are adjacent to one another. In FIG. 5, camera R1 is adjacent to camera L11 and camera L12. In particular embodiments, adjacent cameras may be identified within a particular set of cameras without regard to other cameras which are not part of the set. As an example and not by way of limitation, two cameras within a set of left cameras may be identified as being adjacent to one another even though there may be a right camera located near or between the two cameras. In FIG. 5, for the set of left cameras (cameras L1 through L12), camera L1 is adjacent to cameras L2 and L12, and for the set of right cameras (cameras R1 through R12), cameras R1 and R2 are adjacent.

Figure 6:
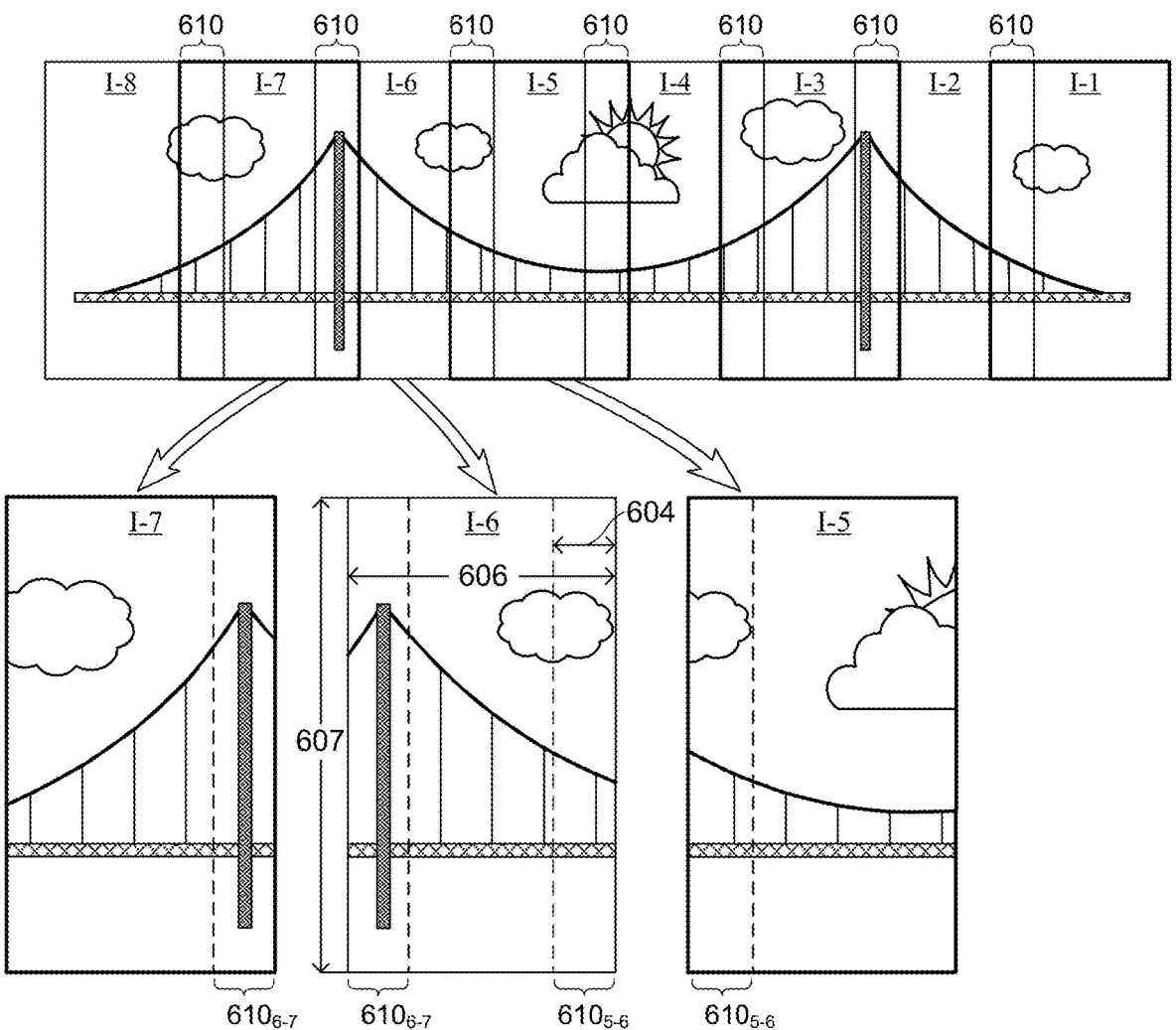
FIG. 6 illustrates an example set of images captured by cameras of a camera system.

FIG. 6 illustrates an example set of images (I-1 through I-8) captured by cameras 212 of a camera system 210. As an example and not by way of limitation, images I-1 through I-8 may correspond to images captured by left cameras L-1 through L-8, respectively, of camera system 210. Images I-1 through I-8 may represent images captured using a camera system 210 similar to that illustrated in FIG. 4 or FIG. 5. In particular embodiments, a set of images captured by a set of left or right cameras 212 of camera system 210 may have overlap areas 610 between neighboring images, where overlap areas 610 represent portions or regions of neighboring images that correspond to approximately the same scene. In the example of FIG. 6, overlap area $610_{5-6}$ represents an overlap between neighboring images I-5 and I-6, and the captured scene in overlap area $610_{5-6}$ includes a right portion of a cloud and part of a bridge. Similarly, overlap area $610_{6-7}$ represents an overlap between neighboring images I-6 and I-7, and the captured scene in overlap area $610_{6-7}$ includes a bridge tower.

In particular embodiments, overlap area 610 may correspond to an overlap of horizontal FOVs of neighboring cameras 212. In particular embodiments, neighboring images captured by left or right cameras 212 of camera system 210 may have an overlap of between 10% and 30%. In particular embodiments, an amount or a percentage of overlap corresponds to a ratio of a height, width, or area of overlap area 610 to a height, width, or area of a corresponding image. In the example of FIG. 6, an amount of overlap between images I-5 and I-6 is equal to width 604 of overlap area $610_{5\text{-}6}$ divided by width 606 of image I-5 or I-6. In particular embodiments, a dimension of overlap area 610 or a dimension of an image may be expressed in terms of a distance (e.g., in units of mm or cm) or in terms of a number of pixels. In the example of FIG. 6, if overlap-area width 604 is 162 pixels and image width 606 is 1,080 pixels, then the overlap between images I-5 and I-6 is 15% (=162/1080). Although this disclosure describes and illustrates particular images with particular overlap areas or overlap amounts, this disclosure contemplates any suitable images with any suitable overlap areas or overlap amounts.

In particular embodiments, camera 212 may be positioned to capture an image having an aspect ratio such that vertical extent 607 of the image is larger than horizontal extent 606 of the image. As an example and not by way of limitation, camera 212 may capture an image with vertical extent 607 of 1,920 pixels and horizontal extent 606 of 1,080 pixels. In the example of FIG. 6, image I-6 has vertical extent 607 that is larger than horizontal extent 606.

In particular embodiments, adjacent images or neighboring images may refer to images located next to one another that share a common overlap area 610. In the example of FIG. 6, images I-2 and I-3 are adjacent, and image I-6 is adjacent to images I-5 and I-7. In particular embodiments, adjacent images may correspond to images captured by respective adjacent cameras. In the example of FIG. 6, images I-1 through I-8 may correspond to images captured by left cameras L1 through L8, respectively, such as for example, left cameras L1 through L8 of FIG. 5. Images I-1 and I-2 are adjacent images, and these images may be captured by adjacent left cameras L1 and L2, respectively.

Figure 7:
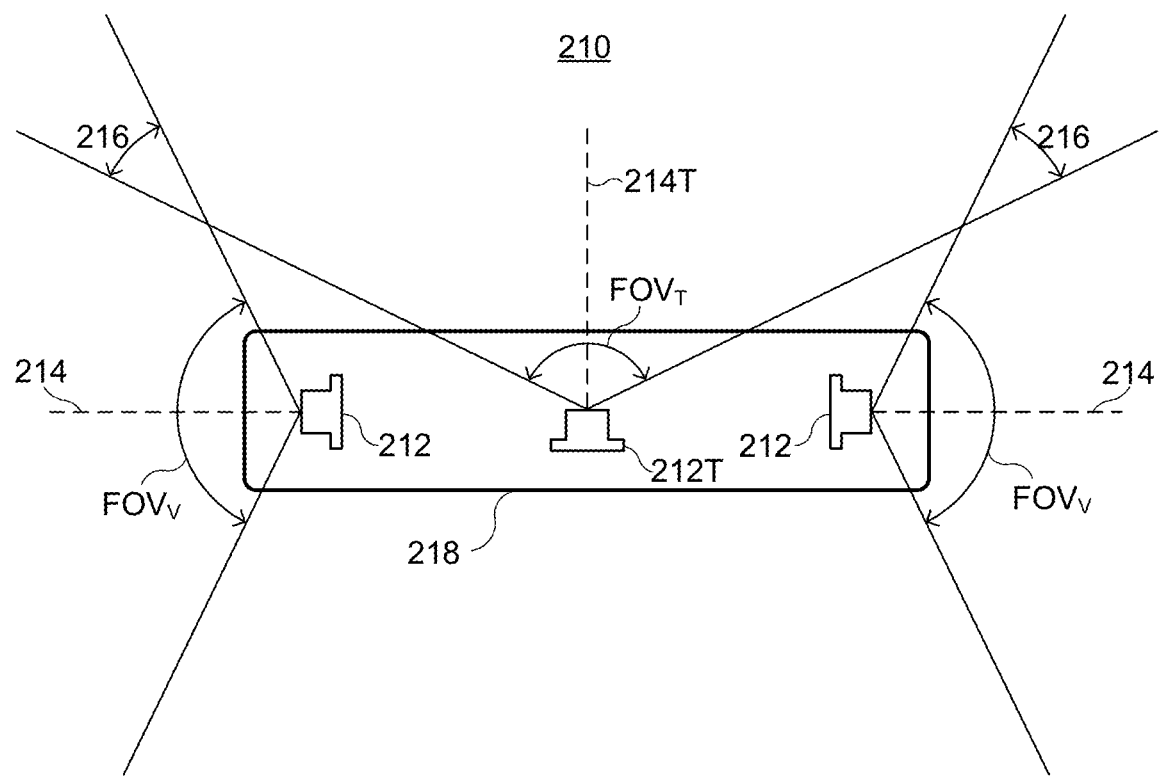
FIG. 7 illustrates a side view of an example camera system.

FIG. 7 illustrates a side view of an example camera system 210. In particular embodiments, camera system 210 may include one or more top cameras 212T which create a "roof" over an otherwise cylindrical side view captured by side cameras 212 arranged along a periphery of camera system 210. In particular embodiments, side cameras 212 may refer to cameras 212 arranged in a planar configuration with their respective orientations 214 located within the same plane, such as for example cameras 212 illustrated in FIG. 4 or FIG. 5. In particular embodiments, top camera 212T may provide an upward view that may be combined with images from side cameras 212 so that a user can look up (as well as looking to their left or right, or down within the downward extent of $FOV_V$) when viewing a 3-D video. In particular embodiments, camera system 210 may include one or more top cameras 212T pointing up as well as one or more bottom cameras (not illustrated in FIG. 7) pointing down. As an example and not by way of limitation, images from side cameras 212 may be combined with images from top camera 212T and a bottom camera so that a user can look in any direction (e.g., left, right, up, or down) when viewing a 3-D video. In particular embodiments, camera system 210 may include two or more top cameras 212T (e.g., a top-left camera and a top-right camera which may form a stereoscopic pair), and images from top cameras 212T may be combined to enhance a user's 3-D perception while viewing a 3-D video and looking upwards. Although this disclosure describes and illustrates particular camera systems having particular top or bottom cameras, this disclosure contemplates any suitable camera systems having any suitable top or bottom cameras.

In particular embodiments, top camera 212T may have a field of view $FOV_T$ that overlaps a vertical field of view $FOV_V$ of one or more side cameras 212. As an example and not by way of limitation, an outer edge portion of an image from top camera 212T may overlap an upper portion of images from cameras 212 by 10-30%. In the example of FIG. 7, angular overlap 216 represents an overlap between $FOV_T$ of top camera 212T and $FOV_V$ of a side camera 212. In particular embodiments, top camera 212T may have a relatively high $FOV_T$. As an example and not by way of limitation, top camera 212T may include a fisheye lens and $FOV_T$ of top camera 212T may be in the range of 140° to 185°. In particular embodiments, camera system 210 may include a set of side cameras 212 and may not include a top camera 212T. As an example and not by way of limitation, camera system 210 may include side cameras 212 having a $FOV_V$ in the range of 140° to 185°, and side cameras 212 may be configured to capture all or most of a full 360° view without use of a top camera. In particular embodiments and as illustrated in FIG. 7, camera system 210 may include a set of side cameras 212 as well as top camera 212T. In particular embodiments, camera system 210 having top camera 212T may allow side cameras 212 to have a reduced $FOV_V$ with respect to a camera system 210 without a top camera. As an example and not by way of limitation, camera system 210 may include side cameras 212 having a $FOV_V$ in the range of 100° to 160°, where $FOV_V$ overlaps with $FOV_T$ of top camera 212T.

In particular embodiments, top camera 212T may be located near a top surface of camera system 210 or, as illustrated in FIG. 7, top camera 212T may be recessed or indented with respect to a top surface of camera system 210. As an example and not by way of limitation, top camera 212T may be located in a recessed position which may provide for a larger amount of overlap with side cameras 212. In particular embodiments, side cameras 212 of camera system 210 may each have an orientation 214 that lies in a horizontal plane of camera system 210, and orientation 214T of top camera 212T may be approximately orthogonal to orientations 214. In the example of FIG. 7, side cameras 212 are oriented horizontally, and top camera 212T has a vertical orientation 214T. Although this disclosure describes and illustrates particular camera systems with particular edge cameras and particular top cameras having particular arrangements, orientations, or fields of view, this disclosure contemplates any suitable camera systems with any suitable edge cameras and any suitable top cameras having any suitable arrangements, orientations, or fields of view.

Figure 8:
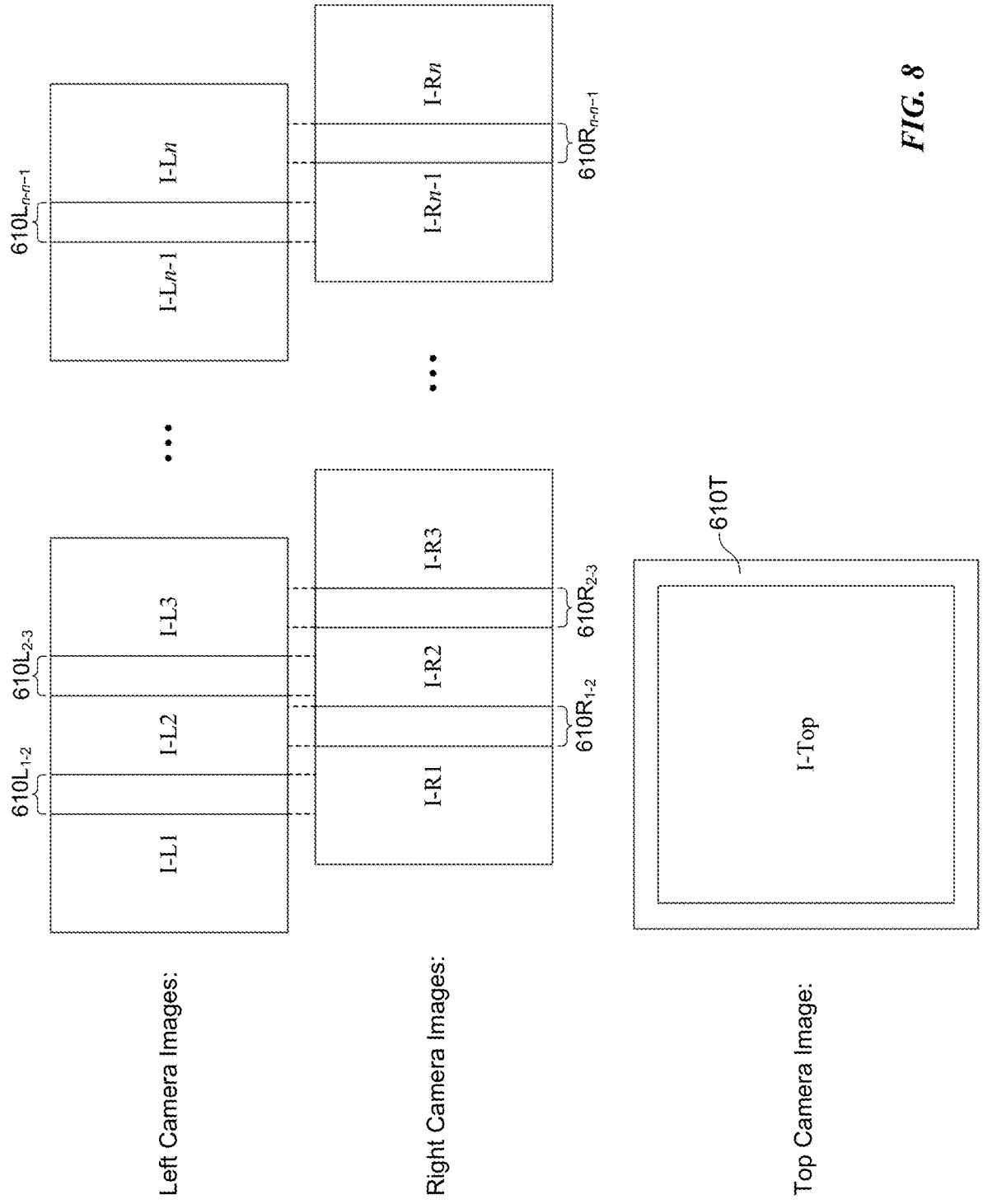
FIG. 8 illustrates an example set of overlapping images captured by cameras of a camera system.

FIG. 8 illustrates an example set of overlapping images captured by cameras 212 of a camera system 210. In particular embodiments, a camera system 210 with n camera pairs 300 and one top camera 212T may capture 2n+1 images for each frame of video. The images illustrated in FIG. 8 may be captured using 2n side cameras 212 and top camera 212T of camera system 210 similar to that illustrated in FIG. 7. In particular embodiments, n left cameras 212 and n right cameras 212 may be arranged in pairs and interleaved as described above so that left-camera images I-L1 through I-L$_n$ are overlapped and right-camera images I-R1 through I-R$_n$ are overlapped. In the example of FIG. 8, overlap areas 610L represent overlapping portions of images of neighboring left cameras, and overlap areas 610R represent overlapping portions of images of neighboring right cameras. As an example and not by way of limitation, neighboring left cameras 2 and 3 may capture images I-L2 and I-L3, respectively, with corresponding overlap area $610L_{2\text{-}3}$. In the example of FIG. 8, image I-Top represents an image captured by top camera 212T, and overlap area 610T represents an outer edge portion of image I-Top that overlaps with upper portions of the images from side cameras 212. In particular embodiments, overlap area 610T may be used to stitch top image I-Top with images from one or more side cameras 212.

In particular embodiments, left and right cameras 212 may be arranged so that each left-camera overlap area 610L is captured within a single image of a corresponding right camera 212 and each right-camera overlap area 610R is captured within a single image of a corresponding left camera 212. In the example of FIG. 8, overlap area $610L_{1-2}$ of images I-L1 and I-L2 corresponds to image I-R1 so that the overlap between left cameras L1 and L2 is captured by right camera R1. Similarly, overlap area $610R_{2-3}$ of images I-R2 and I-R3 corresponds to image I-L3 so that the overlap between cameras R2 and R3 is contained within a field of view of camera L3. In particular embodiments, and as described below, overlap area 610 between two images may be used to identify image features and create a stitched image. Additionally, an overlap area 610 as captured by another camera may also be used in a stitching process. In the example of FIG. 8, images I-R1 and I-R2 may be stitched together based at least in part on features located in overlap area $610R_{1-2}$ of the two images. Additionally, since image I-L2 captures the same overlap area, image I-L2 may also be used in a stitching process or to verify the accuracy of a stitching process applied to images I-R1 and I-R2. Although this disclosure describes and illustrates particular camera systems configured to capture particular images having particular overlap areas, this disclosure contemplates any suitable camera systems configured to capture any suitable images having any suitable overlap areas.

In particular embodiments, camera system 210 may include one or more depth sensors for obtaining depth information about objects in an image. As an example and not by way of limitation, one or more depth sensors may be located between or near cameras 212 of camera system 210. In particular embodiments, a depth sensor may be used to determine depth or distance information about objects located within a FOV of cameras 212. As an example and not by way of limitation, a depth sensor may be used to determine that a person within a FOV of camera 212 is located approximately 1.5 meters from camera system 210 while an object in the background is located approximately 4 meters away. In particular embodiments, depth information may be determined based on a triangulation technique. As an example and not by way of limitation, two or more images captured by two or more respective cameras 212 may be analyzed using triangulation to determine a distance from camera system 210 of an object in the images. In particular embodiments, camera system 210 may include a depth sensor that operates based on a structured-light scanning technique. As an example and not by way of limitation, a structured-light 3-D scanner may illuminate a scene with a projected light pattern (e.g., a sheet of light or parallel stripes of light from an infrared light source, such as a laser or a light-emitting diode), and an image of reflected or scattered light from the projected light pattern may be captured (e.g., by a camera that is part of the depth sensor) and used to determine distances of objects in the scene. In particular embodiments, camera system 210 may include a depth sensor that operates based on a time-of-flight technique where a distance to an object is determined from the time required for a pulse of light to travel to and from the object. Although this disclosure describes particular depth sensors which operate in particular manners, this disclosure contemplates any suitable depth sensors which operate in any suitable manners.

In particular embodiments, a depth sensor may provide depth information about objects located near camera system 210 (e.g., within 0.1-10 meters of camera system 210), and the depth information may be used to enhance a stitching process. As described below, a stitching process may use correspondence between overlapped images from adjacent cameras to calculate the geometry of the scene. By using a depth sensor, the relative depth or distance of items within a FOV of one or more cameras 212 may be determined rather than assuming a single overall depth. In particular embodiments, depth-sensor information may allow near portions of an image to be stitched separately from far portions. As an example and not by way of limitation, segmentation of a scene such that near and far objects are stitched separately and then combined may provide improved stitching results by taking into account the distance between camera system 210 and objects in an image. In particular embodiments, a depth sensor may provide the ability to stretch, compress, or warp portions of an image of an object located close to camera system 210, resulting in an improved rendering of the object in a stitched image. As an example and not by way of limitation, when an object is close to camera system 210 (e.g., a person passes within 0.5 meters of camera system 210), accounting for the object's distance may result in a stitched image with a reduced amount of distortion. In particular embodiments, a depth sensor may provide the ability to exclude objects from view that are within a threshold distance of camera system 210. As an example and not by way of limitation, an object that is determined to be very close to camera system 210 (e.g., a person's hand within 0.1 meters of camera system 210) may be removed during image processing so that the object does not block the view of a scene.

In particular embodiments, camera system 210 may include one or more infrared (IR) cameras, where an IR camera may refer to a camera that is sensitive to IR light (e.g., light with a wavelength between approximately 0.8 µm and 14 µm). In particular embodiments, an IR camera may be sensitive to thermal radiation or may provide an ability to image a scene in low-light situations (e.g., a darkened room or outdoors at nighttime) where a visible camera (e.g., camera 212) may have reduced sensitivity. As an example and not by way of limitation, in addition to cameras 212 (which may be optimized for visible-light sensing), camera system 210 may also include one or more IR cameras, and information or images from cameras 212 and the IR cameras may be combined to improve image capture or rendering in low-light situations. As another example and not by way of limitation, camera system 210 may include a set of IR cameras arranged to capture images over a 360° panoramic view around camera system 210. As yet another example and not by way of limitation, cameras 212 of camera system 210 may be configured to have sensitivity to visible light as well as infrared light. Although this disclosure describes and illustrates particular camera systems having particular visible or infrared cameras, this disclosure contemplates any suitable camera systems having any suitable visible or infrared cameras.

In particular embodiments, camera system 210 may include one or more auxiliary cameras configured to image a scene with a wider FOV or with a different view than cameras 212. As an example and not by way of limitation, camera system 210 may include a set of cameras 212 as described above, and camera system may also include one or more fisheye cameras or stereoscopic cameras with a FOV that is wider than FOV of cameras 212. In particular embodiments, auxiliary cameras with a wider FOV may allow captured images from cameras 212 to be successfully stitched even when viewing a large expanse of uniform color or texture (e.g., a wall). In particular embodiments, cameras 212 may be configured to have a high resolution (which may result in a relatively narrow FOV), and auxiliary cameras with a wider FOV may provide a wide-field reference that allows high-resolution images from cameras 212 to be successfully aligned and stitched together.

In particular embodiments, cameras 212 may capture a vertical field of view greater than or approximately equal to 180 degrees. As an example and not by way of limitation, camera system 210 may include cameras 212 with $FOV_V$ of approximately 185°. In particular embodiments, camera system 210 may include a set of cameras 212 with $FOV_V$ greater than or equal to 180°, and camera system 210 may not include top camera 212T, since full viewing coverage may be provided by cameras 212.

In particular embodiments, camera system 210 may include one or more fisheye cameras, where a fisheye camera may refer to a camera with a wide FOV (e.g., a FOV of greater than or equal to 180 degrees). As an example and not by way of limitation, camera system 210 may include 2, 3, or 4 fisheye cameras located near a center of camera body 218. As another example and not by way of limitation, camera system 210 may include one or more pairs of fisheye cameras (e.g., four fisheye cameras configured as two pairs of fisheye cameras). A pair of fisheye cameras may be configured to capture 3-D images and may include two fisheye cameras separated by an ICS distance corresponding to an IPD. In particular embodiments, camera system 210 with fisheye cameras may be configured to simulate 3-D stereopsis (e.g., a perception of depth or 3-D structure) and may correspond to one or more virtual cameras located inside an image sphere.

In particular embodiments, camera system 210 may include cameras 212 having a relatively high $FOV_V$ and low $FOV_H$. As an example and not by way of limitation, cameras 212 may have a lens (e.g., an astigmatic lens) that provides a wider field of view vertically than horizontally. As another example and not by way of limitation, cameras 212 may have a $FOV_V$ of approximately 180°, and a $FOV_H$ of approximately 30°. In particular embodiments, a relatively narrow horizontal FOV may provide for a captured image that has relatively low distortion in the horizontal direction. In particular embodiments, distortion in the vertical direction associated with a relatively wide $FOV_V$ may be reversed by post-capture processing based at least in part on lens-calibration information. In particular embodiments, removing distortion in the vertical direction may be a more efficient process than removing distortion along both the horizontal and vertical directions. As an example and not by way of limitation, camera 212 having a relatively low $FOV_H$ may provide an improvement in distortion removal since the image distortion is primarily along one axis (e.g., a vertical axis).

In particular embodiments, camera system 210 may include two or more sets of moderate-FOV cameras 212. As an example and not by way of limitation, cameras 212 may have a vertical and horizontal FOV of 30 to 90 degrees. In particular embodiments, camera system 210 may include two or more sets of cameras 212 with the sets arranged in rows (e.g., one set or ring of cameras 212 located above another set). Each set of cameras 212 may be configured to capture a ring of images, each ring covering a 360-degree panorama in the horizontal direction and a moderate FOV (e.g., 60 degrees) in the vertical direction. As an example and not by way of limitation, camera system 210 may include three sets of cameras 212, each camera having a $FOV_V$ of approximately 65 degrees that overlaps adjacent sets by approximately 15 degrees. Each set of cameras 212 may capture images at high resolution and with relatively low distortion, and the images from each ring may be combined to produce high-resolution, low-distortion images that cover a full panorama.

In particular embodiments, camera system 210 may include multiple cameras 212 where the cameras 212 may not being combined into stereoscopic pairs. As an example and not by way of limitation, camera system 210 may include 12 cameras arranged with overlapping horizontal FOVs so that the cameras capture a 360-degree panorama. In particular embodiments, cameras 212 may be aligned so their orientations 214 are directed away from, or radially outward from, a common center point 217 (e.g., a center of body 218 of camera system 210). In particular embodiments, cameras 212 may not capture 3-D images, and a 3-D effect may be produced after image capture during a stitching or reconstruction process. As an example and not by way of limitation, post-capture processing may be applied to images to simulate stereopsis.

In particular embodiments, a calibration procedure may be applied to cameras 212 or camera system 210. As an example and not by way of limitation, camera 212, camera pair 300, or camera system 210 may have a positioning or alignment error resulting from production tolerances, and a calibration procedure may be used to correct or compensate for these errors and allow for improved stitching of images. In particular embodiments, a calibration procedure may be used to determine that a camera 212 or camera pair 300 has a position or orientation error or offset, and a corresponding error or offset in captured images may be corrected during image capture or during a post-capture process. As an example and not by way of limitation, camera pairs 300 may be manufactured to have an ICS of 6.5 mm, and from a calibration procedure, it may be determined that a camera pair 300 has an ICS of 7.0 mm. The 0.5-mm discrepancy between the ICS of camera pair 300 and a target ICS may be corrected for during image capture or with a post-capture correction process (e.g., an offset corresponding to 0.5 mm may be applied to images captured by one of the cameras 212). As another example and not by way of limitation, camera pairs 300 may be manufactured to have a uniform 30° angular spacing between adjacent camera pairs 300, and from a calibration procedure, it may be determined that a camera pair 300 has a 29° angular spacing with respect to an adjacent camera pair 300. The 1° angular error between camera pairs 300 may be corrected for while images are captured or during a post-capture correction process (e.g., an offset corresponding to a 1° rotation may be applied to captured images from one or more cameras 212).

In particular embodiments, a calibration procedure may be applied to camera system 210 after camera system 210 is manufactured, prior to camera system 210 being used, at periodic intervals (e.g., every month months), or at any suitable time or interval of time. As an example and not by way of limitation, camera system 210 may apply a calibration procedure prior to capturing a scene, which may ensure that positions and orientations of cameras 212 are known during image capture to ensure a successful stitching process. As another example and not by way of limitation, a calibration procedure may be applied to camera system 210 to correct for a misalignment of cameras 212 that may result from a temperature change, aging of camera system 210, or a mechanical shock (e.g., if camera system 210 is dropped during transport). In particular embodiments, once a calibration procedure is performed, data regarding calibration of cameras 212 or camera pairs 300 may be stored in a non-volatile memory of camera system 210. Although this disclosure describes particular calibration procedures performed in particular manners and at particular times, this disclosure contemplates any suitable calibration procedures performed in any suitable manners and at any suitable times.

In particular embodiments, cameras 212 of camera system 210 may be calibrated using projected light. In particular embodiments, projected-light calibration may be implemented using a wide angle projector, a mask in front of a lamp, or a laser scanner or reflector that projects an optical calibration pattern onto nearby surfaces. As an example and not by way of limitation, a laser beam may be reflected by a diffraction grating or a motorized mirror to produce a calibration pattern that is projected onto nearby surfaces. A projected laser pattern may be imaged by cameras 212 to determine camera calibration parameters. In particular embodiments, an optical assembly (e.g., a laser, mirror, or grating) for generating and projecting a calibration pattern may be mechanized to retract into or underneath camera-system body 218 when not in use. In particular embodiments, an optical-calibration assembly may be configured to rotate to project a calibration pattern in different directions so that different cameras 212 of camera system 210 may be calibrated. In particular embodiments, camera system 210 may be placed inside a controlled room or a spherical surface to provide an improved accuracy of calibration. Although this disclosure describes particular projected-light calibration systems, this disclosure contemplates any suitable project-light calibration systems.

In particular embodiments, cameras 212 of camera system 210 may be calibrated using a physical or mechanical process or structure. As an example and not by way of limitation, a mechanical calibration structure, such as for example a fan- or umbrella-like device, may be stored between cameras 212 or underneath or inside camera-system body 218. During calibration, these physical calibrators may be mechanically deployed at a known location relative to camera system 210. The physical calibrators may be imaged by cameras 212, and the captured images may be compared to a known geometry to determine calibration parameters. In particular embodiments, a mechanical calibration device may be a physical device separate from camera system 210. As an example and not by way of limitation, an external calibration device may have internal spokes that extend inward from a spherical outer body to allow camera system 210 to be held in a precise position that is known relative to the calibration device. As another example and not by way of limitation, an external calibration device may include optical sensors that allow camera system 210 to be precisely located relative to the calibration device. In particular embodiments, an interior surface of a calibration device may have calibration markings that are imaged by cameras 212, and calibration parameters for cameras 212 or camera pairs 300 may be determined based on captured images of the calibration markings. In particular embodiments, camera system 210 may include an optical assembly that projects a calibration pattern onto an interior surface of a calibration device. Although this disclosure describes particular physical calibration systems, this disclosure contemplates any suitable physical calibration systems.

In particular embodiments, camera system 210 may include one or more processors integrated as part of camera system 210, or camera system 210 may be coupled to one or more processors located external to camera system 210. As an example and not by way of limitation, camera system 210 may include one or more front-end processors 220 located inside body 218 of camera system 210. As another example and not by way of limitation, cameras 212 may be connected over USB to a set of one or more front-end processor machines 220. In particular embodiments, front-end processors 220 may carry out initial control of cameras 212, camera distortion correction, cropping of images, encoding of videos, compression of image data, or transmission of videos. As an example and not by way of limitation, camera system 210 may include independent front-end processors 220 connected to cameras 212 that carry out initial image adjustments, camera parameter control, or initial encoding of camera data to reduce the video payload for transport. In particular embodiments, the number of front-end processors associated with camera system 210 may depend at least in part on a number of cameras 212 in camera system 210 as well as a size or frame rate of video captured by cameras 212. As an example and not by way of limitation, each camera 212 may be connected to one or more dedicated processors 220. Although this disclosure describes and illustrates particular camera systems coupled to particular processors in particular manners, this disclosure contemplates any suitable camera systems coupled to any suitable processors in any suitable manners.

In particular embodiments, camera parameters (e.g., brightness, contrast, gain, exposure, white balance, saturation, focus, or aperture setting) may be calibrated, controlled, or mapped by one or more processors 220. In particular embodiments, a white balance setting for each camera 212 may be set or controlled independent of other cameras, since each camera 212 may see a scene differently. As an example and not by way of limitation, a camera 212 positioned next to a window may see a bluish scene while an adjacent camera 212 may see reddish indoor lighting, and the two cameras may have different white balance settings. In particular embodiments, one or more camera parameters may be controlled globally to ensure that settings for adjacent cameras (e.g., adjacent left cameras 212 or adjacent right cameras 212) do not deviate too widely. As an example and not by way of limitation, settings for exposure or gain for a camera 212 may be based at least in part on settings for one or more adjacent cameras 212. As another example and not by way of limitation, if exposure or gain settings are adjusted, processor 220 may ensure that settings for adjacent cameras for the same eye (e.g., adjacent left cameras 212 or adjacent right cameras 212) do not deviate too widely to minimize image banding or unacceptable stitching performance. In particular embodiments, a focus setting of cameras 212 may be maintained at infinity to minimize stitching errors that may result from a variation of camera focus. In particular embodiments, cameras 212 may be set to have a reduced aperture to provide a larger depth of field, which may result in a reduction in stitching errors. Although this disclosure describes particular camera parameters controlled in particular manners, this disclosure contemplates any suitable camera parameters controlled in any suitable manners.

In particular embodiments, an encoding process may involve one front-end processor 220 per camera 210, or a single processor 220 (with a single core or multiple processor cores) may be shared by multiple cameras 210. A front-end processor 220 may use accelerators, application-specific integrated-circuits (ASICs), or subprocessors to handle parts of a task of capturing, modifying, compressing, storing, or transmitting video data. Each processor 220 may run a general-purpose operating system, or may be an ASIC itself operating in complete- or near-lockstep with a central control processor. In particular embodiments, a central-control processor may act as a distributor or central control point for talking to front-end image-capture processors 220. In particular embodiments, central processors may be implemented as parts of a single large ASIC, with duplicated resources to connect to and control each camera 212. In such a case, multiple threads or copies of the same code or hardware-based algorithm may run to parallelize the process of capture. In particular embodiments, front-end processors 220 may use a processor-local storage system or may immediately stream data to one or more shared storage resources. In particular embodiments, decentralized storage may be utilized, and processor-local storage may be used as a buffer to the stitching system to achieve system load distribution.

In particular embodiments, front-end processors 220 may use a bus or network for transmission of data. The data transmission may use any suitable data-transmission format. In particular embodiments, transmission methods that guarantee receipt or otherwise notify the recipient of packet loss may be utilized. In particular embodiments, a sending component may retransmit damaged packets or may allow a receiver to insert a flag into a stored data stream indicating that packet corruption took place. In particular embodiments, a stitching system may then compensate for such damaged or lost packets as needed.

In particular embodiments, cameras 212 may have some lens distortion as well as some deviation relative to a target position or orientation 214. In particular embodiments, corrections for these effects may be static, and they may be pre-calibrated and corrected using lookup tables in the front end. As an example and not by way of limitation, panorama leveling, vignette correction, lens distortion correcting, white balance correction, exposure correction and matching, or viewpoint adjustment may be applied directly to an image. In this manner, an image may be operated on before any compression-induced color or feature shifts take place, which may reduce the occurrence of visible correction artifacts. Additionally, color correction may be applied to enhance edge sharpness, overall exposure, or white balance. In particular embodiments, noise reduction may be applied to a scene in order to reduce the compressed size of an image. In particular embodiments, front-end processors 220 may downsample an image after one or more image correction or enhancement steps are applied. As an example and not by way of limitation, rather than using a processor-intensive subsampling process, an output image may be downsampled. In particular embodiments, images may be captured at a higher resolution than that used for subsequent stitching, and this high-resolution image capture may help mitigate aliasing or artifacts that may be associated with correction or enhancement steps One or more initial stitching operations may be performed on a pair of images before the grid optimization stitching technique described herein is performed. In particular embodiments, stitching server 230 may determine a vertical alignment and a horizontal alignment of discrete images (e.g., images I-L1 through I-Ln) being stitched together. In particular embodiments, images from multiple cameras may be compared, such that all left images are compared to other left images (e.g., I-L1 through I-Ln), and all right images are compared to other right images (e.g., I-R1 through I-Rn). In the example of FIG. 6, image I-6 may be compared to adjacent images I-5 and I-7. Additionally, left images may be compared to right images (e.g., I-L1 and I-R1) to make sure they are correctly aligned relative to each other. As an example and not by way of limitation, images I-L1 through I-L12 may correspond to images captured by left cameras L1 through L12, respectively, of camera system 210 illustrated in the example of FIG. 5. As described above, the FOV of the cameras corresponding to each eye (e.g., L6) has an overlap with its neighbors (e.g., L5 and L7), such that spatially aligning the images results in an overlap area 610 between adjacent images (e.g., I-6 and I-7). As described below, overlap area 610 of adjacent images may be used to identify image features for creating a stitched image. In particular embodiments, assumptions may be made when performing some of the stitch parameter calculations due to the known geometry of the camera system.

Figure 9:
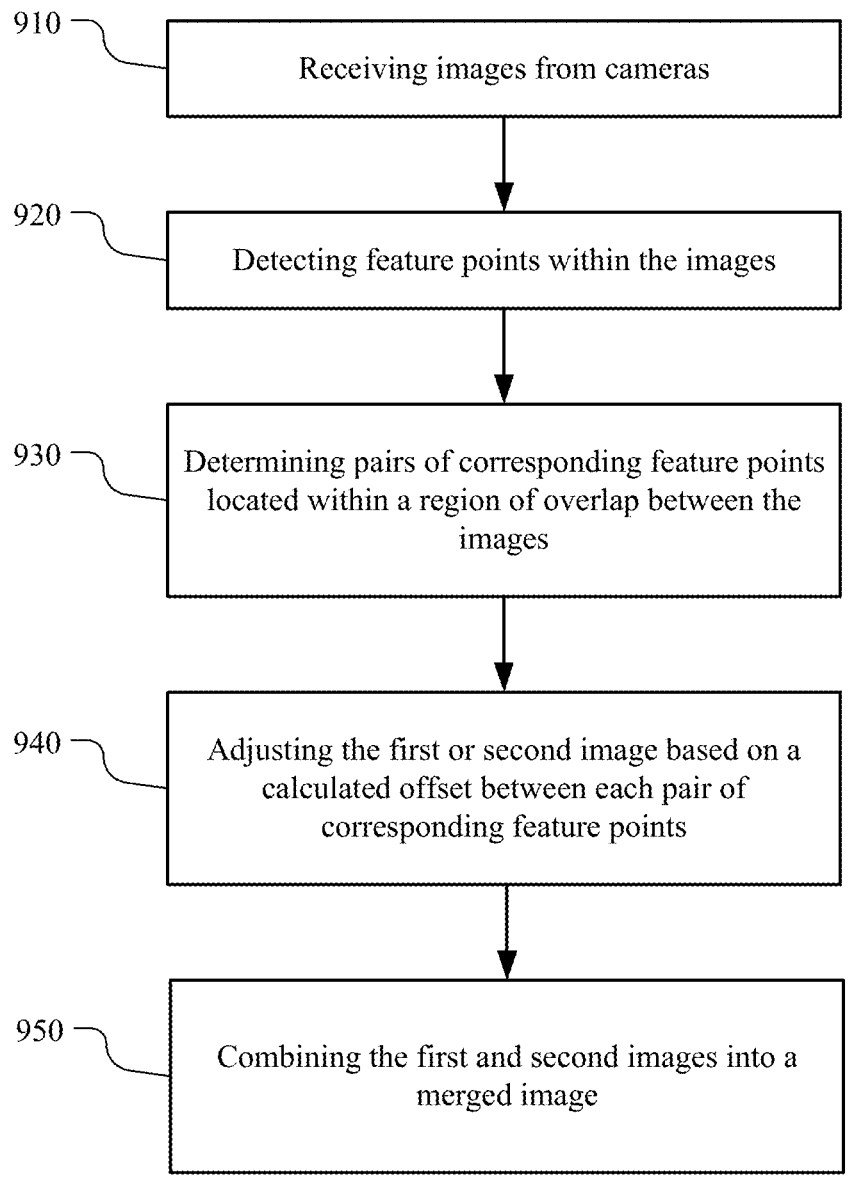
FIG. 9 illustrates an example method for stitching discrete images.

FIG. 9 illustrates an example method for stitching discrete images. The method 900 may begin at step 910, where a number of images are received from a number of cameras 212. In particular embodiments, the cameras may include a first camera 212 having a first orientation 214 and a second camera 212 having a second orientation 214. In particular embodiments, the images may include a first image from the first camera 212 and a second image from the second camera 212. At step 920, a number of feature points are detected within the first and second images. At step 930, one or more pairs of corresponding feature points located within an area of overlap between the first and second images are determined. In particular embodiments, the pairs of corresponding feature points include a respective one of the feature points from each of the first and second images. At step 940, the first or second image is spatially adjusted based on a calculated offset between each pair of corresponding feature points. At step 950, the first and second images are combined into a merged or stitched image based on the spatial adjustment. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for stitching discrete images including the particular steps of the method of FIG. 9, this disclosure contemplates any suitable method for stitching discrete images including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
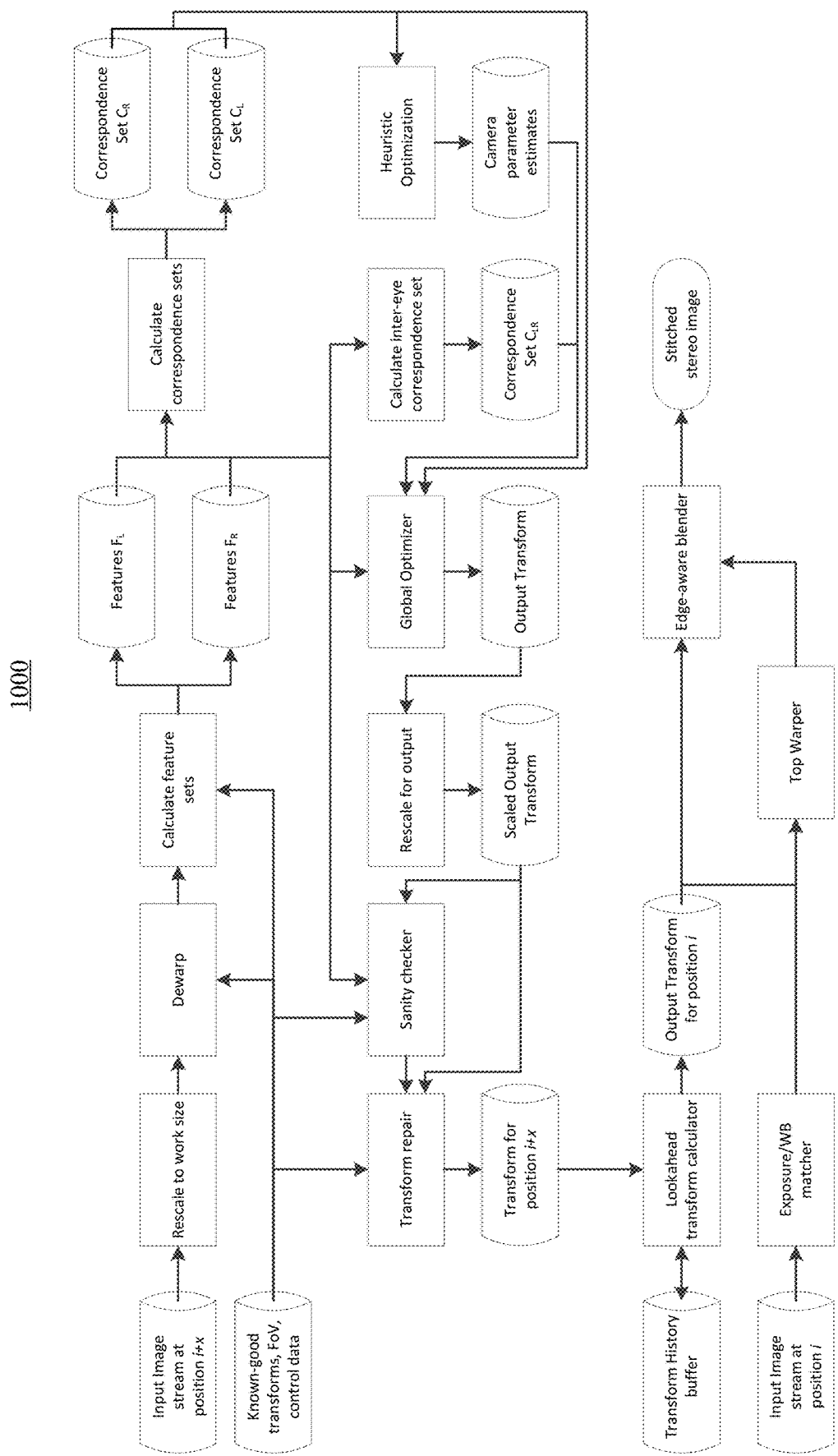
FIGS. 10 and 11 illustrate other example methods for stitching discrete images.
Figure 11:
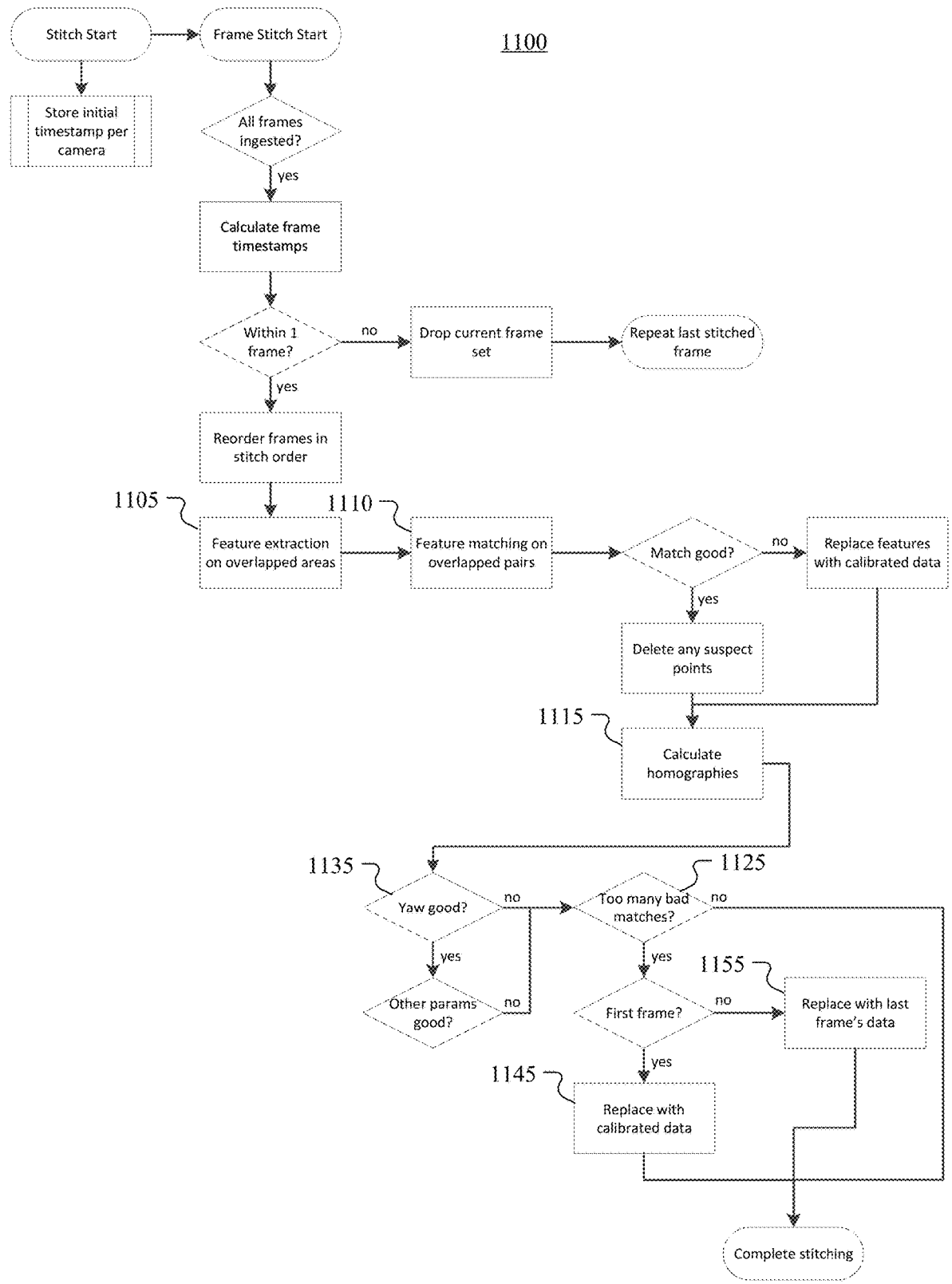

FIGS. 10 and 11 illustrate other example methods 1000 and 1100, respectively, for stitching discrete images. In particular embodiments, a method for stitching images, such as for example the methods 1000 and 1100, illustrated in FIG. 10 or FIG. 11, respectively, may provide a process for stitching images that preserves 3-D perception and is performed automatically (e.g., the process requires little or no human intervention). Although this disclosure describes and illustrates a particular flow performing particular steps in a particular order to stitch images, this disclosure contemplates any suitable flow that performs any suitable steps in a suitable order.

In particular embodiments, images received from front-end processors 220 of camera system 210 may be resized prior to stitching. Decreasing the resolution of the images while determining pairs of corresponding feature points, described below, may speed up the stitching process. Additionally, reduction of resolution may improve resilience to noise in low-light conditions, as well as increase overall sensitivity to small-scale textures for feature detection, described below. As an example and not by way of limitation, 2-8 megapixel (MP) images may be resized to a lower resolution that is easier to manage for a real-time 3-D stitching process. As another example and not by way of limitation, 8 MP images captured by cameras 212 may be resized to 2 MP, and the resized 2-MP images may be used as inputs to a stitching process. In particular embodiments, a resized image may be constrained to have a minimum size (e.g., 1 MP, 2 MP, or any suitable minimum size). As an example and not by way of limitation, 4 MP and 2 MP images may both be resized to 1 MP. In particular embodiments, resizing the received images may reduce noise in the images that may affect feature detection using local contrast enhancement. As an example and not by way of limitation, a scaling kernel, such as for example a Lanczos kernel, may be used to minimize kernel artifacts that may cause errors in feature detection. In particular embodiments, stitching parameters may be determined from images that are resized to a lower resolution than original images. As an example and not by way of limitation, after using a set of resized images (e.g., 2 MP images) to determine stitching parameters, a set of original, high-resolution images (e.g., 8 MP images) captured by cameras 212 may be stitched together using the determined stitching parameters.

In particular embodiments, images received from camera system 210 may be dewarped to stitch the images onto a rectangular plane. As an example and not by way of limitation, the received images may be super-sampled to reduce the amount of artifacts that may hinder feature detection, described below. In particular embodiments, a dewarping procedure may be combined with a scaling procedure, which may reduce the need for super-sampling. As an example and not by way of limitation, received images may undergo a combined dewarping and scaling procedure, and the combination of dewarping and scaling may reduce artifacts in the images. Alternately, the dewarping of received images may be used as a global transform as a function of position, and access to pixel data of the received images may go through a transform and super-sampling to produce suitable values. In particular embodiments, a dewarp transformation of an image may be approximated by equation (1):

$$\text{Image dewarp:} \begin{bmatrix} x \\ y \end{bmatrix} \begin{bmatrix} scale' \\ translate' \\ a..e \end{bmatrix} \rightarrow \begin{bmatrix} x' \\ y' \end{bmatrix}, \quad (1)$$

where x is a position along a latitude of a projected 3-D space, y is a position along a longitude of the projected 3-D space, a . . . e are camera dewarp parameters, scale' is a scaling factor of the image, translate' is a horizontal or vertical spatial translation parameter, and x' and y' are the latitude and longitude positions, respectively, after the dewarp transformation. In particular embodiments, a dewarping process may be performed using an estimated scaling factor based on the characteristics of one or more of the cameras of the camera system. In particular embodiments, a dewarp process may be performed on one or more sets of initial images, and a simplified version of the dewarp process may be applied to later images using an abstraction of the dewarp process. As an example and not by way of limitation, access to points and images may be abstracted to provide for a faster dewarping process.

At step 1105, features in received images that form a scene may be detected, as illustrated in the example of FIG. 11. In particular embodiments, feature detection and matching may be performed on grayscale versions of image I-6, and a particular contrast may be applied to images I-6 in a separate operation or through a look-up table (LUT). In particular embodiments, feature detection may be performed globally on image I-6 using local contrast enhancement. Local contrast enhancement increases "local" contrast, while at the same time preventing an increase in "global" contrast, thereby protecting large-scale shadow/highlight detail. As an example and not by way of limitation, local contrast gradients may be indicative of an edge, corner, or "blob" that corresponds to a feature. Features of image I-6 may be detected using a feature detection algorithm such as for example scale-invariant feature transform (SIFT), speeded up robust features (SURF), or oriented FAST and Rotated BRIEF (ORB), where FAST stands for "features from accelerated segment test" and BRIEF stands for "binary robust independent elementary features." In particular embodiments, a feature detection process may detect one or more feature points 614 (see FIG. 13). As an example and not by way of limitation, feature points 614 may be detected by taking a difference of multiple Gaussian smoothing operations. Furthermore, the position (e.g., within the grid or within search region 612 (see FIG. 12)) of feature points 614 and the contrast values of each feature point 614 for each search region 612 may be stored.

Figure 12:
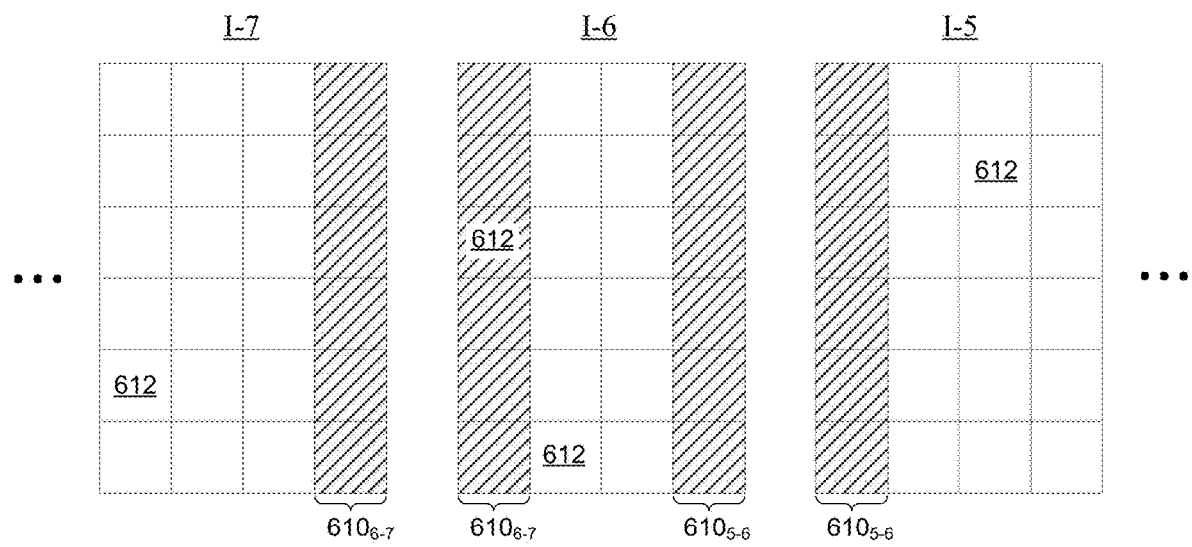
FIG. 12 illustrates example partitioning of an image.

FIG. 12 illustrates example partitioning of an image. In particular embodiments, received images (e.g., images I-7 through I-5) may be partitioned into a number of search regions 612. As example and not by way of limitation, images I-7 through I-5 may correspond to images corresponding to a particular eye (e.g., all left or right images), as illustrated in the example of FIG. 8. In particular embodiments, the received images (e.g., I-7 through I-5) may be partitioned into 24 search regions arranged in a 4×6 rectangular grid, as illustrated in the example of FIG. 12. As described above, images (e.g., I-7 through I-5) from adjacent cameras corresponding to a particular eye (e.g., all left cameras) have overlap areas $610_{6-7}$ and $610_{5-6}$ that are proportional to angular overlap 216 between the FOV of the respective cameras. In particular embodiments, overlap areas $610_{6-7}$ and $610_{5-6}$ of the images (e.g., I-7 through I-5) may correspond to the right and left edges of the received images (e.g., I-7 through I-5). In particular embodiments, feature-point detection or matching may be limited to overlap areas of adjacent images. In the example of FIG. 12, for adjacent images I-6 and I-7, feature-point detection may only be applied in overlap area $610_{6-7}$. Regions outside of overlap area 610 may not be considered, which may ensure that irrelevant or unnecessary points located outside an overlap area do not affect a stitching process.

Figure 13:
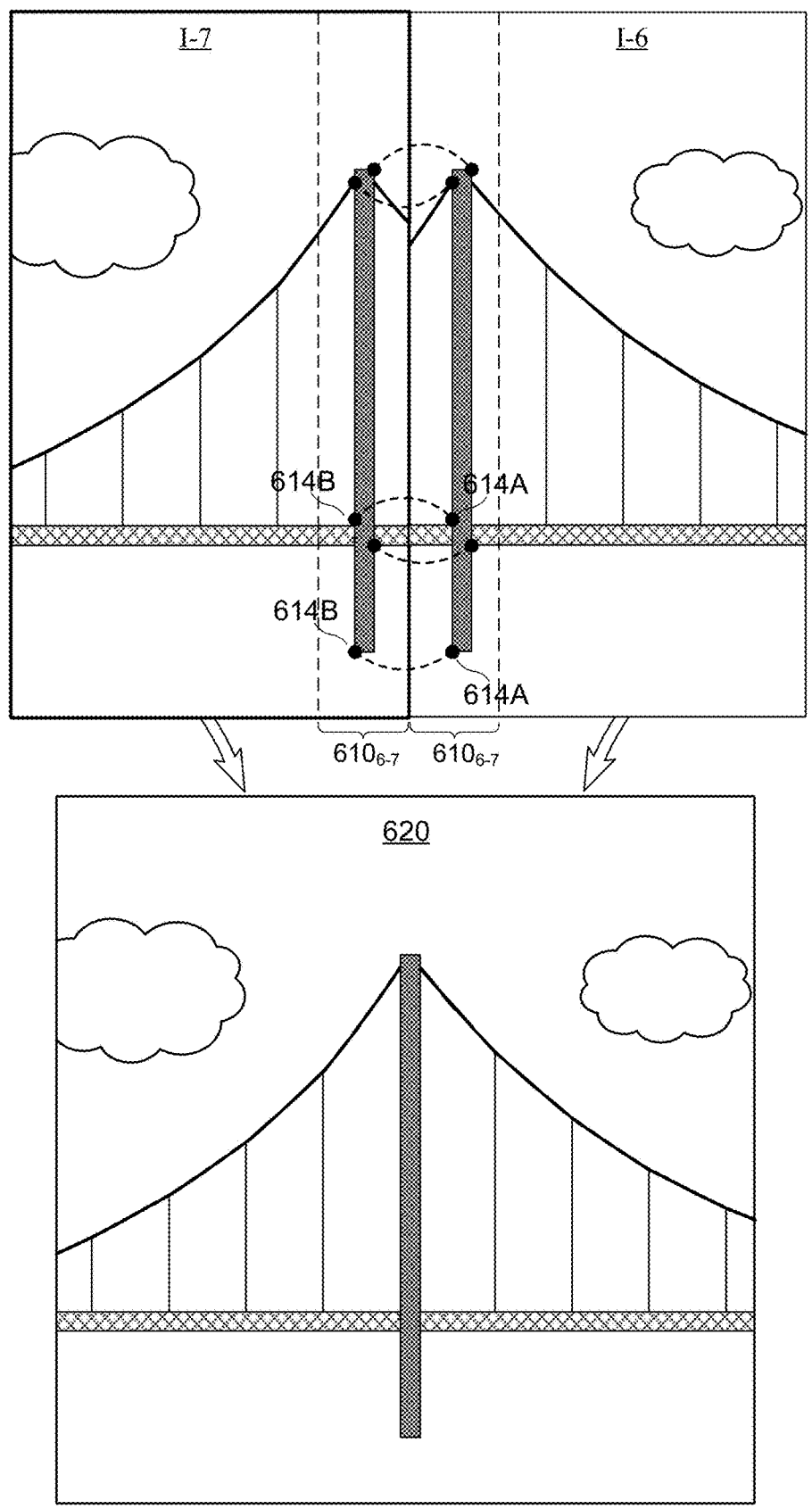
FIG. 13 illustrates example feature point matching of images.

FIG. 13 illustrates example feature point matching of images. At step 1110, feature point matching may be performed locally on the search regions of overlap areas $610_{6-7}$ to minimize the effect of irrelevant points on stitched image 620, as illustrated in the example of FIG. 11. As an example and not by way of limitation, feature point calculations may be performed on the detected feature points 614A-B to match a feature point 614A of image I-6 to a corresponding feature point 614B of image I-7. The pairs of corresponding feature points 614A-B may be detected by locally comparing the area around each detected feature point 614A-B in search regions of overlap areas $610_{6-7}$. In particular embodiments, the respective contrast settings for that feature point 614A-B in the respective images I-7 and I-6 may be applied as part of the matching of feature points 614A-B. As an example and not by way of limitation, the contrast difference between images I-7 and I-6 may be compensated as an offset of a contrast curve. In particular embodiments, this offset of the contrast curve may be calculated with additional bits (e.g., using signed 16 bits for 8 bit values) to take this into account. A difference in the offset may cause the best match to have a uniform difference that is known ahead of time.

In particular embodiments, a size of an area used to match feature points 614 may be set according to a size of images. In particular embodiments, a geometry of camera system 210 may be known, and based on the known camera-system geometry, an approximate number of pixels of the search regions and overlap areas $610_{6\text{-}7}$ of adjacent images I-6 and I-7 may be known a priori. As an example and not by way of limitation, since the location and orientation of cameras 212 of camera system 210 are fixed relative to one another, the overlap between adjacent left cameras (e.g., cameras L1 and L2) or adjacent right cameras (e.g., cameras R11 and R12) may be known, and similarly the overlap between adjacent left or right cameras (e.g., cameras L1 and R1) may also be known. In particular embodiments, determining corresponding pairs of feature points may be performed using a nearest-neighbor search algorithm. As an example and not by way of limitation, a nearest-neighbor search algorithm may identify patterns of feature points 614B within each search region of overlap area $610_{6\text{-}7}$ of image I-7 that match corresponding patterns of feature points 614A within each search region of overlap area $610_{6\text{-}7}$ of image I-6. In particular embodiments, a nearest-neighbor algorithm may use a search radius around each feature point 614A-B to determine the pairs of corresponding feature points 614A-B. As an example and not by way of limitation, a search area may have a radius of 32 pixels, 64 pixels, or any suitable radius, or a search area may have a size of 32 pixels×32 pixels, 64 pixels×64 pixels, or any suitable size. In particular embodiments, a secondary refinement step may be used to realign the pairs of corresponding feature points before a final homography calculation.

In particular embodiments, a feature-matching procedure may use estimated parameters, and some searching may be applied within an overlap area or a search region to optimize position. In particular embodiments, a search radius may be increased as a feature search moves from a center to an edge of an image (e.g., image I-6 or I-7). As an example and not by way of limitation, a search radius may be increased due to increased errors associated with a difference between actual and estimated parameters (e.g., actual FOV versus estimated FOV). In particular embodiments, additional feature points may be added to regions 612 with fewer than a pre-determined number (e.g., 3 pairs) of pairs of corresponding feature points 614A-B. As an example and not by way of limitation, if a feature search reveals less than 3 feature points in a particular region 612, backup feature points from a backup feature-point set may be added to a set of features. In particular embodiments, backup, substitute, or additional feature points may be based on characteristics of camera system 210, characteristics of each camera 212, calibration data, or any combination thereof, and additional feature points may be indicated or marked in a data structure.

In particular embodiments, camera parameters or images (e.g., I-6 and I-7) may be heuristically optimized to reduce the number of free variables in a final optimization to generate stitched image 620. As an example and not by way of limitation, heuristic optimization may be used to optimize or refine one or more camera-related parameters (e.g., FOV, orientation 214, or location of vertical or horizontal camera center). A feature-matching procedure may use estimated camera parameters based at least in part on known camera geometry (e.g., position or orientation of cameras 212 of camera system 210) or on a calibration process. For example, knowing a nominal position and orientation of cameras 212 may allow estimates to be made of camera FOV, angular overlap 216, camera orientation 214, or camera position (e.g., location of vertical and horizontal camera center). In particular embodiments, estimated camera parameters may be optimized iteratively or by using a group numeric approach for multiple non-linear values. In particular embodiments, for each image (e.g., I-6 and I-7), the position of the pairs of corresponding feature points 614A-B may be compared to each other and adjustments made to corresponding camera parameters based on an offset in the position of the respective feature points 614A-B. As an example and not by way of limitation, a FOV parameter or an orientation parameter may be adjusted in response to detecting a radial offset on average between the feature points 614A-B. As another example and not by way of limitation, a vertical or horizontal camera-position parameter may be adjusted (e.g., translated) in response to detecting a vertical or horizontal offset, respectively, on average between the feature points 614A-B.

At step 1115, an estimation of camera displacement (e.g., camera rotation or translation) between images I-6 and I-7 may be determined using a homography matrix based on the matched pairs of corresponding feature points, as illustrated in the example of FIG. 11. In particular embodiments, adjustments to images I-6 and I-7 may be made based on the estimated camera displacement determined by the homography matrix. The stitch parameters that are used to adjust and align images I-6 and I-7 to form the merged stitched image 620 may be calculated using the homography matrix. As an example and not by way of limitation, the homography matrix may be initially calculated for images I-6 and I-7, and adjustment may be made to subsequent images based on the calculated homography matrix.

Adjustments may be made to images I-7 and I-6 to properly combine the images I-7 and I-6 into stitched image 620. In particular embodiments, the adjustments may be made to meet one or more optimization criteria. As an example and not by way of limitation, optimization criteria may be that the vertical or horizontal offset of the pairs of corresponding feature points 614A-B should be minimized. As another example, an optimization criteria may be that the horizontal offset of the pairs of corresponding feature points 614A-B should be less than a maximum horizontal offset before a viewer would see double. As yet another example, an optimization criteria may be that the vertical offset of the pairs of corresponding feature points 614A-B should be less than a maximum vertical offset.

In particular embodiments, the adjustments to images I-6 and I-7 may be performed assuming one or more initial conditions. As an example and not by way of limitation, an initial condition may assume that a first camera pair (e.g., camera pair L1-R1 in FIG. 5) has an orientation 214 that defines a main ray (or yaw) of camera system 210. As another example, an initial condition may assume that the orientation 214 for the remaining camera pairs (relative to the first camera pair) about the y-axis is $Y_i=(i-1)\times 360°/n$, where the y-axis is orthogonal to a plane of camera system, $i=2 \ldots n$, and n is the number of camera pairs of the camera system. As an example and not by way of limitation, for camera system 210 with n=8 camera pairs, camera pairs 300 are oriented at 45 degrees with respect to one another. As yet another example, an initial condition may assume that cameras 212 of camera system 210 are level along the x- and z-axes (e.g., zero roll and pitch, respectively).

In particular embodiments, adjustments to images I-6 and I-7 may be determined by minimizing one or more optimization costs. As an example and not by way of limitation, a distance between pairs of corresponding feature points 614A-B may represent a base total optimization cost. As another example, rotational adjustments along an axis may have a cost that is proportional to a weighted rotational displacement (e.g., $k_x(X'-X_0)^2$ about each axis, yaw, pitch, and roll, where $k_x$ is a weighting coefficient). Furthermore, each axis may have a particular weighting coefficient, such as for example $k_Y$ for a yaw axis, $k_P$ for a pitch axis, and $k_R$ for a roll axis. In particular embodiments, FOV or translational adjustment of images I-6 and I-7 may have linear cost of $k_x|X'-X_0|$ per axis. Each axis may have a particular weighting coefficient, such as for example $k_{FOV}$ for a FOV adjustment, $k_{CX}$ for an x-axis translation, and $k_{CY}$ for a y-axis translation. In particular embodiments, the optimization costs may be functionalized, such that the optimization cost functions may be modified to deal with corner cases.

In particular embodiments, images (e.g., I-6 and I-7) may be stitched together by performing a global optimization using the results of the heuristic optimization, initial conditions, optimization costs, or any combination thereof. These factors may be globally optimized using, for example, Monte-Carlo, gradient descent, a sparse version of Gauss-Newton, or other suitable non-linear optimization solver. In particular embodiments, the system of parameters may be global optimized through a system of equations expressed by (2):

$$\text{Global optimization} \begin{bmatrix} x' \\ y' \\ 0 \\ 1 \end{bmatrix} \begin{bmatrix} \text{Homography Matrix:} \\ YPR \\ \text{scale} \\ \text{translate} \end{bmatrix} \rightarrow \begin{bmatrix} x'' \\ y'' \\ z'' \\ 1 \end{bmatrix} \quad (2)$$

where x' and y' are the coordinates from the dewarp operation; the homography matrix is calculated from the pairs of corresponding feature points as described above; YPR is the rotational adjustments along the yaw, pitch, and roll axis, respectively; scale is a scaling of the image; translate is a translational adjustment; and x", y", and z" are the optimized coordinates.

The system of equations described by equation (2) may suffer convergence failure. At step 1125, a failed convergence on an image with more than 40% of the feature points coming from a backup source (e.g., calibration) may indicate the particular image is too white, too close, or lacks features, as illustrated in the example of FIG. 11. In this situation, the particular image may be adjusted in accordance with the initial conditions described above. In particular embodiments, convergence of the system of equations described by equation (2) may fail due to the substituted feature points having too large of a spatial offset. In that case, substituted feature points may have their optimization cost halved and the global optimization performed again. As an example and not by way of limitation, the reduction of the optimization and performing global optimization may be performed a pre-determined number of times (e.g., 4 cycles). Furthermore, if the equation (2) continues to fail to converge, then the contribution of the feature points may be set to zero.

In particular embodiments, in addition to images from adjacent cameras corresponding to a particular eye having an overlap, an image from a neighboring camera corresponding to the other eye may also have an overlap with both images. As an example and not by way of limitation, images from cameras L1 and L2 may have an overlap area, and a neighboring camera (e.g., camera R1, R2, or R3) may also capture an image that includes the same overlap area. As illustrated in the example of FIG. 8, images I-L1 and I-L2 have overlap area $610L_{4-2}$, and image I-R1 also overlaps the two images. In particular embodiments, features of an image (e.g., image I-R1) from a neighboring camera (e.g., camera R1) may be detected and corresponding pairs of feature points may be determined between an overlap area (e.g., overlap area $610L_{1-2}$) of adjacent images (e.g., images I-L1 and I-L2) and the image from the neighboring camera. Furthermore, a homography matrix may be calculated based on the detected pairs of corresponding feature points of the overlap areas of adjacent cameras and the overlapping portions of the image from a neighboring camera. In particular embodiments, the results of a homography matrix corresponding to adjacent cameras (e.g., cameras L1 and L2) may be compared to a homography matrix corresponding to a neighboring camera (e.g., camera R1). In addition, determining a correspondence between a stitched image corresponding to a left-eye view with a stitched image corresponding to a right-eye view may be used to stabilize the vertical offset between the stereoscopic pair of stitched images.

In particular embodiments, once stitch parameters or adjustments are calculated, as described above, they may be checked for correctness. In particular embodiments, a calibration may be performed using images of a known scene captured by camera system 210. The detection of pairs of corresponding feature points of the known scene may provide a set of feature points that may be used as a basis for image adjustments to stitch images. Once the stitching server has detected the pairs of corresponding feature points within the overlapped areas, an error calculation (e.g., a sum of squares of differences) may be performed in an area around each detected feature point. If the error calculation is above a pre-determined threshold value, then the detected pair of corresponding feature points may be flagged as being suspect. If the number of pairs of corresponding feature points drops below a pre-determined threshold number of pairs, the stitching of the discrete images may be flagged. In particular embodiments, the flagged pairs of corresponding feature points may be replaced with the feature points of the calibration data, thereby forcing the homography calculation to think that the images are at calibration orientations.

After the homography matrices are calculated, they may be checked for correctness. At step 1135, the difference between the yaw rotations of consecutive homography matrices may be checked, as illustrated in the example of FIG. 11. If the difference is within ±2-3° of the expected difference based on the calibrated data, described above, the image adjustments may be considered to be correct. As an example and not by way of limitation, the homography matrices for a 12-camera system where each camera is separated by 30° may be calculated. If the yaw rotation differences are within a pre-determined range of the expected value (e.g., between 27° and 33°), then the calculated homography matrices may be considered acceptable. In particular embodiments, the images from the cameras are used to calculate homography matrices. If the calculated homography matrices or camera positions are within ±2 degrees of the expected positions and angles, the stitch may be considered good. At step 1145, if the stitch fails for some images, the detected pairs of corresponding feature points may be replaced with substitute feature points from calibration data and the stitching procedure re-attempted, as illustrated in the example of FIG. 11. At step 1155, if the stitching procedure fails for a number of images above a pre-determined threshold number, the entire stitch may be rejected and the homography matrices from the last successful stitched frame may be used, as illustrated by the example of FIG. 11. In the case where a stitching failure occurs for an initial frame, homography matrices calculated based on calibration data may be used instead.

Figure 14:
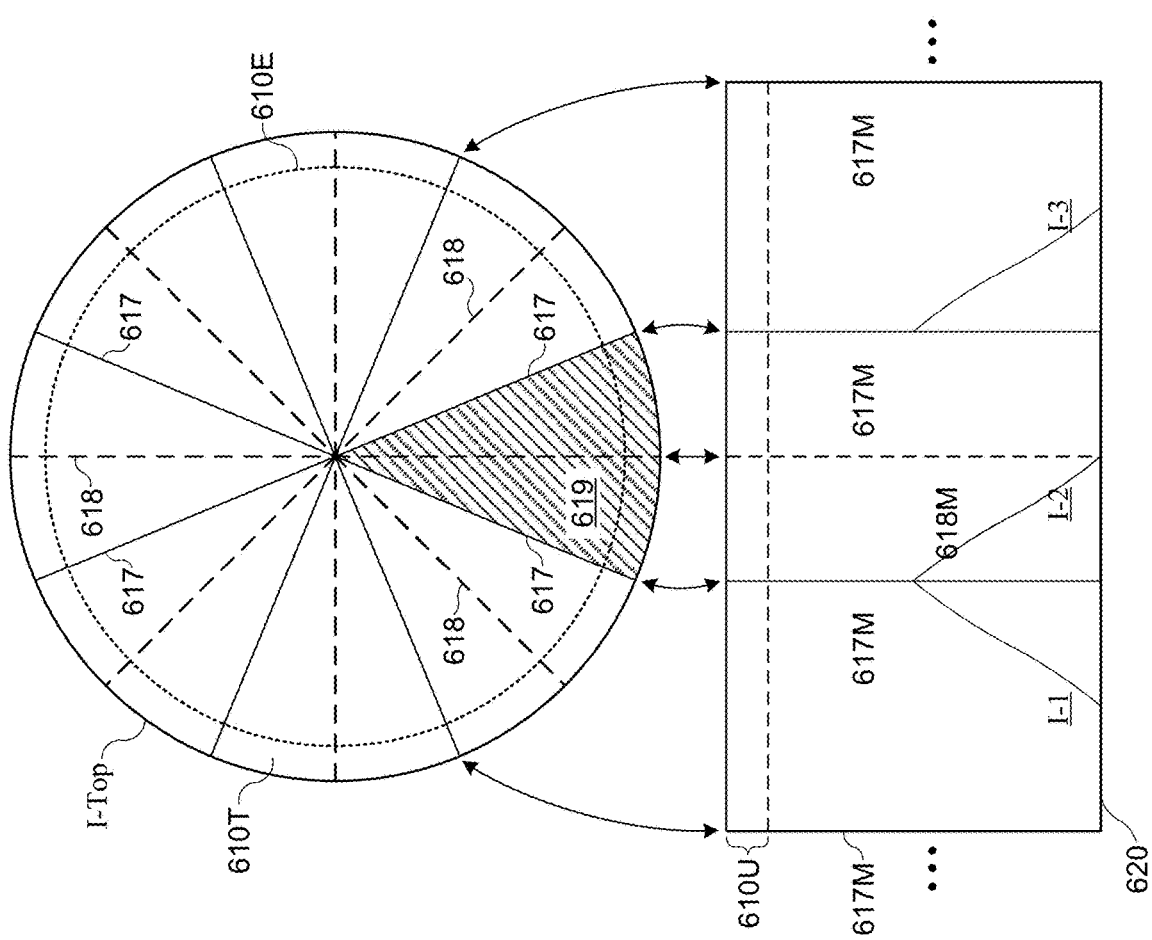
FIG. 14 illustrates an example top image and an example main stitched image.

FIG. 14 illustrates example top image I-Top and stitched image 620. Top image I-Top may be captured by top camera 212T, and stitched image 620 may result from a stitching process that stitches or combines left or right images (e.g., images I-R1 through I-Rn) together. In the example of FIG. 14, stitched image 620 includes images I-1, I-2, and I-3, which are stitched together to form stitched image 620. In particular embodiments, after images from cameras 212 are stitched together to form stitched image 620, top image I-Top from top camera 212T may be stitched or added to an upper portion 610U of stitched image 620. Similarly, in particular embodiments, an image from a bottom camera may be stitched or added to a bottom portion of stitched image 620. In particular embodiments, adding a top or bottom image to stitched image 620 may provide an added view to accommodate stitched image 620 that may not cover a ±90° vertical FOV. As an example and not by way of limitation, left images I-L1 through I-Ln illustrated in the example of FIG. 8 may be stitched together to form stitched image 620 with a vertical extent corresponding to $FOV_V$ of cameras 212. For example, stitched image 620 may represent a 360° horizontal panoramic view around camera system 210, and the panoramic view may cover a ±70° vertical range (corresponding to $FOV_V=140°$) with respect to a horizontal plane of camera system 210. After stitched image 620 is formed, top image I-Top may be stitched to a top portion of stitched image 620, thereby forming an image with a 360° panoramic view having a vertical extent with a range of approximately −70° to approximately +90°. Additionally, a bottom image may also be stitched to a bottom portion of stitched image 620, thereby forming an image that extends in all directions (e.g., covers a full 360° horizontal view that extends vertically in a range from approximately −90° to approximately +90°, where −90° represents looking straight down and +90° represents looking straight up). Although this disclosure describes and illustrates particular stitched images having particular horizontal and vertical extents, this disclosure contemplates any suitable stitched images having any suitable horizontal and vertical extents.

In particular embodiments, portions of top image I-Top may overlap with or correspond to portions of stitched image 620. Furthermore, particular portions of top image I-Top may be correlated with particular images (e.g., images I-1, I-2, I-3, etc.) based on a known configuration of cameras 212 of camera 210 as well as a known configuration of top camera 212T. As an example and not by way of limitation, each region of top image I-Top bordered by two adjacent seam lines 617 (e.g., hatched region 619) may correspond to a particular image of stitched image 620. In the example of FIG. 14, hatched region 619 of image I-Top may correspond to image I-2 captured by a particular camera 212 of camera system 210. A correspondence between images that make up stitched image 620 and portions of top image I-Top may be based on a configuration or orientation 214 of cameras 212 and a configuration of top camera 212T. In particular embodiments, seam lines 617 in image I-Top may correspond to seams 617M of stitched image 620, where seams 617M may represent a border between adjacent discrete images that form stitched image 620. As another example and not by way of limitation, center lines 618 may correspond to an approximate center 618M of discrete images of stitched image 620. In particular embodiments, lines 617 and 618 may represent estimated locations for seams 617M and centers 618M, respectively, before top image I-Top is processed or optimized for stitching to stitched image 620.

In particular embodiments, upper portion 610U of stitched image 620 may represent an area of stitched image 620 that overlaps outer annular region 610T of top image I-Top. For example, stitched image 620 may correspond to a $FOV_V$ that covers for example ±70° with respect to a horizontal orientation 214, and top image I-Top may correspond to an image that extends from a vertical direction (e.g., +90° latitude) to a latitude of +60°. The outer solid black circle of image I-Top may correspond to a latitude of +60°, and the smaller dashed circle 610E of image I-Top may correspond to a latitude of +70°. Overlap areas 610U and 610T may correspond to a 10° overlap (e.g., from latitude +60° to latitude +70°) between image I-Top and stitched image 620. In particular embodiments, an algorithm to stitch top image I-Top to stitched image 620 may include searching for features, determining pairs of corresponding feature points that are located in overlap areas 610U and 610T, as described above, and using those pairs of corresponding feature points to stitch image I-Top' with stitched image 620 as described below. Although this disclosure describes and illustrates particular top and stitched images having particular portions that correspond to or overlap with one another, this disclosure contemplates any suitable top and stitched images having any suitable portions that correspond to or overlap with one another.

Figure 15:
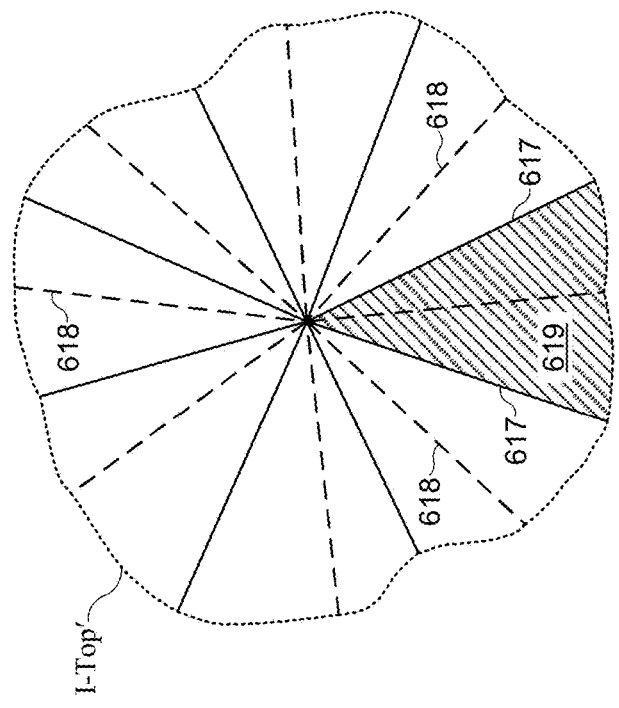
FIG. 15 illustrates the example top image from FIG. 14 after processing.

FIG. 15 illustrates the example top image from FIG. 14 after processing. In particular embodiments, prior to being added to stitched image 620, smaller dashed circle 610E of top image I-Top may be processed, transformed, or optimized to form processed image I-Top', which is then stitched or added to stitched image 620. In particular embodiments, processing steps applied to smaller dashed circle 610E of top image I-Top may include rotating or moving lines 617 or 618, or warping smaller dashed circle 610E of top image I-Top so that processed image I-Top' matches or blends with stitched image 620. In particular embodiments, a single processed image I-Top' may be used with the respective stitched images 620 that correspond to the left and right views or eyes. As an example and not by way of limitation, overlap area 610T of top image I-Top may be cropped prior to the transformation process. In particular embodiments, processed image I-Top' may be added to a stitched image representing a left-eye view and to a stitched image representing a right-eye view. In particular embodiments, smaller dashed circle 610E of top image I-Top may undergo two processing routines to generate separate left and right processed top images based on the stitched image that corresponds to a left-eye and right-eye view, respectively. As an example and not by way of limitation, the left processed top image may be added to the stitched image representing a left-eye view and the right processed image may be added to the stitched image representing a right-eye view.

In particular embodiments, processing of smaller dashed circle 610E of top image I-Top to generate processed image I-Top' may include detecting pairs of corresponding feature points in overlap areas 610T and 610U, as described above. As an example and not by way of limitation, features located near where seam lines 617 intersect an outer edge of image I-Top may be detected. One or more feature points of the detected features may be matched to corresponding feature points from stitched image 620, and based on the matching between corresponding pairs of feature points, offsets of smaller dashed circle 610E of image I-Top with respect to stitched image 620 may be calculated. In particular embodiments, in the case where no corresponding pairs of feature points are detected, feature points may be determined based on camera geometry, or camera calibration may be used to determine the processing performed on smaller dashed circle 610E of top image I-Top.

In particular embodiments, a radial warp around a center of top image I-Top may be determined such that the center position center of top image I-Top remains fixed. Additionally, based on a determined radial warp, seam lines 617 may be rotated to intersect locations where seams 617M of stitched image 616 end, and center lines 618 may be rotated to match any yaw adjustments performed during stitching the discrete images to generate stitched image 620. As an example and not by way of limitation, if one of the discrete images (e.g., image I-1, I-2, or I-3) forming stitched image 620 underwent a yaw adjustment of +2°, then a +2° rotation may be applied to a corresponding center line 618.

In particular embodiments, one or more portions of the outer edge of smaller dashed circle 610E of image I-Top' may be pulled out or pulled in to match stitched image 620. As an example and not by way of limitation, locations where seam lines 617 or center lines 618 intersect the outer edge of smaller dashed circle 610E of image I-Top may be pulled out or pulled in to match a corresponding region of stitched image 620. As an example and not by way of limitation, the outer edge of smaller dashed circle 610E of image I-Top may be pulled out or pulled in by increasing or decreasing, respectively, the length of seam lines 617 or center lines 618 as appropriate. In particular embodiments, processed image I-Top' may be saved separately as a cap image, or processed image I-Top' may be integrated into stitched image 620. As an example and not by way of limitation, a polar-to-rectilinear transform may be applied to processed image I-Top', and the processed image I-Top' may then be blended with stitched image 620, as described below.

In particular embodiments, seams 617M where the discrete images are stitched together to form stitched image 620 may be "blended" using a gradient blend. As an example and not by way of limitation, the luminance or brightness may have a gradient along a direction approaching seams 617M. For example, the brightness may decrease moving toward seams 617M from either lateral direction. An intersection of stitched image 620 and the outer edge of processed image I-Top' may be blended in a similar fashion. As an example and not by way of limitation, the brightness of the intersection between stitched image 620 and the processed image I-Top' may have a gradient proportional to the scale of stitched image 620, such that the blending is smooth at high latitudes.

The blending of the discrete images may occur within the overlap areas that encompass seams 617M. Furthermore, the blending may occur along a non-linear path to reduce visual discontinuities from the blending path. In particular embodiments, the blending algorithm may explore multiple candidate blending paths. An edge detection algorithm may be performed in area around an intersection of adjacent discrete images. If a candidate blending path hits a side edge of either image, the candidate blending path may follow the side edge in both directions until the candidate blending path is at the bottom edge of stitched image 620. If candidate blending paths intersect, the candidate paths may continue along their current directions. In particular embodiments, selection of the blending path from the candidate blending path may be based on selecting the only candidate blending path that reaches the bottom edge of stitched image 620 or if multiple candidate blending paths reach the bottom edge, the shortest candidate blending path is selected. In particular embodiments, the candidate blending path that is the least concave with relation to the center of the image that the candidate blending path is on. For portions that are "traced" the mask gradient should be 50% directly on trace line with small blur radius.

In particular embodiments, a Voronoi-type seam finder may be used for spatially stable stitching. This spatial stability may ensure that shared homographic matrices and blend data may be reused, which may reduce blend-edge flickering. The Voronoi-type seam finder may be used to further refine the search areas for the feature matcher, described above, thereby improving the accuracy of the homographic matrices of feature points confined within areas (e.g., overlap areas) that are most likely to be in the output image. This data may be fed back in real-time to the front-end processors to ignore image data that may not be used in the stitching of stitched image 620.

In particular embodiments, variation in the near-field depth of objects in the captured images may be a concern when generating stitched image 620. As described above, depth information (e.g., obtained from a depth sensor or triangulation of objects in images using the stereo image pairs) may be used to segregate the feature point matching based on the proximity of the feature points to the camera. Objects closer to the viewer or camera have a different geometry for stitching than objects that are further away. In particular embodiments, the depth variation of far-field objects may have a minimal effect on stitching quality, and therefore computing resources may be focused on accounting for near-field depth variation. In particular embodiments, stitching servers 230 may determine based on depth data whether an object in one or more images is located within an area where additional measures may be taken to improve stitching quality. As an example and not by way of limitation, calculation (or recalculation) of homography matrices may then be triggered in response to detecting objects located within a pre-determined threshold distance of a camera 212 or camera system 210.

In particular embodiments, the discrete images may be partitioned into multiple portions that are stitched and blended separately or near-field objects may be prioritized since these objects may have more visible stitching errors than far-field objects. As an example and not by way of limitation, near-field objects may be segregated from the far-field objects and stitched separately. In particular embodiments, the segregated near-field objects may be masked onto stitched image 620 with the far-field objects by placing the near-field objects over the far-field objects using a binary mask. Near-field objects may look very different to the cameras observing the same spot on the near-field object. In particular embodiments, the stitching server may choose to use one of the adjacent images to stitch the object in the overlap areas. As an example and not by way of limitation, a seam finder (e.g., Voronoi-type) may be used to stitch the near-field object from the image containing the majority of the near-field object's area. In particular embodiments, a non-uniform warp may be used to combine the homography matrix for the near-field object with the homography matrix for the far-field object. A mesh-based warp, for example, may transition between the two homography matrices at the edge between the near-field and far-field objects for stitching of both foreground and background of stitched image 620.

Homography matrices may change significantly when objects move from far-field to near-field. In particular embodiments, calculation of homography matrices may be performed on a separate computing thread from the stitching process. As an example and not by way of limitation, one computing thread may perform stitching of the discrete images, and another computing thread may analyze the discrete images for homography data and provide updates to a shared storage. The remainder of cases may be managed by using calibration data or using the last available homography matrices. In particular embodiments, calculating the homography matrices or the stitching process may be accelerated using a graphical-processing unit (GPU). As an example and not by way of limitation, the central-processing unit (CPU) of the system may be used to calculate the homography matrices and the GPU may be used to distort and blend the discrete images.

In particular embodiments, one or more adjustments specific to stitching for stereoscopic video may be performed. In particular embodiments, the pairs of corresponding feature points from stitched images 620 corresponding to the left-eye and right-eye views may be projected onto a 3-D spherical projection space. In particular embodiments, there may be a difference between the starting point for the left-eye view and the right-eye view. This difference may be corrected through the initial condition that the first camera position is used as a start position and the first camera has a yaw of zero. The remaining cameras may be adjusted based on these initial conditions.

In particular embodiments, stitched images 620 corresponding to the left-eye view and the right-eye view may be performed using shared homography matrices. The stitching process calculating the adjustments to generate stitched image 620 corresponding to the left-eye view may communicate with the stitching process calculating the adjustments to generate stitched image 620 corresponding to the right-eye view to ensure the overall homographies and image adjustments are consistent between the left-eye view and the right-eye view. Furthermore, image parameters or exposure correction should be consistent within a reasonable range between the left-eye view and the right-eye view. In particular embodiments, stereoscopic video may have frames that are time-synchronized between left-eye view and right-eye views.

In particular embodiments, generating stitched images 620 for video may use a look-ahead approach. As an example and not by way of limitation, for a current frame, the stitching adjustments (e.g., homography matrices) may be calculated for the current frame and some pre-determined number of subsequent frames in the future. In particular embodiments, a full set of stitch parameters is calculated in response to detecting a substantive change in a pair of corresponding feature points (e.g., movement of an object from far-field to near-field) occurring in the future frames. Furthermore, a change flag may be set that causes the stitch parameters to be interpolated (e.g., sine easing) to the newly calculated stitching parameters, such that the stitch smoothly switches to deal with the change in the scene. The determination of the pre-determined number of subsequent frames should incorporate the time needed to calculate the new stitching adjustments.

Figure 16:
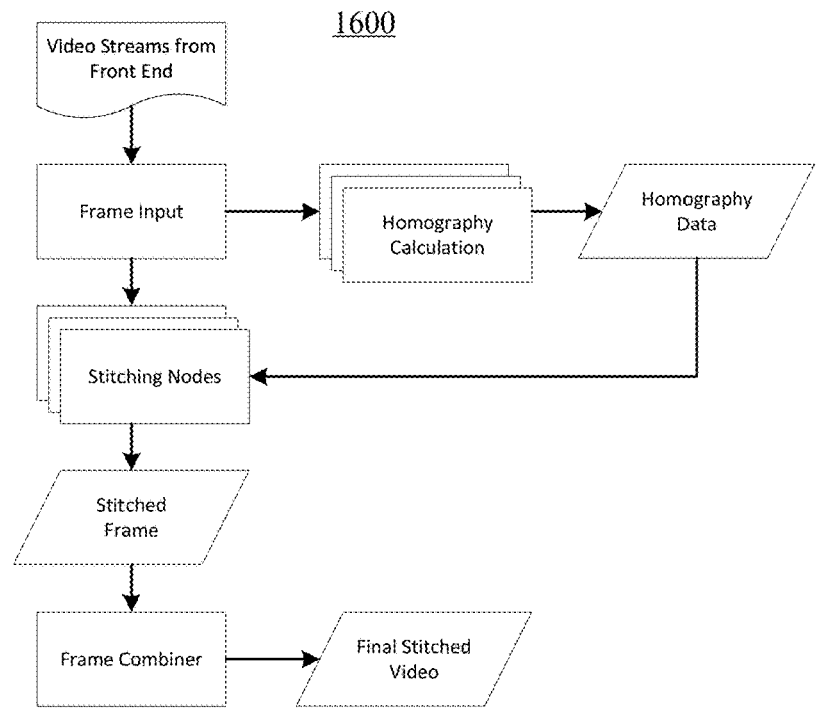
FIGS. 16 and 17 illustrate example methods for stitching discrete images.
Figure 17:
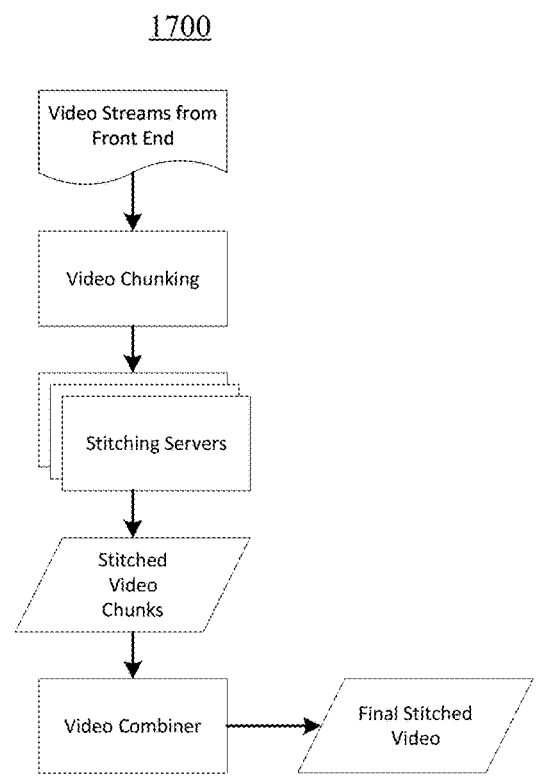

FIGS. 16 and 17 illustrate example methods 1600 and 1700, respectively, for stitching discrete images. In particular embodiments, a method 1600 for stitching of real-time 360° 3-D video is to distribute the stitching of individual frames across multiple stitching servers, as illustrated in the example of FIG. 16. The homography matrix management may be done either per-stitching server, or stitching servers may share homography matrices using a central homography server. In particular embodiments, the central homography server may task individual server nodes to calculate homography matrices or stitch images. The number of servers used to complete stitched images may be proportional to the desired frame rate or the throughput of the stitching servers. As an example and not by way of limitation, for a single stitching server with a 1 frame per second (FPS) throughput, 30 stitching servers may be used to produce a 30 FPS stitched video.

In particular embodiments, another method 1700 for stitching of real-time 360° 3-D video is to distribute the stitching of segments of video (e.g., video chunks, or multiple frames) across multiple stitching servers, as illustrated in the example of FIG. 17. Multiple stitching servers may concurrently handle the stitching of the video, where each stitching server generates a stitched video segment corresponding to the received segment of video. A collection server or video combiner may receive the individual video segments from the stitching servers and merge them back in order to produce the stitched video.

In particular embodiments, the discrete images may be manually stitched to generate a stitched image or video. The feature extraction and determination of pairs of corresponding feature points may be bypassed and manually selected pairs of corresponding feature point provided. From this point the remainder of the stitching process may be performed as described above.

Figure 18:
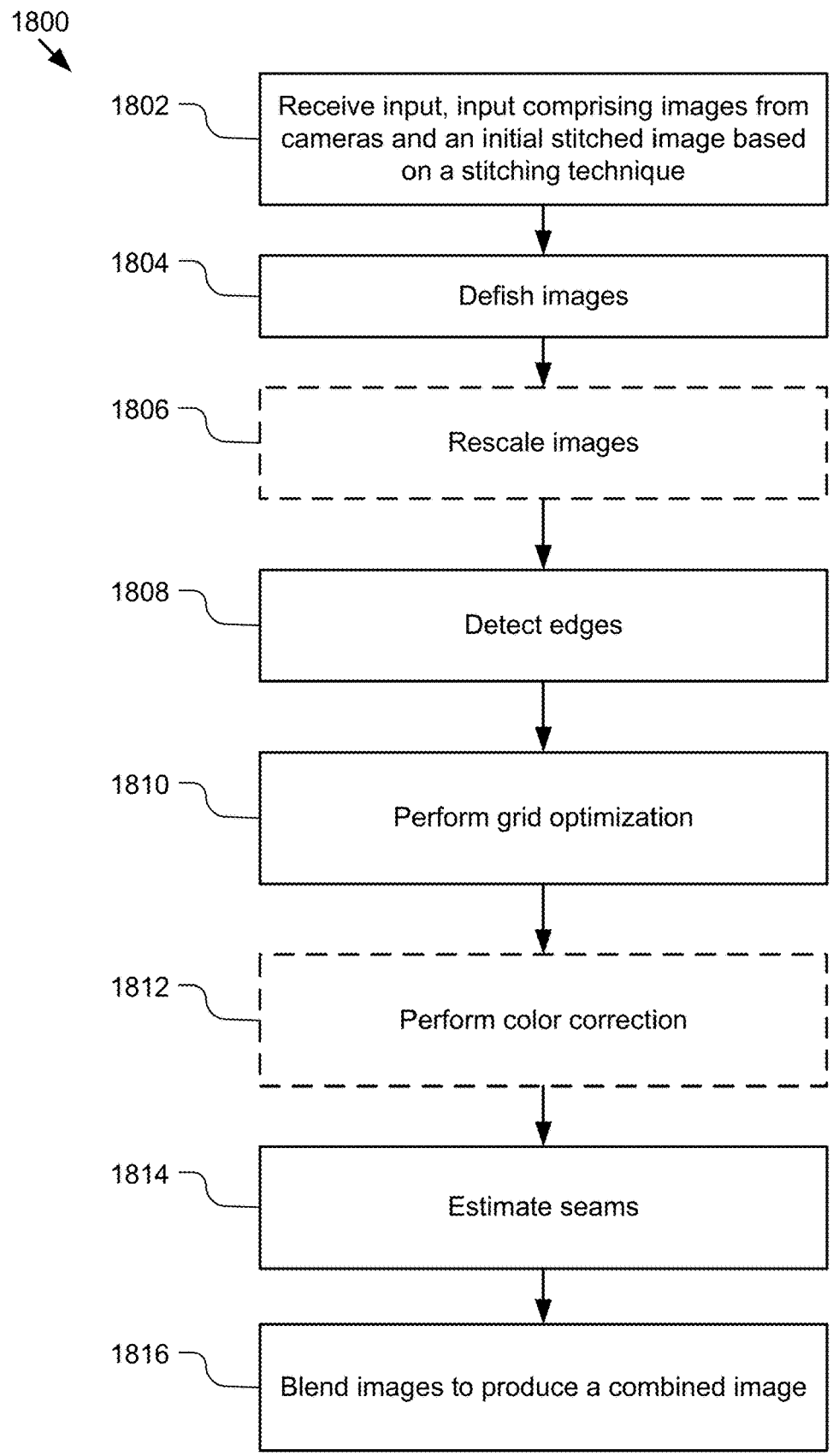
FIG. 18 is a flowchart of an example method for stitching images based on grid optimization.

FIG. 18 illustrates an example method 1800 for stitching at least two images. The stitching techniques described herein can be done on both the images simultaneously, or just on one, keeping the other constant. The method 1800 may begin at step 1802, where an input is received. The input may include a number of electronic images. The images may be received from a number of cameras, such as from cameras 212, or a single camera. As an example, the images may include images 2102-2116 as shown in FIG. 21. In particular embodiments, the cameras capturing such images may include a first camera 212 having a first orientation 214 and a second camera 212 having a second orientation 214, and the received images may include a first image from the first camera 212 and a second image from the second camera 212. The input may also include an initial stitched panoramic image (see for example, FIG. 22) that may be generated using an initial stitching technique, such as the stitching techniques described above and illustrated in FIGS. 18-26. As discussed earlier, the initial stitched image may include image artifacts, such as image artifacts 2202-2210 as shown for example in FIG. 22. One technical advantage of the image stitching techniques discussed herein is to produce a seamless and smooth stitched image having fewer image artifacts, such as for example the image shown in FIG. 27. In particular embodiments, an initial stitched image may be used during the grid optimization step 1810 to ensure that the grid points do not move too much or to make sure that the final stitched/combined image is not too different from the initial stitched image.

At step 1804, the images are defished. Defishing an image may include removing distortion from a fisheye so it looks like a conventional rectilinear image. At step 1806, images may optionally be rescaled, for example to speed up the image stitching process and reduce the overall load on the system. In some embodiments, rescaling an image may include lowering the resolution of the image (e.g., 1920× 2180 to 2124×1868) or compressing the size of the image. Rescaling the image may also sometimes reduce noise effects during edge detection. At step 1808, image edge lines may be detected in each of the images, as shown for example in FIG. 23. In particular embodiments, gradient magnitudes obtained from Sobel filter is used for edge detection. Sometimes, instead of gradient magnitude, individual gradients in X and Y directions can be aligned separately. RGB colors or grayscale images can be used for aligning. Alternatively, only the features (e.g., SIFT/SURF/ORB, etc.) matches could be aligned. Other edge detectors, including for example and without limitation, Scharr, Laplacian, Roberts cross, Phase Stretch Transform (PST), Prewitt, Canny (thresholding with hysteresis) can also be used for image detection.

At step 1810, grid optimization is performed. Grid optimization may include dividing each of the images into grid points (see for example, FIGS. 24A-24F), where each grid point corresponds to a portion of each of the images, and recursively moving the grid points and corresponding portions of the images so as to minimize the difference between the normalized gradients of overlapping regions of images. As used herein, moving a grid point in an image also references moving the portion of the image corresponding to the grid point. In other words, one or more grid points of one or more images may move (in parallel or independently) to minimize the difference in edge lines between features in the overlapping region of the images (e.g., to minimize differences between a feature in the first image and a corresponding feature in the second image, where these features appear in the region of overlap of the two images). In order to maintain image quality, grid points in non-overlapping regions of the image may also be moved. In particular embodiments, a set of spring or smoothening constraints may be added that restrict the movement of grid points between two images or within the same image up to a certain threshold (discussed in further detail below).

Figure 23:
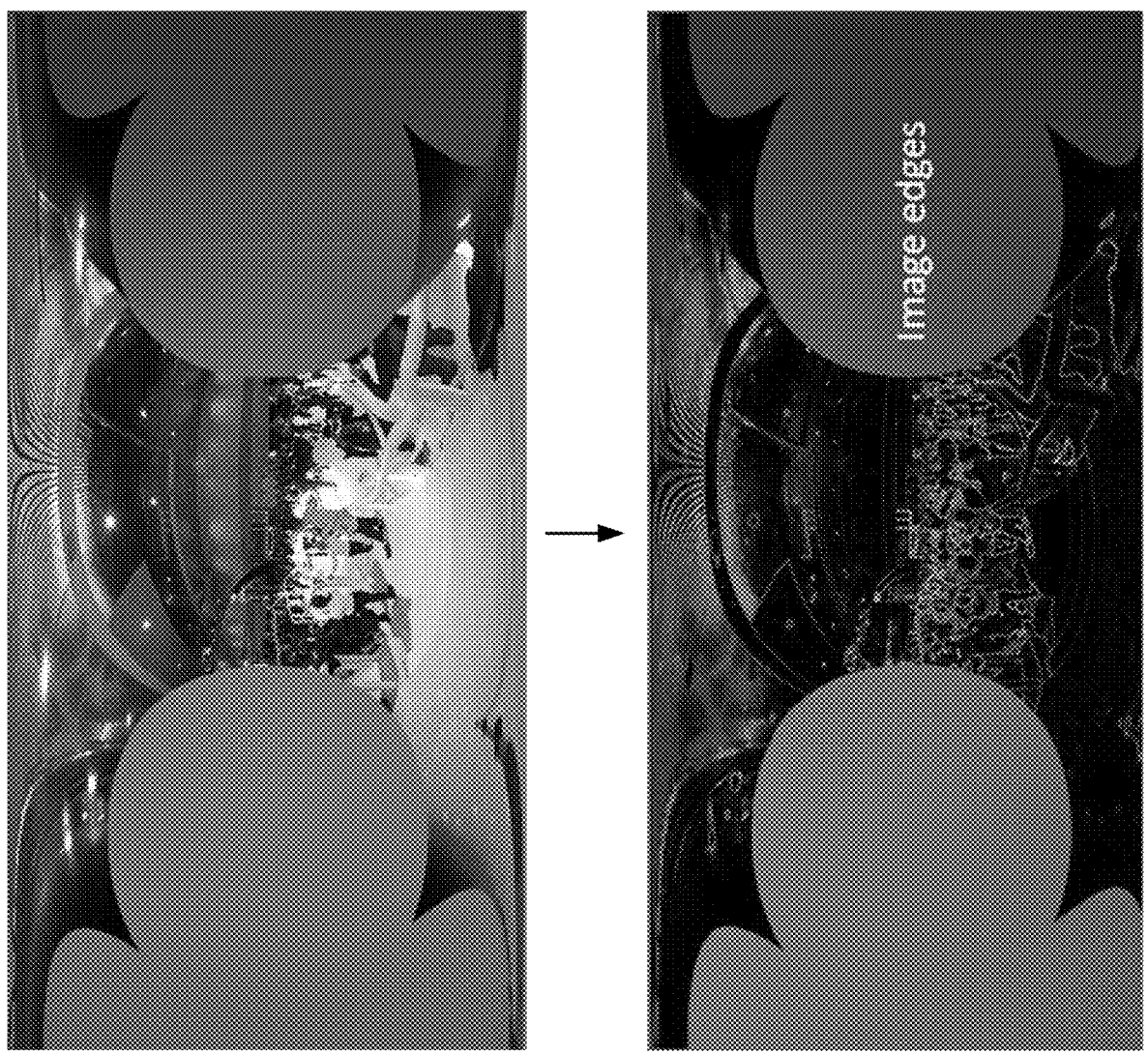
FIG. 23 illustrates example image edges or contrast lines obtained upon edge detection in an image.

Grid points and corresponding portions of the image(s) may be moved until the edges or edge lines of two images overlap with one another. As an example and in reference to FIG. 6, images I-6 and I-7 may be first processed to detect edges in the images (e.g., similar to one as shown in FIG. 23), then the two images may be divided into grid points (e.g., similar to one as shown in FIG. 24B), and the grid points of each of these images are moved. The images may be further divided into more grid points (e.g., similar to ones as shown in FIGS. 24C-F) and again grid points are moved from one position to another in each of the images until the edges of the overlapping regions 610$_{6-7}$ of the two images overlap with one another. Moving all the points together in one step can result in a very irregular mesh. For instance, if the grid points are moved all at once then the output image may look unnatural, distorted, and quite different from the original image. Therefore, a pyramid level technique may be used where the optimization (e.g., dividing image into grid regions and moving the grid points) may be done in multiple iterations or steps i.e., relatively coarser in the beginning (as shown for example in FIG. 24B) and gradually becoming finer (see for example, FIGS. 24C-F) at lower pyramid levels. In the higher pyramid levels, the algorithm searches in a larger window, which reduces as the pyramid level decreases. New grid points may be added as the pyramid level decreases (see for example, FIGS. 24C-F). The new grid point's positions may be interpolated from the positions of the previous points, and the grid may then be optimized again.

In particular embodiments, each point in the grid region of an image may be moved to minimize the difference between the normalized gradients of overlapping images in a small local area surrounding the point. The process may move down one level in the pyramid, where new grid points may be added and their positions may be interpolated using the original grid points. Each grid point's local window, and thus the maximum search distance in which to move that grid point, may decrease as the pyramid level decreases.

Searching for overlapping feature points can occur in grid cells at the same level (linear search) or in cells at a different pyramid level (exponential search). In particular embodiments, linear search may be used. In particular embodiments, exponential search may be used. Alternatively, particular embodiments keep the search area constant and search within that region for different pyramid levels of the image (i.e., scaled up or scaled down versions). Thus, in particular embodiments, the search can be performed with constant region and max step size on minmap of the image.

Figure 19:
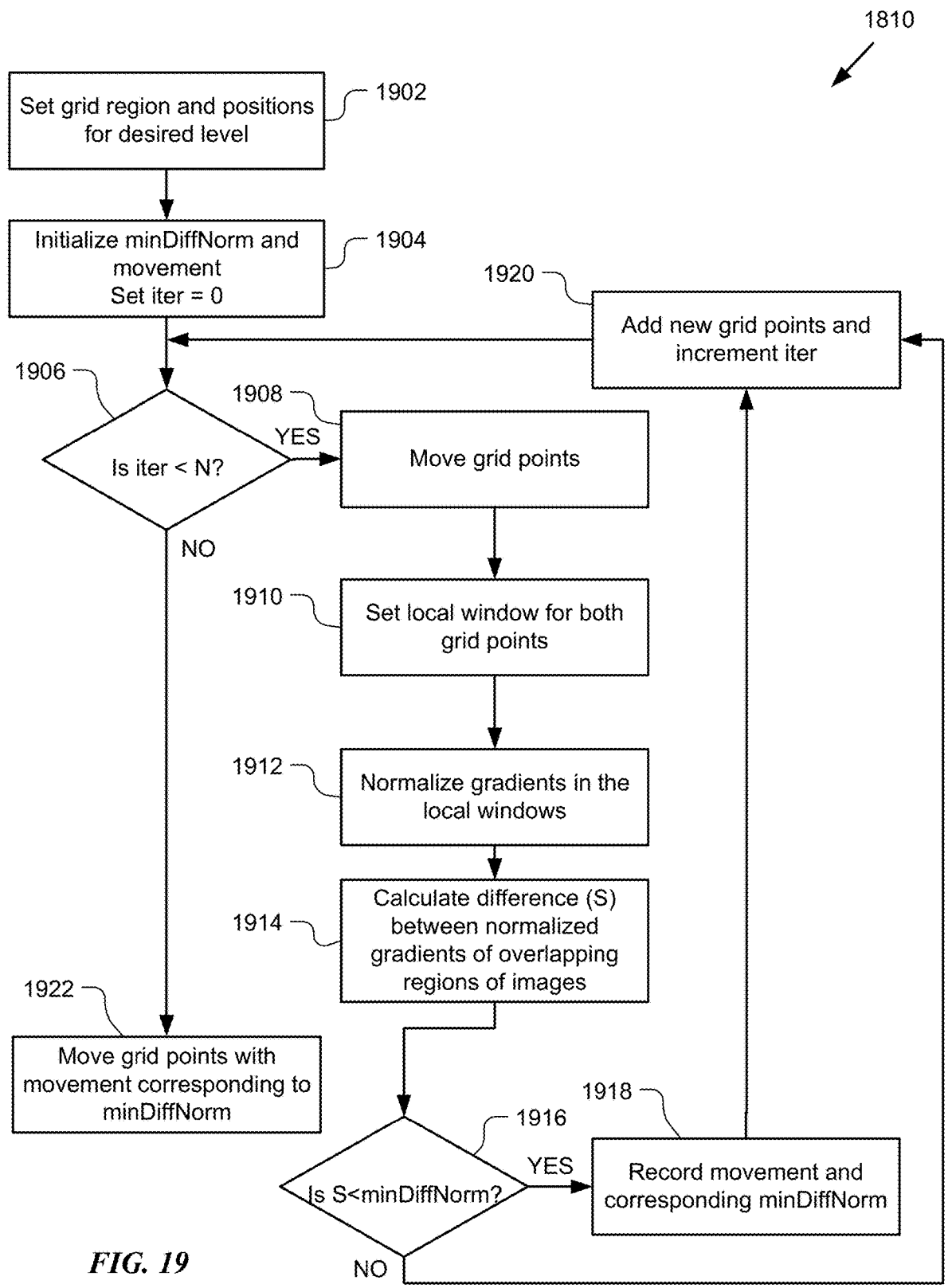
FIG. 19 is a flowchart of an example method illustrating steps involved in grid optimization.

FIG. 19 illustrates an example method of grid optimization. In particular embodiments, steps 1902-1922 may be performed as part of grid optimization step 1810 and prior to proceeding to step 1812 of FIG. 18.

The method of FIG. 19 may begin at step 1902 where a grid region and positions are set for each of the images at a desired level. The grid region for each image to be optimized may be based on its neighbor and its neighbors' placement on the sphere. In particular embodiments, the area around the seam line between two images is the one which needs to be modified the most. An initial seam estimation may be performed on the images to get an idea of where the seams are located. In particular embodiments, the grid region is set based on the locations of the seam lines, keeping the seam line in the middle of the region. The number of points in the grid region is determined by the level of the pyramid set. At step 1904, a minimum difference normal (minDiffNorm) value is initialized and iteration is set to zero. The minDiffNorm is the minimum difference or error between normalized gradients of overlapping regions of two images in order to be considered suitable for stitching. In particular embodiments, at step 1906 a determination is made whether the current iteration is less than a particular number N. N may be total possible number of movement combinations or iterations. For example, N may be 5. If the result of the determination is affirmative, then at step 1908, the grid points are moved. The grid points may be moved between two images simultaneously or grid points may be moved in just one image while keeping the other constant. At step 1910, a local window may be set for each grid point and then at step 1912, gradients in the local windows are normalized. At step 1914, difference (S) between normalized gradients of overlapping regions of images is calculated. At step 1916, a determination is made whether the difference S is less than the minDiffNorm value that was initialized in step 1904. If the result of the determination is affirmative, then at step 1918, the movement and corresponding minDiffNorm is recorded and at step 1922, the grid points are moved corresponding to the minDiffNorm value and the method ends. If, on the other hand, the difference S is greater than the minDiffNorm value, then at step 1920, new grid points are added in each image (see for example, FIG. 24B to FIG. 24C) and iteration is incremented (e.g., from iter=0 to 1) and the steps 1906-1916 and 1920 are repeated until the edges or edge lines of two images overlap with one another or the difference between the two images is within or less than the minDiffNorm.

Figure 24A:
FIGS. 24A-24H graphically illustrate an example grid optimization process for an example image.
Figure 24B:
Figure 24C:
Figure 24D:
Figure 24E:
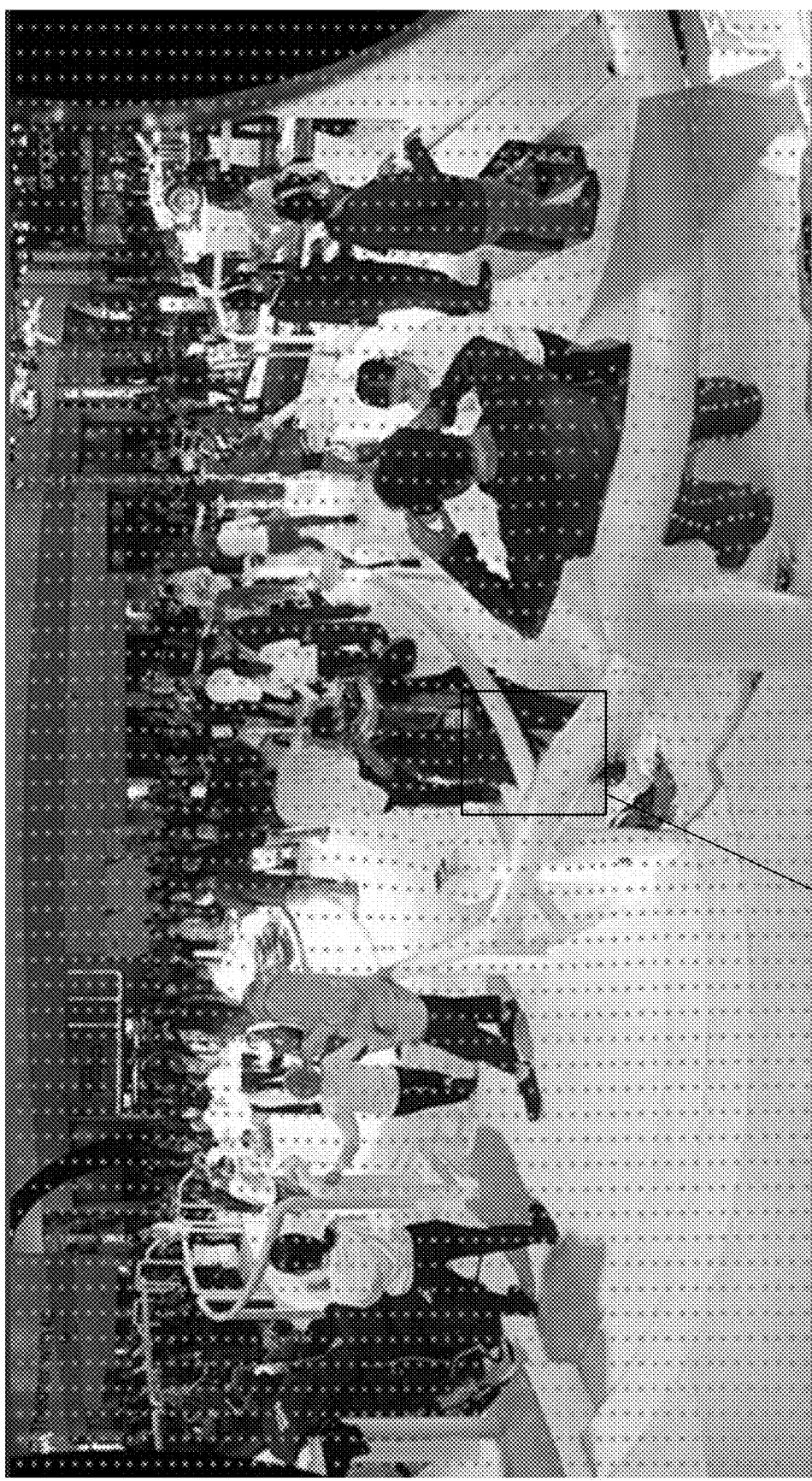
Figure 24F:

FIGS. 24A-H show an example representation of the grid optimization method of FIG. 19. FIG. 24A shows an initial set of images to be stitched. FIG. 24B shows an initial grid applied to the images. While FIG. 24B shows the grid initially being arranged in a rectilinear shape, this disclosure contemplates any suitable shape for the initial grid. FIGS. 24C-F show the result of each iteration (i.e., pyramid level) of the grid optimization process. As shown in FIGS. 24D-F, grid points, such as grid points in area 2410, may be moved in an iteration, along with the portion of the image corresponding to the grid point. Once moved, the grid no longer has its same shape, e.g., the initially rectilinear grid of FIG. 24B is no longer so in FIGS. 24C-F. As shown in FIGS. 24E-F, grid points added in additional iterations of the optimization method (i.e., lower levels of the pyramid) may be added between neighboring grid points on a line between those points. Those grid points, along with the existing grid points, may be moved during future iterations of the optimization method, such that the grid point and its neighbors are no longer arranged in a line. This disclosure contemplates the grid points may be introduced in, and subsequently moved from, any suitable geometric configuration.

Figure 24H:
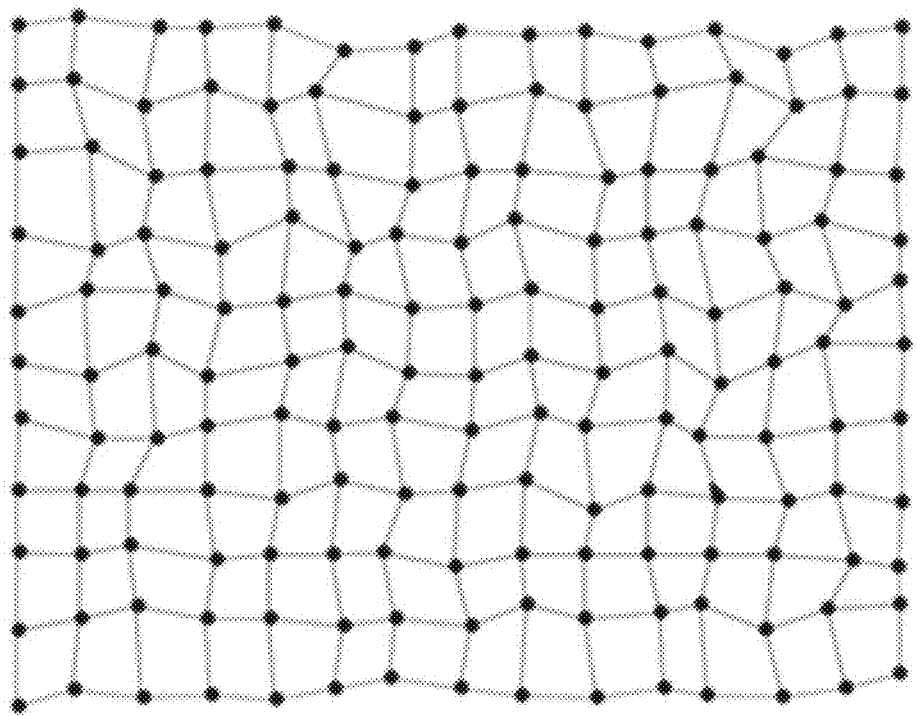
Figure 24G:
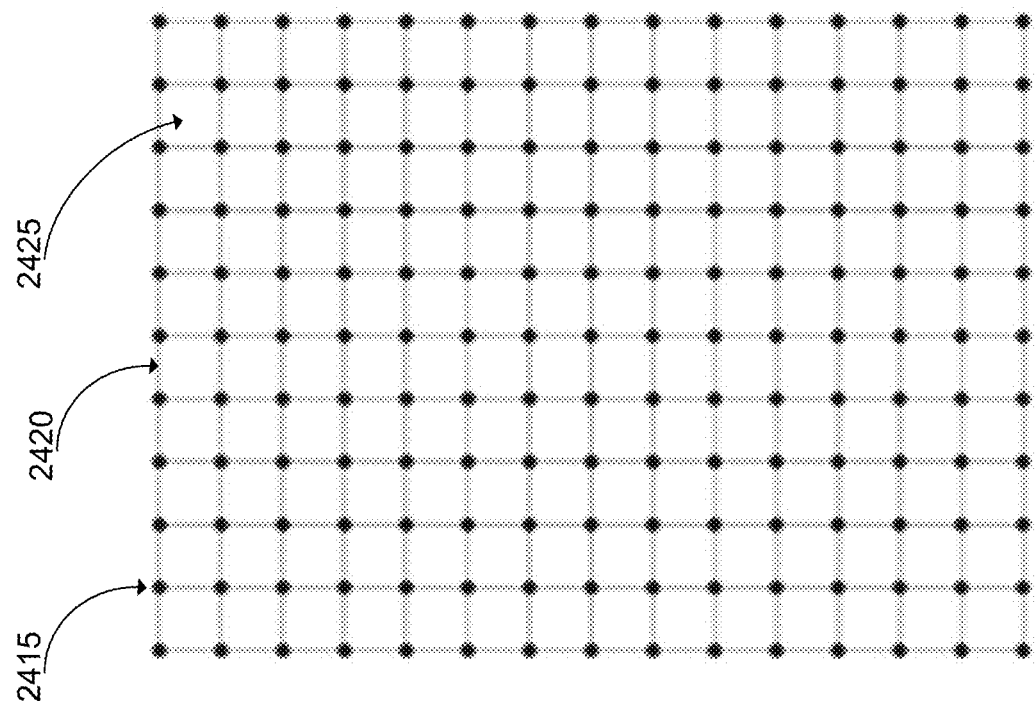
Figure 25:
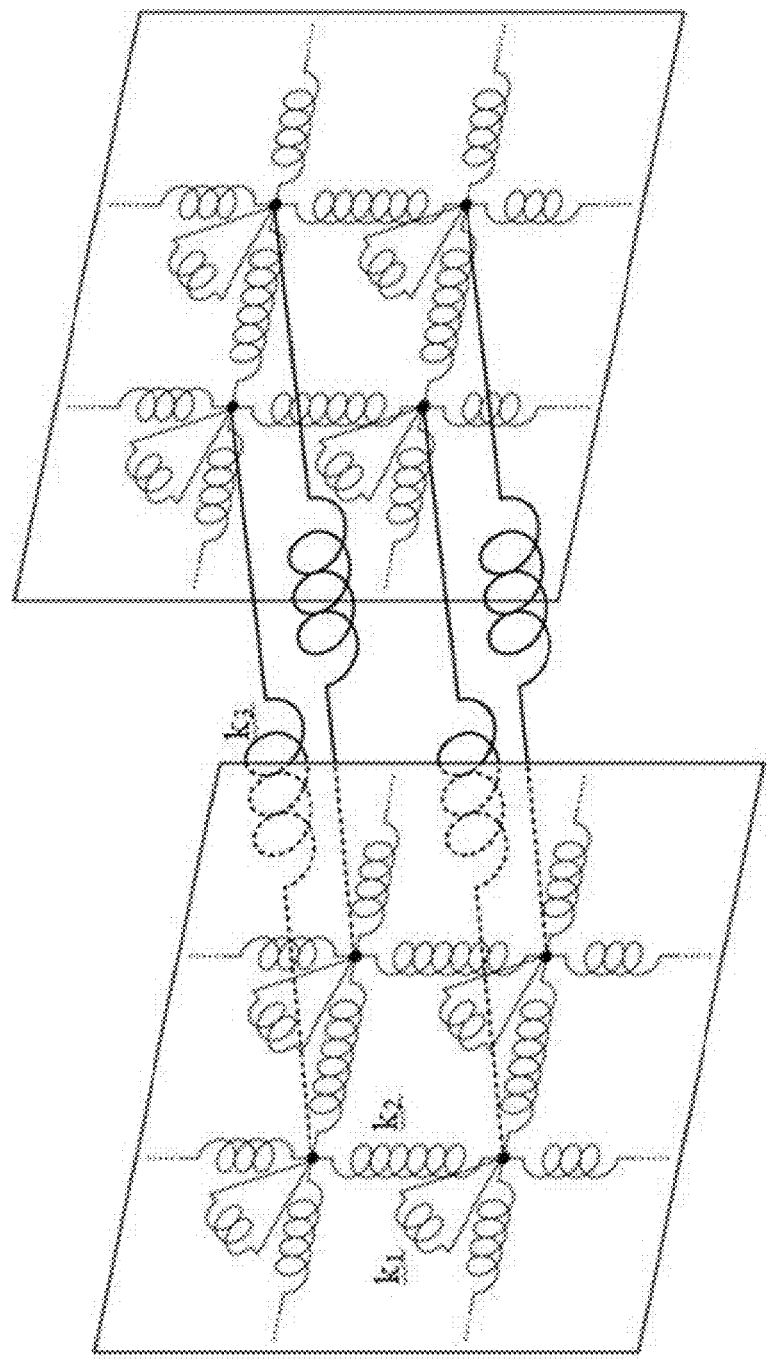
FIG. 25 illustrates smoothening or spring constraints for controlling movements of grid points in images.
Figure 26:
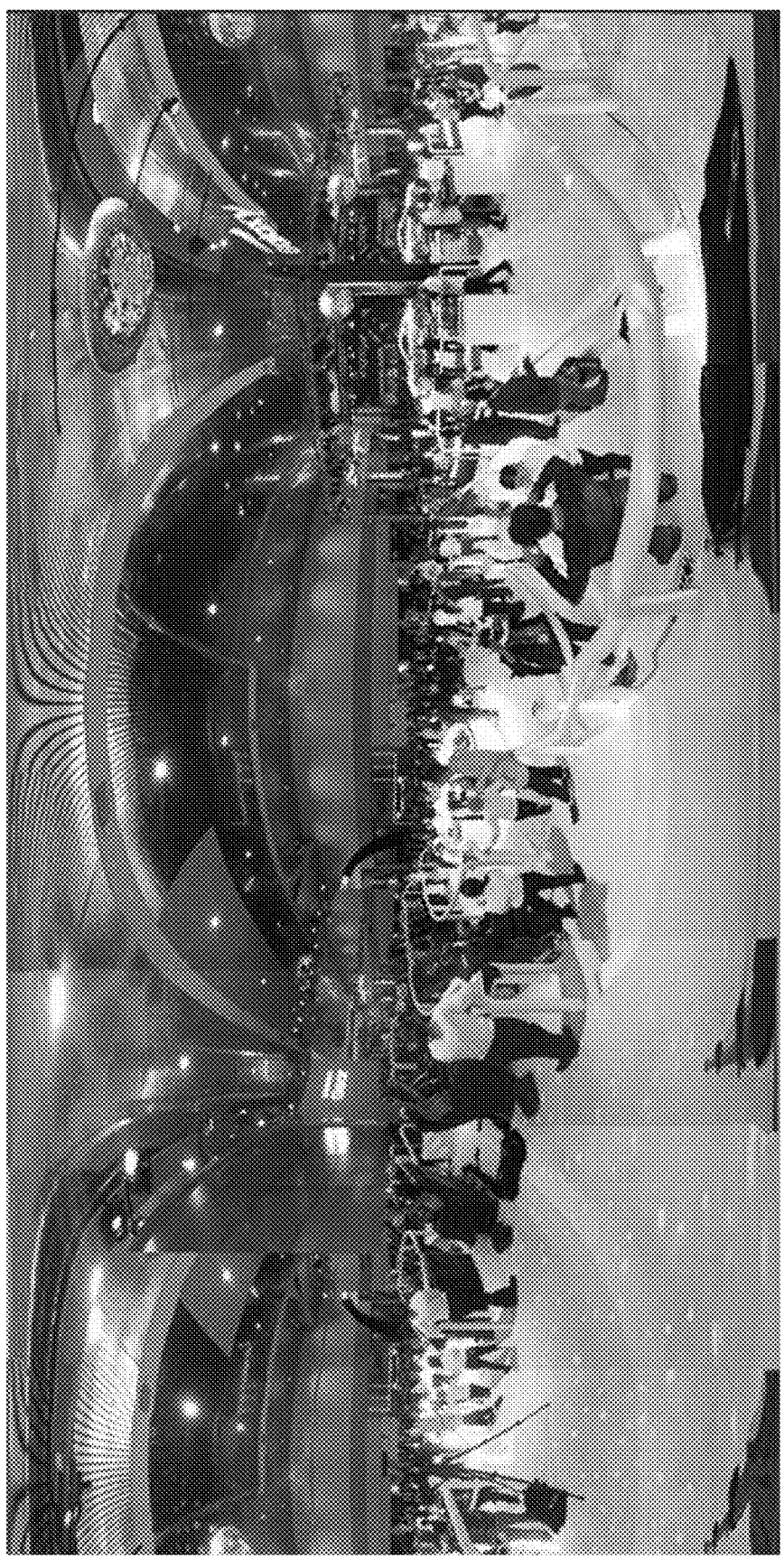
FIG. 26 illustrates an example seam estimation.

As shown in FIGS. 24G-H, after one or more iterations of the optimization method of FIG. 19, the final grid (and thus, the corresponding portions of the images) has a different shape than the initial grid. FIG. 24H shows an example final grid after grid points and the corresponding portions of images are moved from their initial position (FIG. 24G) during one iteration of the optimization method of FIG. 19. As shown in FIGS. 24A-H, some grid points may be moved while other are not during an iteration or during the entire optimization process of FIG. 19. Additional grid points that may be added after one iteration are not shown in FIGS. 24G-H. FIGS. 24G-H may correspond, for example, to a grid in a region of overlap between two images being stitched.

Particular embodiments may repeat one or more steps of the method of FIG. 19, where appropriate. Although this disclosure describes and illustrates particular steps of the method of FIG. 19 as occurring in a particular order, this disclosure contemplates any suitable steps of the method of FIG. 19 occurring in any suitable order. Moreover, although this disclosure describes and illustrates an example method for grid optimization, including the particular steps of the method of FIG. 19, this disclosure contemplates any suitable method for grid optimization, including any suitable steps, which may include all or only some of the steps of the method of FIG. 19, where appropriate. Furthermore, although this disclosure describes and illustrates particular components, devices, or systems carrying out particular steps of the method of FIG. 19, this disclosure contemplates any suitable combination of any suitable components, devices, or systems carrying out any suitable steps of the method of FIG. 19. For example, while the steps in FIG. 19 may be performed by a central processing unit (CPU), any combination of those steps may be performed by any other computing system, including, e.g., a graphical processing unit (GPU), as discussed later below.

In particular embodiments, limiting the movement of each grid point in an iteration prevents artifacts from being introduced to the image as a result of too much movement. In particular embodiments, one or more spring or smoothening constraints may be added that restrict the movement of grid points between two images or within the same image up to a certain threshold limit. This can be thought of as minimizing the total energy of a spring system, with springs having, for example, 1) a spring constant k1, of a grid point from its origin position to its modified position, to take into consideration how much the point moves, 2) a spring constant k2, from the modified position of a grid point to the position of its neighboring grid points in that image, to take into consideration the relative displacements of points in the image, and 3) a spring constant k3, from the modified position of a grid point to a neighboring grid point in the neighboring image. In particular embodiments implementing a spring model, smoothening the displacement of grid points at an iteration (i.e., at a particular level in the pyramid) is then equivalent to a spring relation problem with spring structure as shown, for example, in FIG. 25. This can be done pairwise for all images.

As one example model of spring constraints, let the images being merged have M×N grid points each. Let the optimized displacements of the points for the first image be Pij and for the second image be Qij. Let pij and qij be the positions of points with the least energy. Let D1 and D2 be the original displacement vector of the points in the x and y direction respectively. Then, $$P_{ij}-Q_{ij}+q_{ij}-d_{ij}p_{ij}=0$$

$$\Rightarrow d_{ij}=P_{ij}-Q_{ij}-p_{ij}+q_{ij}$$

$$p_{ij}+r_{Aij}-p_{ij+1}-D_1=0$$

$$\Rightarrow r_{Aij}=D_1-p_{ij}+p_{ij+1}$$

Similarly, for the second image, $r_{Bij}=D_1-q_{ij}+q_{ij+1}$ $$p_{ij}+s_{Aij}-p_{i+1j}-D_2=0$$

$$\Rightarrow s_{Aij}=D_2-p_{ij}+p_{i+1j}$$

Similarly, for the second image, $s_{Bij}=D_2-q_{ij}+q_{i+1j}$

The total energy of the system can be written as:

$$\frac{1}{2}k_1\sum_{i=0}^{M-1}\sum_{j=0}^{N-1}p_{ij}^2+\frac{1}{2}k_1\sum_{i=0}^{M-1}\sum_{j=0}^{N-1}q_{ij}^2+$$

$$\frac{1}{2}k_3\sum_{i=0}^{M-1}\sum_{j=0}^{N-1}d_{ij}^2+\frac{1}{2}k_2\left\{\sum_{i=0}^{M-1}\sum_{j=0}^{N-2}r_{Aij}^2+\sum_{i=0}^{M-1}\sum_{j=0}^{N-2}r_{Bij}^2\right\}+$$

$$\frac{1}{2}k_2\left\{\sum_{i=0}^{M-2}\sum_{j=0}^{N-1}s_{Aij}^2+\sum_{i=0}^{M-2}\sum_{j=0}^{N-1}s_{Bij}^2\right\}=$$

$$\frac{1}{2}k_1\sum_{i=0}^{M-1}\sum_{j=0}^{N-1}p_{ij}^2+\frac{1}{2}k_1\sum_{i=0}^{M-1}\sum_{j=0}^{N-1}q_{ij}^2+\frac{1}{2}k_3\sum_{i=0}^{M-1}\sum_{j=0}^{N-1}(P_{ij}-Q_{ij}-p_{ij}+q_{ij})^2+$$

$$\frac{1}{2}k_2\left\{\sum_{i=0}^{M-1}\sum_{j=0}^{N-2}(D_1-p_{ij}+p_{ij+1})^2+\sum_{i=0}^{M-1}\sum_{j=0}^{N-2}(D_1-q_{ij}+q_{ij+1})^2\right\}+$$

$$\frac{1}{2}k_2\left\{\sum_{i=0}^{M-2}\sum_{j=0}^{N-1}(D_2-p_{ij}+p_{i+1j})^2+\sum_{i=0}^{M-2}\sum_{j=0}^{N-1}(D_2-q_{ij}+q_{i+1j})^2\right\}$$

The total energy can also be written in matrix form as $x^TAx$, where $x=[p_{0\,0}, p_{0\,1}, \ldots, p_{0\,N-1}, p_{1\,0}, p_{1\,1}, \ldots, p_{1\,N-1}, \ldots, p_{M-1\,0}, p_{M-1\,1}, \ldots, p_{M-1\,N-1}, q_{0\,0}, q_{0\,1}, \ldots, q_{0\,N-1}, q_{1\,0}, q_{1\,1}, q_{1\,N-1}, \ldots, q_{M-1\,0}, q_{M-1\,1}, \ldots, q_{M-1\,N-1}, 1]^T=[r^T, 1]^T$, and A is a (MN+1×MN+1) symmetric positive definite matrix. Let $$A=\begin{bmatrix}A_{MN} & b \\ b^T & c\end{bmatrix},$$

where $A_{MN}$ is MN×MN symmetric matrix, then solution is $r=A_{MN}^{-1}b$.

At step 1812, color correction may optionally be performed on the images prior to seam estimation and blending. In particular embodiments, ensuring that images from all cameras have similar correction and white balance settings may result in better seam estimation and blending. For each image, the same image at different exposure settings (+1, 0, −1 exposure stops) may be fused together using standard image fusion techniques, where the weights for each exposure may be determined by contrast, saturation and well-exposedness. This may produce images with similar exposure setting which may then be easier to blend. The next step in color correction is to optimize for the images' exposure, vignette removal and white balance together as a panorama. The camera response curve is used for normalizing the color space for color corrections, vignette and exposures. Let the images $I_0, I_1, \ldots, I_{N-1}$ be applied an exposure offset of $\log_2(a_0), \log_2(a_1), \ldots, \log_2(a_{N-1})$. To solve for $a_0, a_1, a_{N-1}$, the pixel difference using the modified exposures need to be minimized at the overlapping regions. To minimize $x^T A x$, such that $\Pi_{i=0}^{N} x_i = 1$ where $x=[a_0, a_1, \ldots, a_{N-1}, 1]^T = [r^T, 1]^T$ and A is a (N+1×N+1) symmetric positive-semidefinite matrix:

Let $$A = \begin{bmatrix} A_N & b \\ b^T & c \end{bmatrix},$$

where $A_N$ is N×N symmetric matrix, then solution is $r = A_N^{-1} b$, normalized so that $\Pi_{i=0}^{N-1} r_i = 1$ Vignette and white balance correction can be performed in a similar way.

At step 1814, seam estimation may be performed to get a seamless stitch, e.g., without any ghosting. In particular embodiments, an energy map between two adjacent images may be calculated from the absolute difference of gradient magnitude between the images. For calculating the energy map, the energy at each pixel can be a weighted average of the neighboring pixels. The path from top to bottom with the least energy is considered as the seam line between the two images (see for example, FIG. 26). Alternatively, a weighted combination of seam finding algorithms can also be used. At every pixel, weights are given based on the distance of the point from the center of the image, gradient difference, etc. and the seam with minimum energy is chosen. Each image may contribute twice in the seam estimation process. The area between the two paths is considered to the seam mask for that image. It should be noted that the seam estimation is not limited to the process discussed here and other seams finding algorithms, such as graph-cut technique can also be used for seam estimation.

At step 1816, images may be blended to produce a combined or panoramic image, as shown for example in FIG. 27. Blending may be performed using multiband blending. Image pyramids may be built for images as well as the seam masks and each level of the pyramid may be blended independently. The resulting panorama is recovered from all the blended pyramid levels. In particular embodiments, blend width may be scaled to latitude values so that smooth blends can be achieved at higher latitudes. This keeps the blend width almost constant when the panorama is projected on the sphere. Let Ø be the latitude of a point along the seam line, d be the desired blend width when projected on the sphere. Then the blend width at the point should be $$\frac{d}{\cos(\phi) + \epsilon}.$$

Particular embodiments may repeat one or more steps of the method 1800 of FIG. 18, where appropriate. Although this disclosure describes and illustrates particular steps of the method of FIG. 18 as occurring in a particular order, this disclosure contemplates any suitable steps of the method of FIG. 18 occurring in any suitable order. Moreover, although this disclosure describes and illustrates an example method for stitching images based on grid optimization, including the particular steps of the method of FIG. 18, this disclosure contemplates any suitable method for stitching images based on grid optimization, including any suitable steps, which may include all, some, or none of the steps of the method of FIG. 18, where appropriate. Furthermore, although this disclosure describes and illustrates particular components, devices, or systems carrying out particular steps of the method of FIG. 18, this disclosure contemplates any suitable combination of any suitable components, devices, or systems carrying out any suitable steps of the method of FIG. 18. For example, while the steps in FIG. 18 may be performed by a central processing unit (CPU), any combination of those steps may be performed by any other computing system, including, e.g., a graphical processing unit (GPU) as discussed later below.

In particular embodiments, the grid optimization technique discussed herein can be applied to video stitching, i.e., to stitching image frames in a video. Optimizations may be performed multiple times during the video stitching. The frequency of optizmiation may depend on the time cost of single optimization. After each optimization, pixel movement may be recorded as a transform map. The transform map may be applied for subsequent frames until next optimization. Between two adjacent transform maps, the recorded pixel movement may be interpolated to make transition smooth.

In particular embodiments, the grid optimization technique discussed herein can be applied for stitching a top image. The top image with estimated image parameters may be placed on the optimized panorama (obtained after the blending step 1816). Grid optimization may be applied between the optimized panorama and the warped top image to stitch the top image.

In particular embodiments, the grid optimization discussed herein can be applied for 3D stitching. For a good 3D stitch, the vertical offset between left and right panoramas should be close to zero. The vertical offset for each grid point in the left and right images may be calculated by recording the y-axis movement in the pyramid search. The grid optimization should be applied to the adjacent pairs of both left and right panoramas together, with the constraint that the difference between the y-axis movements should be limited by the vertical offset, and that the difference between the x-axis movements should not exceed a constant EX,MAX (the maximum horizontal offset that can occur before a user sees double, i.e., two separate images rather than one 3D image). The seam estimation can be applied to the adjacent pairs of both left and right panoramas together to have a better 3D viewing experience.

Figure 20:
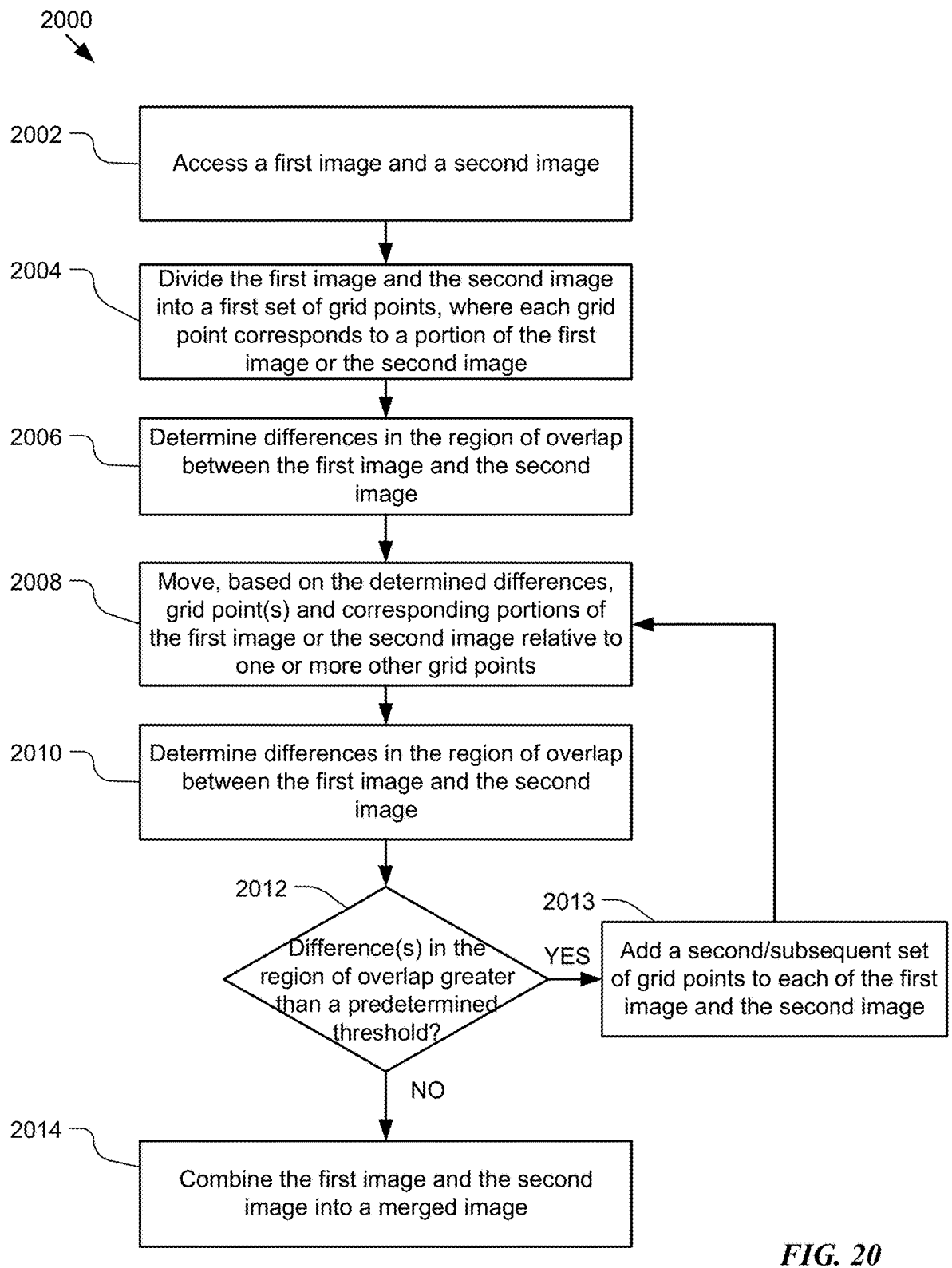
FIG. 20 a flowchart of another example method for stitching images based on grid optimization.

FIG. 20 illustrates another example method 2000 of stitching images based on grid optimization. The method 2000 may begin at step 2002, where a first image and a second image are accessed or received. In some embodiments, the first image is an image that may be received from a first camera 212 having a first orientation and the second image is an image that may be received from a second camera 212 having a second orientation. In some embodiments, the first and second images may be received from the same camera. In particular embodiments, at least part of the first image overlaps with at least part of the second image, or the first and the second images have an overlapping region in between. As an example, in reference to FIG. 6, the first and the second camera images may be I-6 and I-7, respectively, having an overlapping region $610_{6-7}$. In some embodiments, one or more of the first and second images may be rescaled, which may include lowering the resolution or compressing the size of the images to speed up the overall process and reduce system load, as discussed elsewhere herein.

At step 2004, each of the first image and the second image is divided into a first set of grid points, as shown for example in FIG. 24B. In particular embodiments, each grid point corresponds to a portion of the first image or the second image. At step 2006, differences in the region of overlap between the first and second images are determined. In particular embodiments, to determine the differences, edge detection is performed on the images to calculate image edges and/or contrast lines (e.g., see FIG. 23) and then differences in edge lines between a feature in the first image and a corresponding feature in the second image are determined. Edge detection may be performed using sobel gradients as discussed elsewhere herein. At step 2008, one or more grid points and corresponding portions of the first image or the second image are moved relative to other grid points to minimize the differences between the first image and the second image. In particular embodiments, moving the one or more grid points includes moving the grid points from one position to another in order to minimize the difference in edge lines between features in the overlapping region of the first and second images, as shown for example in FIGS. 24C-F.

In particular embodiments, a local window may be defined for each grid point and movement of each of the one or more grid points may be constrained within its respective local window. The local window for each of the grid points may be located in the region of overlap between the first and second images. In some embodiments, the grid points of the first and second mages may be moved simultaneously or independent of one another. The grid points may be moved based at least in part on a force model comprising a set of spring or smoothening constraints, which may be configured to resist movement of the grid points, as discussed elsewhere herein. For instance, the set of spring constraints may define one or more of how much (e.g., pixels) a first grid point should move relative to a second grid point within the same image, how much a grid point in the first image should move relative to a grid point in the second image, and how much a grid point in the first image should move relative to its origin position, as shown and discussed, for example, in reference to FIG. 25.

At step 2010, after the grid points and corresponding portions of the first and/or second images are moved, differences in the region of overlap between the two images are again determined. At step 2012, a determination is made whether at least one difference in the overlapping region is greater than a predetermined threshold. If the result of the determination is positive, then at step 2013, a second/subsequent set of grid points or new grid points is added to each of the first and second images, as shown for example from FIG. 24B to 24C or 24C to FIG. 24D. In particular embodiments, the size of the local window for each grid point is reduced as subsequent/new grid points are added into the images. Steps 2008-2012 may be repeated until the at least one difference in the region of overlap becomes less than the predetermined threshold. In particular embodiments, this difference is less than the predetermined threshold when the edges or edge lines of the first and second images overlap with each other. For example, as shown in elements 102a and 104a of FIG. 1, edges between the hand rails in two overlapping images may not align. If the result of the determination in step 2012 is negative or once the difference(s) in the overlapping region between the first and second images is less than predetermined threshold, then at step 2014, the first image and the second image are combined to produce a merged image (e.g., a panoramic image), as shown for example in FIG. 27. For example, as shown in elements 102b and 104b of FIG. 1, edges between the hand rails in two overlapping images be sufficiently aligned as a result of iterative grid optimization. In particular embodiments, combining the first and second camera images may include identifying a seam line between the two images (as discussed above in step 1814 of FIG. 18) and then blending the images along the seam line to produce the merged image (as discussed above in step 1816 of FIG. 18).

Particular embodiments may repeat one or more steps of the method 2000 of FIG. 20, where appropriate. Although this disclosure describes and illustrates particular steps of the method of FIG. 20 as occurring in a particular order, this disclosure contemplates any suitable steps of the method of FIG. 20 occurring in any suitable order. Moreover, although this disclosure describes and illustrates an example method for stitching images based on grid optimization, including the particular steps of the method of FIG. 20, this disclosure contemplates any suitable method for stitching images based on grid optimization, including any suitable steps, which may include all, some, or none of the steps of the method of FIG. 20, where appropriate. Furthermore, although this disclosure describes and illustrates particular components, devices, or systems carrying out particular steps of the method of FIG. 20, this disclosure contemplates any suitable combination of any suitable components, devices, or systems carrying out any suitable steps of the method of FIG. 20. For example, while the steps in FIG. 20 may be performed by a central processing unit (CPU), any combination of those steps may be performed by any other computing system, including, e.g., a graphical processing unit (GPU) as discussed below.

In order to decrease the time cost of single time optimization and increase the frequency of optimizations, particular embodiments may use a graphical processing unit (GPU) to accelerate the grid optimization (step 1810), seam estimation (step 1814), and blending (step 1816). As an example and not by way of limitation, when running these steps on a GPU like Nvidia GTX 980, the performance is about 6-18 times faster than a single thread CPU version running on Xeon 3.10 GHz. Each of the GPU-based grid optimization, seam estimation, and blending steps is discussed in detail below.

When doing grid optimization step 1810 on a GPU, for each grid point, a thread block may be assigned for calculation. When optimizing a particular grid point, such as grid point A, for each pixel or each pile of pixels in a local window WA around grid point A, a separate thread may be assigned for calculation. Using a reduction algorithm, minimum and maximum values in the local window WA may be obtained for normalization, and also their sum $S_A$ in $W_A$. Movement of grid points may be recorded using minimum $S_A$. New grid points may be interpolated in two steps. If the pyramid level has not reached a minimum level (as discussed above in relation to FIGS. 18 and 19), then level may be decreased and local window $W_A$ may be reduced to obtained a new set of min and max values in $W_A$ and the subsequent steps are repeated until the pyramid level reaches the minimum level.

Since sobel difference and pixel energy are both in-place calculation and calculation for each pixel is independent from others, assigning one thread per pixel can utilize the parallel capacity of a GPU. For seam finding, two alternative approaches may be used. In the first approach, kernel functions may be launched on every row sequentially. After calculating one row, current kernel function is stopped and another one is started for next row. In the second approach, only one kernel is used for every row, and inside the kernel, one thread is used for one column. Threads in the block may be synced after calculating each row. In particular embodiments, since the seam finding region is limited to 512 columns around seam line, and the number of threads per block can be 2124, the second method is preferred over the first one.

In particular embodiments, a reduction method may be used on the first row to find the start pixel of the seam line with minimum energy. A seam map may be copied to a CPU and seam line finding may be done by the CPU because this requires only one thread. A seam mask may be filled among all seam lines. A first channel may be used to record the index of the image and a second channel may be used to record the pixel weight for blending.

In particular embodiments, a pyramid for all images including seam mask may be built. For each pixel, one thread is assigned. After one level of pyramid has been built, threads with an index bigger than the pixel level in current level are killed or terminated. Images may be blended in every level. For every pixel, the image is chosen based on the first channel value of the seam mask in the current level. The image from the pyramid may be recovered by launching kernel for each level sequentially, from bottom to top.

In particular embodiments, merging two or more images into a single image may be accomplished by adjusting the images based on a number of considerations. For example, misaligned portions of overlapping images may be corrected by adjusting (e.g., by warping or distorting) at least part of one or both of the images so as to minimize the misalignment. However, adjusting the images so that they are completely aligned may require so much adjustment that other portions of the images become misaligned and appear distorted to a viewer. Thus, considerations for merging two or more images may include an analysis of the image distortion caused by aligning misaligned portions of an image. As explained below, image distortion may include both local distortion, which refers to distortion of the image near the portions that are being aligned, and global distortion, which refers to distortion of portions of the image that are not near misaligned portions of the image. Thus, merging two or more images into a single image may balance the competing considerations of alignment and image distortion in order to reduce misalignment while also preserving image quality.

Figure 29:
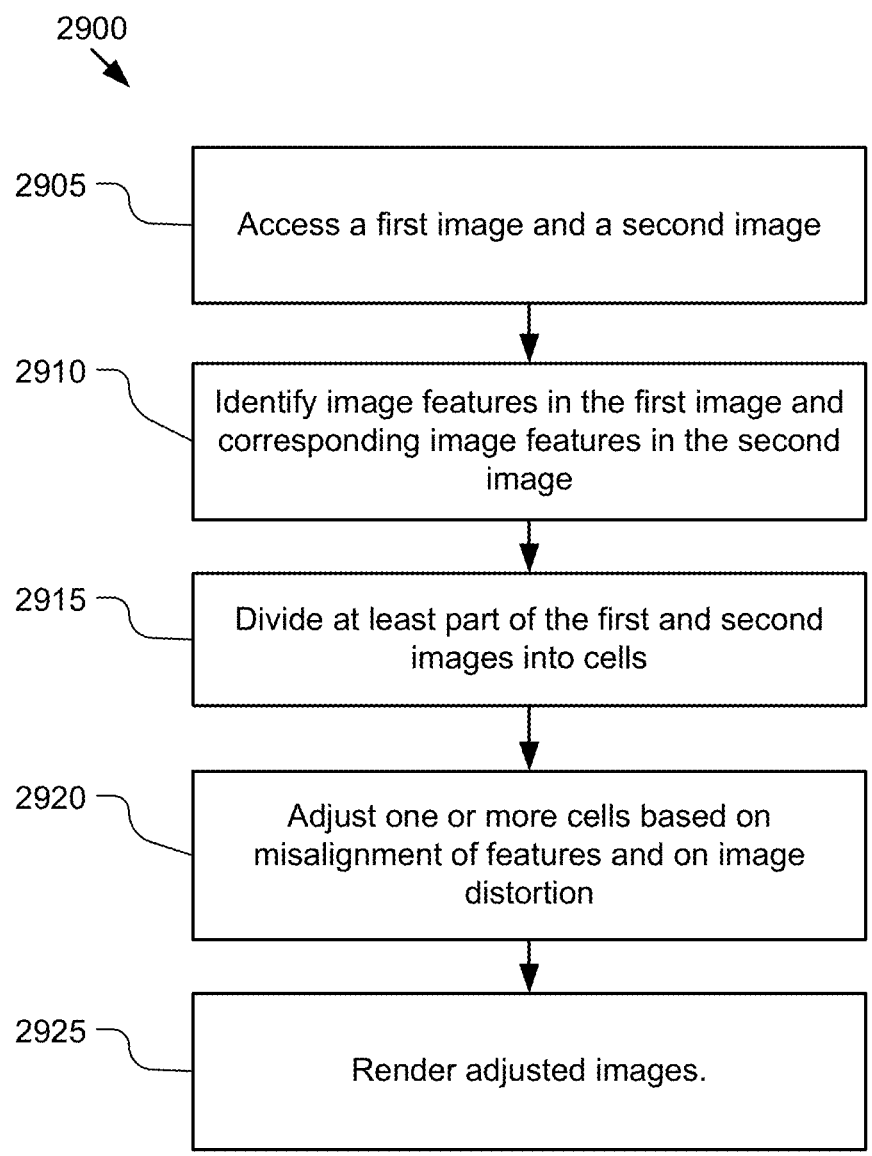
FIG. 29 illustrates an example method for merging two or more images into a single image.

FIG. 29 illustrates an example method 2900 for merging two or more images into a single image. Step 2905 involves accessing two or more images having an overlapping area, i.e., that each contain the same portion of a scene. For example, the images may be captured by the cameras described herein.

Method 2900 may include step 2910, in which features may be identified in the images accessed in step 2905. The features may be identified in the region of overlap of two images. In particular embodiments, features may be identified when one or more adjacent or nearby pixels in an image have some difference between them, such as a difference in color gradient, brightness, or other patterns. In particular embodiments, a feature in one image may be associated with a corresponding feature in another image. For example, the discontinuity in the left-side handrail shown in element 104a in FIG. 1 may be an image feature and the discontinuity in the right-side handrail may be a corresponding image feature. In particular embodiments, feature points may be used to identify the location of a feature in an image. For example, the coordinates of a feature may be determined based on the coordinates of an associated feature point.

In particular embodiments, other parameters in addition to features may be identified in step 2910. For example, in particular embodiments step 2910 may include accessing or determining camera properties of the camera(s) that took the images accessed in step 2905. In particular embodiments, camera properties may be estimated. For example, distance minimization techniques using software such as PTGUI, Hugin, Autopano Kolor, or Panorama studio may be used. As another example, software libraries like Libpano may be used to compute a direct perspective/homography transformation between images and then adjust those images depending upon the projection and lens type. Software libraries such as OpenCV, VLFeat, and the like may utilize perspective estimation algorithms that can be used to perform, or assist in performing, such adjustments.

In particular embodiments, identifying features may include receiving an identification of features. In particular embodiments, identifying features may include computing or estimating such features. For example, DLT may be used to compute a base perspective transform. This disclosure contemplates that other methods may be used in addition or the alternative. For example, RANSAC may be used to filter outliers, and other algorithms such as least median of squares can also be used. This disclosure contemplates that any suitable method or algorithms may be used to identify features in a set of images.

Method 2900 may include step 2915, in which all or part of the images are divided into regions. Such regions are referred to herein as "cells." In particular embodiments, each cell may correspond to a region that is capable of being adjusted. In other words, each cell can be considered to be a variable capable of being adjusted in order to achieve the best fit between two or more images. Thus, in particular embodiments, more control over image adjustments may be obtained by dividing an image into more cells, thus introducing more variables that can be varied. Because the number of variables may provide more control but may also require more processing power, in particular embodiments the number of cells may be based on the features identified in the images, the type of image at issue (e.g., 2D vs 3D images, real-time vs. recorded images), the alignment (or lack thereof) between images, and/or the processing capabilities of a device.

In particular embodiments, a cell may be defined by a grid or mesh. FIG. 24G illustrates an example mesh and an example grid. Each point 2415 may be considered to be a grid point and each segment 2420 may be considered to be part of a mesh. Cell 2425 illustrates an example of a cell defined by grid points and/or by a mesh. In particular embodiments, each segment of a mesh or grid point in a grid may be independently variable. In particular embodiments, the number of variables may be determined by the size of cells, by the number of mesh segments defining the cells, and/or by the number of grid points defining the cells. Where this disclosure discusses grids and grid points this disclosure contemplates that meshes and segments can also or in the alternative be used as appropriate, and vice versa.

This disclosure contemplates that a cell may be defined by any suitable number and shape of grid points. For example, in FIG. 24G the grid points define cells that are square. In other words, each grid point defines a corner, or vertex, of a square. However, this disclosure contemplates that cells may take other shapes, such as for example rectangles or triangles. This disclosure contemplates that the size or shape of cells in an image may vary. For example, a grid could be used that has a varying density of grid points in different parts of the image. For example, if the center of an image is the focus of the stitching techniques described herein, then cells may be smaller in the center of the image and gradually grow bigger towards the edges. As another example, objects in an image may be identified, and cells may be defined such that grid points go around objects and do not pass through them. As another example, the size or shape of a cell may vary based on the feature(s) identified or discontinuities (e.g., edges) of one or more pixel attributes. This disclosure contemplates that cells may take any suitable size or shape and may be defined by any suitable number and shape of grid points or mesh segments.

In particular embodiments, the images accessed in step 2905 may be projected to a coordinate system that corresponds to the parameters of the cameras used to take the pictures. For example, a camera may use a "fisheye lens" to take a picture such that the field of view is different in, e.g., the vertical and horizontal dimensions. FIG. 23 illustrates an example of transforming an image to its original coordinate system, which may also be referred to herein as "dewarping" or "defishing." In particular embodiments, an image may be divided into cells (e.g. by defining a grid) after an image is defished. In particular embodiments, an image may be divided into cells before an image is defished, and thus the grid will be "defished" as well (i.e., will be transformed from the coordinate system in which it was initially placed to the images' coordinate system).

In particular embodiments, the images accessed in step 2905 may undergo an initial stitching or merging process. For example, the accessed images may be aligned or stitched. This disclosure contemplates any suitable method for an initial alignment and stitching, such as but not limited to the alignment and stitching techniques described in connection with FIGS. 8-18 herein. In particular embodiments, initial alignment and stitching may be performed after accessing the images in step 2905, for example after defishing a set of images. In particular embodiments, the images accessed in step 2905 may have already undergone initial alignment and stitching. Thus, method 2900 may occur after an initial alignment and stitching, or alignment and stitching may be a part of method 2900.

Figure 30:
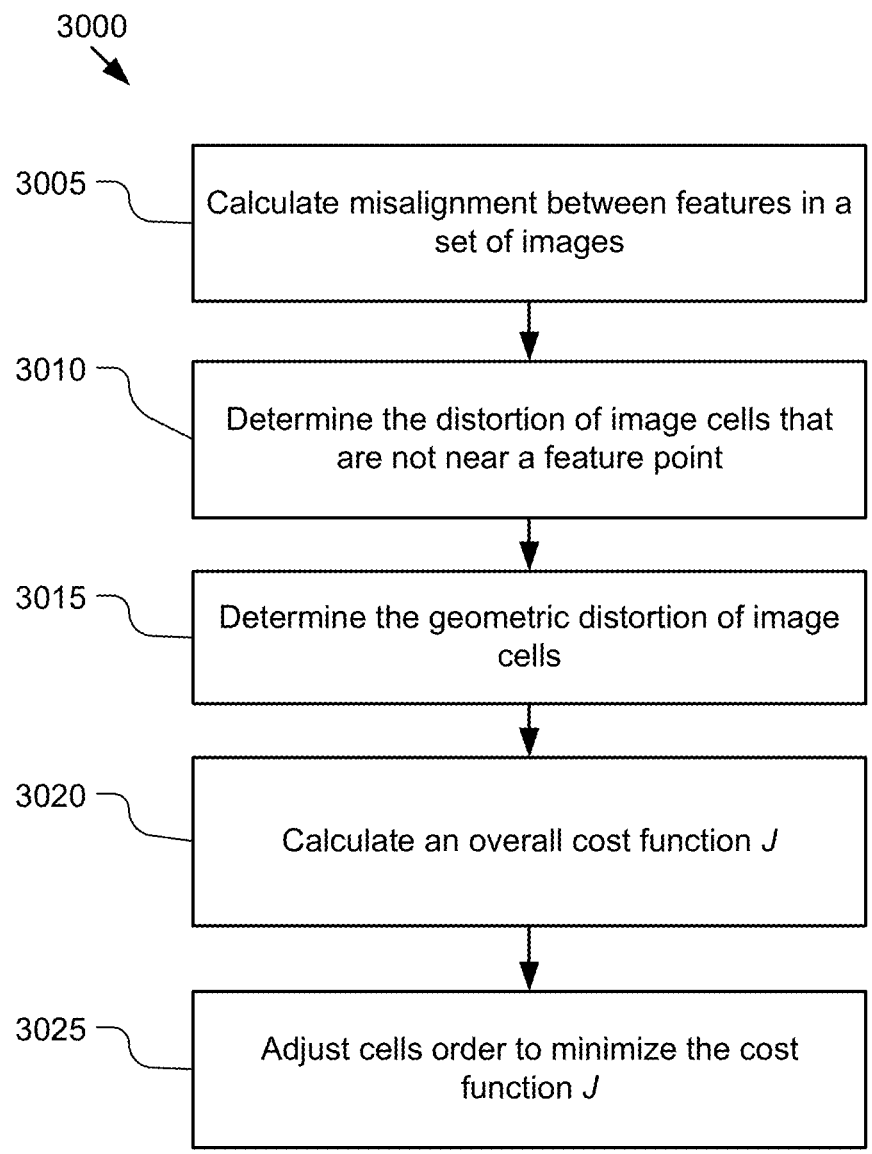
FIG. 30 illustrates an example method for adjusting portions of an image to correct misalignment between merged images.

In particular embodiments, method 2900 may include adjusting one or more cells in step 2920 based on misalignment between features in the image and based on image distortion caused by adjusting an image. FIG. 30 illustrates an example method for adjusting image cells based on these considerations. In particular embodiments, adjusting a cell may include adjusting one or more grid points or meshes defining the cell, and thus adjusting the portion of the image associated with the grid point or mesh.

In particular embodiments, adjustments made be made to one or both images being merged together. In particular embodiments, when more than two images are being merged together, one image may be kept constant (e.g., as a reference image) and any or all of the remaining images may be adjusted in accordance with step 2920. In particular embodiments, when more than two images are being merged together, step 2920 may be sequentially performed for each pair of images. In other words, the adjustments to a pair of images may be calculated, and then adjustments for the next pair of images may be calculated. For example, with reference to FIG. 6, adjustments made be made to images I-8 and I-7, then to images I-7 and I-6, and so on. In particular embodiments, when more than two images are being merged together, step 2920 may be performed in parallel for each pair of images. For example, with reference to FIG. 6, adjustments may be made to all of the images at the same time based on the features identified in the regions of overlap 610 between the images.

In particular embodiments, method 2900 may include performing step 2920 several times. For example, the example method of FIG. 30 may be iteratively repeated 100 or 1000 times in order to adjust a set of images. In particular embodiments, step 2920 may be performed a predetermined number of times. In other embodiments, step 2920 may be performed until a certain amount of alignment is achieved or until some other parameter, such as the example cost function J described below, achieves a predetermined value. In particular embodiments, step 2920 may be performed until the amount of change of alignment or of some other parameter, such as the example cost function J described below, changes less than certain amount in each successive performance of step 2920. In particular embodiments, step 2920 may be performed until user input is received indicating that adjustment of the image(s) should no longer occur.

Method 2900 may include step 2925 in which the adjusted images are rendered. In particular embodiments, step 2920 may output coordinates for the adjusted images, such as for example by outputting mesh or grid point coordinates corresponding to particular portions of the images. For example, step 2925 may compute and output mesh coefficients, for example using the same interpolation technique used to render the mesh. For example, if bilinear interpolation is used to compute coefficients then bilinear coefficients may be used. Other interpolation techniques like nearest neighbor, bicubic, or spline may be used to compute and render a mesh. In particular embodiments, step 2920 may output a description of the cells to modify and how those cells are modified from the input images. In particular embodiments, step 2920 may output the images as adjusted.

This disclosure contemplates that step 2925 may include processing the rendered images. For example, step 2925 may include blending the rendered images together, e.g., to reduce the appearance of seams in the images. For example, the blending may be performed by using a graph cut segmentation algorithm or a seam cut and multiband blending algorithm. This disclosure contemplates any suitable method or technique for blending adjusted images. For example, enblend may be used to estimate the seam between images. Other algorithms like voronoi or variants of the graph-cut seam finding algorithm may be used. Algorithms such as a multiband blending algorithm, a linear algorithm, or a Laplacian algorithm may be used to blend the images. This disclosure also contemplates that any other suitable processing may be performed in step 2925.

This disclosure contemplates that "rendering" images may involve processing the images and storing them in a data store, such as a server or a data store of a user's client device. This disclosure contemplates that step 2925 may include displaying the images, such as on a display of a client device, including the client device described herein. This disclosure contemplates that method 2900 may be performed in real time, e.g., to display images from a live event. This disclosure also contemplates that method 2900 may be performed and the resulting images stored for later use.

Particular embodiments may repeat one or more steps of the method of FIG. 29, where appropriate. Although this disclosure describes and illustrates particular steps of the method of FIG. 29 as occurring in a particular order, this disclosure contemplates any suitable steps of the method of FIG. 29 occurring in any suitable order. Moreover, although this disclosure describes and illustrates an example method for adjusting images, including the particular steps of the method of FIG. 29, this disclosure contemplates any suitable method for adjusting images according to the considerations described herein, including any suitable steps, which may include all or only some of the steps of the method of FIG. 29, where appropriate. Furthermore, although this disclosure describes and illustrates particular components, devices, or systems carrying out particular steps of the method of FIG. 29, this disclosure contemplates any suitable combination of any suitable components, devices, or systems carrying out any suitable steps of the method of FIG. 29. For example, while the steps in FIG. 29 may be performed by a central processing unit (CPU), any combination of those steps may be performed by any other computing system, including, e.g., a graphical processing unit (GPU). As another example, the steps of FIG. 29 may be performed by a server, a client device, or some combination thereof.

FIG. 30 illustrates an example method 3000 for performing step 2920 in FIG. 29. In particular embodiments, method 3000 evaluates potential adjustments to an image, such warping of an image by moving a particular grid point corresponding to that portion. Method 3000 may begin with step 3005, which calculates the misalignment of feature points in the images being analyzed. For example, the misalignment may be calculated based on a distance between a feature point in one image and the corresponding feature point in a second image with which it should align. Herein, the alignment between feature points may be referred to as "local alignment."

Local alignment may be quantitatively represented as the sum of squared distances between a feature point in an image and a corresponding feature point in an overlapping image. The sum may be over all features points that are misaligned. In other words, if there are j feature points $F_j^{(i)}$ in image (i) then there are j corresponding feature points $F_j^{(i+1)}$ in corresponding image (i+1). Thus, the total local misalignment $J_{local}$ for those two images may be represented as the sum of squared distances between the j features in image (i) and the j corresponding features in the overlapping image (i+1).

Figure 32:
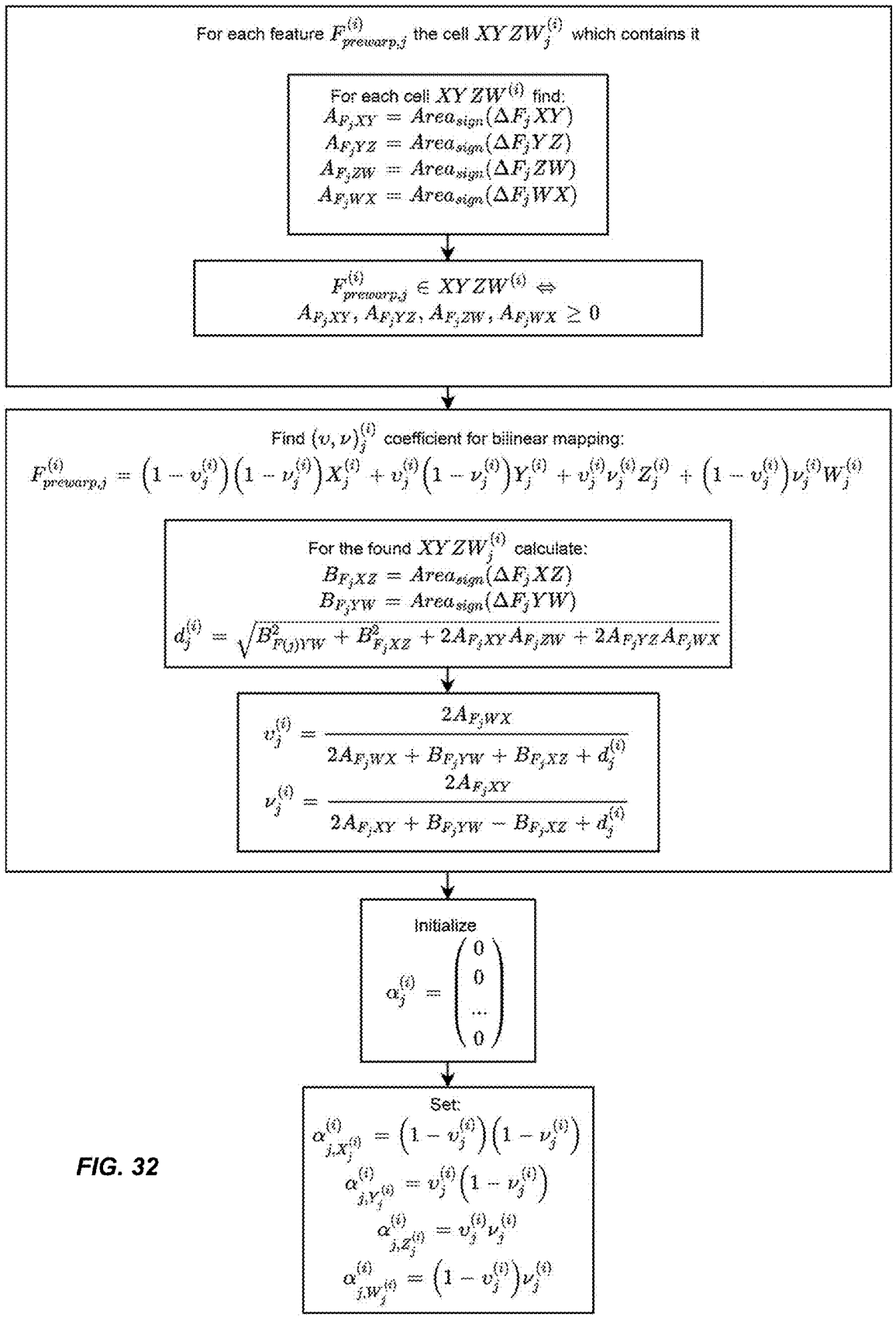
FIG. 32 illustrates a set of detailed example calculations for using bilinear mapping to determine the coordinates of a feature.

In embodiments in which the cells are defined by a grid, the local alignment term can be represented as:

$$J_{local} = \sum_{k=1}^{j} \left(F_k^{(i)} - F_k^{(i+1)}\right)^2$$

where $F_j^{(i)}$ represents the coordinates of the $j_{th}$ feature point in the $i_{th}$ image. FIG. 32 illustrates an example method for determining the coordinates of the feature points using bilinear mapping in the cell in which the $j_{th}$ feature point is located. When computing $J_{local}$, any suitable method for finding the containing cell for each feature can be used, as well as any method for computing coefficients for bilinear mapping. If an alternative method for texture interpolation is used, then bilinear mapping might be replaced by the corresponding interpolation map.

The above term $J_{local}$ quantifies the total misalignment of the features in two overlapping images. If multiple overlapping images are considered, the $J_{local}$ is the sum of the $J_{local}$ values of each pair of overlapping images begin merged together.

Method 3000 may include step 3010, in which distortions of image cells that are not near a feature point are determined. Such distortions may be referred to as "global alignment." When a grid is used to define cells, the global alignment term $J_{global}$ is equal to the square of the distance between initial, pre-adjustment positions of grid points and their final, adjusted positions. Thus, the term $J_{global}$ penalizes misalignments between two images as initially aligned and stitched compared to the two images after adjustment. In particular embodiments, preserving the initial alignment is desired in areas with no features. In particular embodiments, preserving the initial alignment is desired in areas where a feature point and its corresponding feature point are very close to being aligned.

In particular embodiments, $J_{global}$ is the sum of the square of distances between the coordinates of a warped vertex (grid point) $warp_{(i)}(V^{(i)})$ and the vertex's original coordinates $V^{(i)}$. In particular embodiments, each term in the sum may be weighted by a weight T. Thus, $J_{global}$ may be represented as:

$$J_{global} = \sum_{i,V^i} \tau_V{}^i \|warp_{(i)}(V^{(i)}) - V^{(i)}\|^2$$

In particular embodiments, the weight $\tau$ may be 0 if no cell defined by the vertex being considered contains a feature point. In particular embodiments, the weight may depend on the distance the cell is from a cell containing a feature, with the weight decreasing with increasing distance. In particular embodiments, the weight $\tau$ may be determined by:

$$\tau_{V^{(i)}} = \min\left(1, \min_j \left(\frac{\|V^{(i)} - F_j^{(i)}\|}{\|F_j^{(i+1)} - F_j^{(i)}\|}\right)\right)$$

Method 3000 may include step 3015, which seeks to preserve the geometry of cells by determining the geometric distortion caused by an adjustment. That determination may also be referred to as the "smoothness term" $J_{smoothness}$. In particular embodiments, a distortion of a shape within a cell or partly defined by a cell may be used to calculate the parameter $J_{smoothness}$. For example, $J_{smoothness}$ may represent the distortion of a shape of a triangle formed by three vertices (grid points) defining the cell. For example, for each vertex $V_1^{(i)}$, and each triangle it forms with vertices in adjacent cells $\Delta V_i V_2 V_3^{(i)}$, $J_{smoothness}$ may be equal to the squared distance between the warped position of the vertex warped$_{(i)}(V_1^{(i)})$, and the point $V_{V_1,\Delta V_1 V_2 V_3}^{(i)}$ that will make the warped triangle similar to the original triangle. In particular embodiments:

$$J_{smoothness} = \sum_{i,V_1^{(i)}, \Delta V_1 V_2 V_3^{(i)}} \omega_{saliency}{}^{(i)} \|warp_{(i)}(V_1^{(i)}) - V_{V_1,\Delta V_1 V_2 V_3^{(i)}}\|^2$$

where:

$$\Delta V_{V_1, V_1 V_2 V_3}{}^{(i)} warp_{(i)}(V_2^{(i)}) warp_{(i)}(V_3^{(i)}) \approx \Delta V_1 V_2 V_3^{(i)}$$

where the weighting term describes the saliency value of the cell the feature lies in. In particular embodiments, $J_{smoothness}$ is summed over all vertices and all triangles in the grid.

Method 3000 may include step 3020, in which an overall cost function J is calculated by adding together the terms quantifying the local alignment, the global alignment, and the smoothness. In particular embodiments, J may be a weighted sum of those terms. In particular embodiments, the weights may be normalized to the weight given to $J_{local}$ such that:

$$J = J_{local} + \alpha_{global} J_{global} + \alpha_{smooth} J_{smooth}$$

In particular embodiments, $\alpha_{global}=0.01$ and $\alpha_{smooth}=0.001$. In particular embodiments the weights may be determined based on cell size and/or on the distribution of features.

Method 3000 may include step 3025, which involves adjusting the cells so as to minimize the overall cost function J. In particular embodiments, the overall cost function J is quadratic with respect to the warped positions of mesh vertices. In particular embodiments, a direct solution to $$\frac{\partial J}{\partial V} = 0$$

can be found, although if the number of variables is relatively large then a direct solution may not be feasible. In such circumstances, a gradient method may be used to find a solution. For example, gradient descent or conjugate gradient based algorithms and its variants may be used.

Figure 31A:
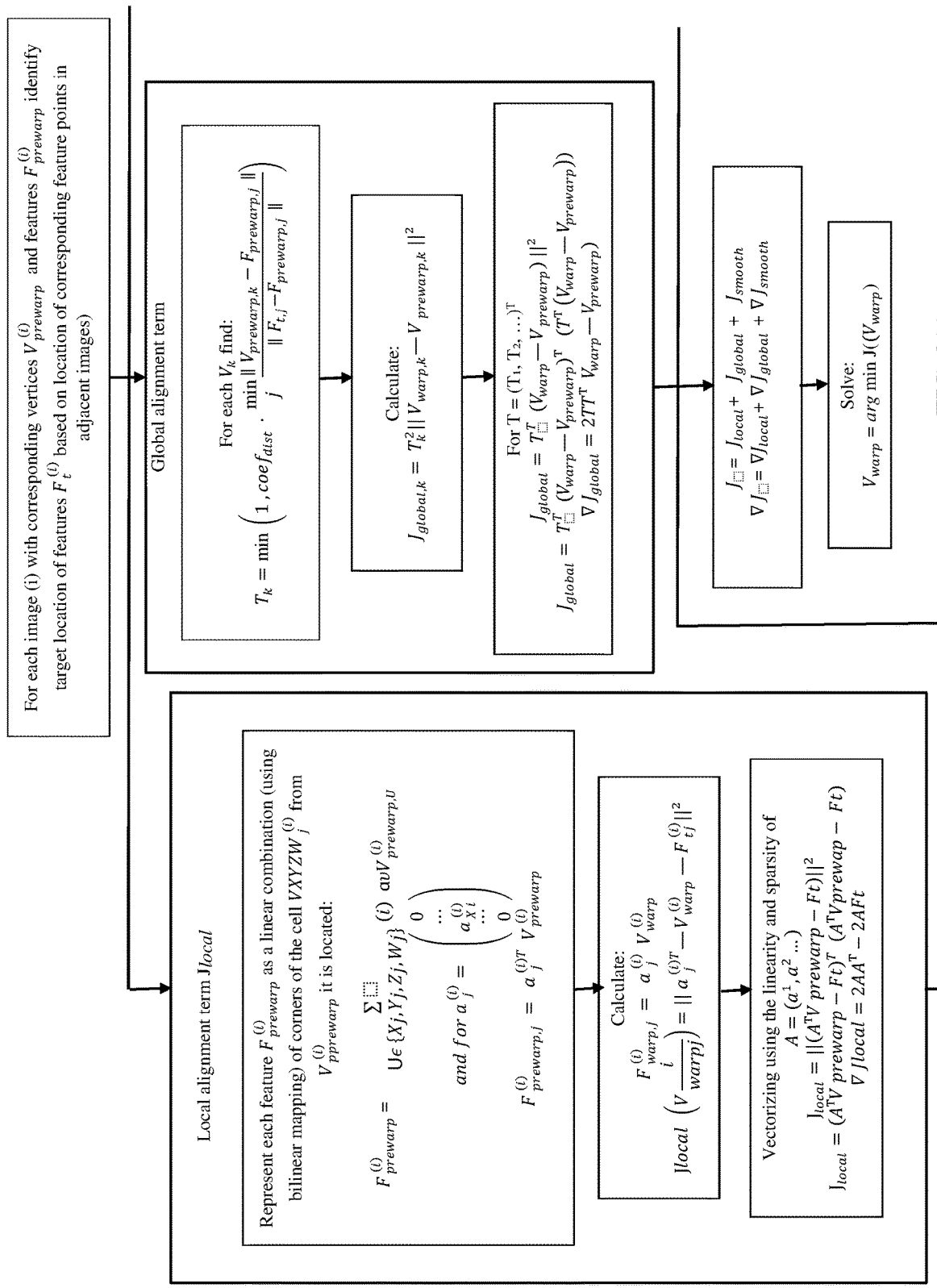

FIGS. 31A-B illustrate a set of detailed example calculations for determining $J_{local}$, $J_{global}$, $J_{smoothness}$, and the overall cost function J. However, this disclosure contemplates any suitable method for calculating those terms. For example, the smoothness term may be calculated using different techniques for calculating the position of $V_{V_1, \Delta V_1 V_2 V_3}$. In particular embodiments, the saliency coefficient can be expanded to include $L_2$ norm of the RGB color values of the cell, the abundance of edges, and/or the number of edges spanning into adjacent cells.

FIG. 32 illustrates a set of detailed example calculations for using bilinear mapping to determine the coordinates of a feature based on the coordinates of vertices X, Y, Z, and W of cell containing a feature j in an image (i). The output of FIG. 32 determines the coefficients α referenced in FIGS. 31A-B to calculate the $J_{local}$ term.

Figure 33:
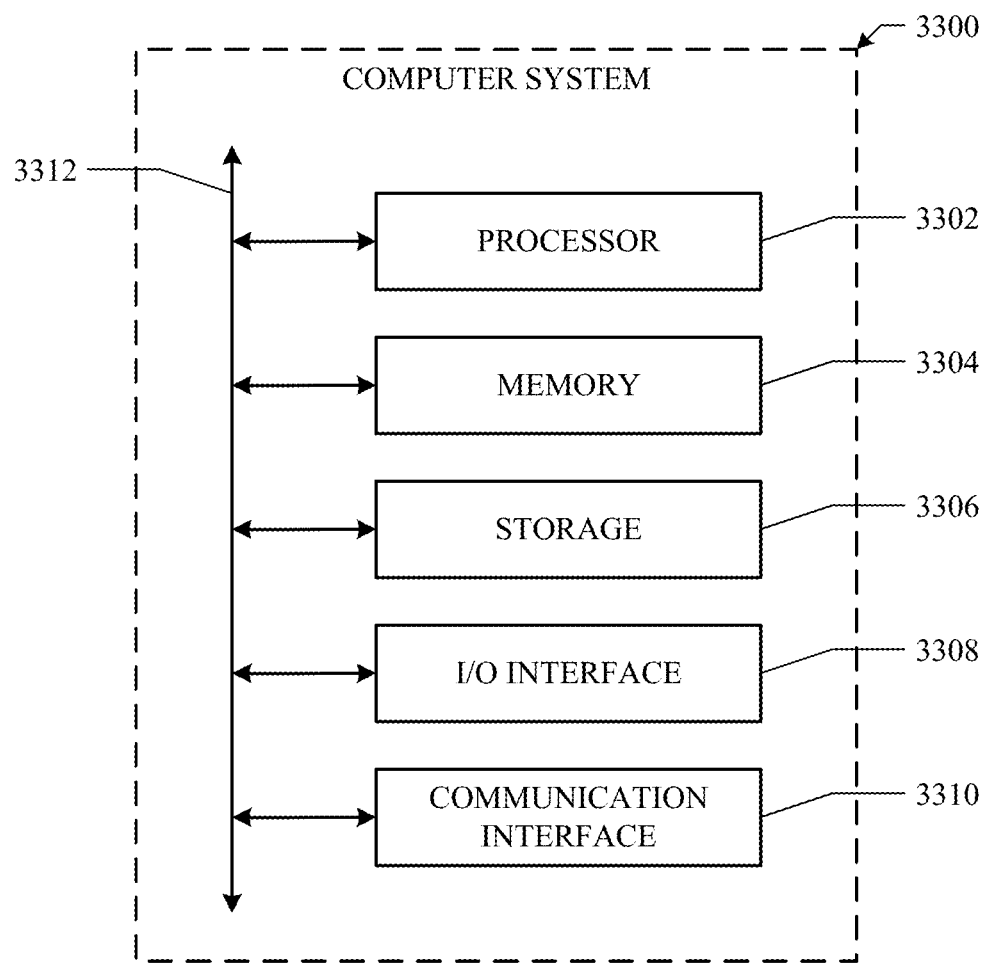
FIG. 33 illustrates an example computer system.

FIG. 33 illustrates an example computer system 3300. In particular embodiments, one or more computer systems 3300 perform one or more steps of one or more methods described or illustrated herein. In particular embodiments, one or more computer systems 3300 provide functionality described or illustrated herein. In particular embodiments, software running on one or more computer systems 3300 performs one or more steps of one or more methods described or illustrated herein or provides functionality described or illustrated herein. Particular embodiments include one or more portions of one or more computer systems 3300. Herein, reference to a computer system may encompass a computing device, and vice versa, where appropriate. Moreover, reference to a computer system may encompass one or more computer systems, where appropriate.

This disclosure contemplates any suitable number of computer systems 3300. This disclosure contemplates computer system 3300 taking any suitable physical form. As example and not by way of limitation, computer system 3300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 3300 may include one or more computer systems 3300; be unitary or distributed; span multiple locations; span multiple machines; span multiple data centers; or reside in a cloud, which may include one or more cloud components in one or more networks. Where appropriate, one or more computer systems 3300 may perform without substantial spatial or temporal limitation one or more steps of one or more methods described or illustrated herein. As an example and not by way of limitation, one or more computer systems 3300 may perform in real time or in batch mode one or more steps of one or more methods described or illustrated herein. One or more computer systems 3300 may perform at different times or at different locations one or more steps of one or more methods described or illustrated herein, where appropriate.

In particular embodiments, computer system 3300 includes a processor 3302, memory 3304, storage 3306, an input/output (I/O) interface 3308, a communication interface 3310, and a bus 3312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 3302 includes hardware for executing instructions, such as those making up a computer program. As an example and not by way of limitation, to execute instructions, processor 3302 may retrieve (or fetch) the instructions from an internal register, an internal cache, memory 3304, or storage 3306; decode and execute them; and then write one or more results to an internal register, an internal cache, memory 3304, or storage 3306. In particular embodiments, processor 3302 may include one or more internal caches for data, instructions, or addresses. This disclosure contemplates processor 3302 including any suitable number of any suitable internal caches, where appropriate. As an example and not by way of limitation, processor 3302 may include one or more instruction caches, one or more data caches, and one or more translation lookaside buffers (TLBs). Instructions in the instruction caches may be copies of instructions in memory 3304 or storage 3306, and the instruction caches may speed up retrieval of those instructions by processor 3302. Data in the data caches may be copies of data in memory 3304 or storage 3306 for instructions executing at processor 3302 to operate on; the results of previous instructions executed at processor 3302 for access by subsequent instructions executing at processor 3302 or for writing to memory 3304 or storage 3306; or other suitable data. The data caches may speed up read or write operations by processor 3302. The TLBs may speed up virtual-address translation for processor 3302. In particular embodiments, processor 3302 may include one or more internal registers for data, instructions, or addresses. This disclosure contemplates processor 3302 including any suitable number of any suitable internal registers, where appropriate. Where appropriate, processor 3302 may include one or more arithmetic logic units (ALUs); be a multi-core processor; or include one or more processors 3302. Although this disclosure describes and illustrates a particular processor, this disclosure contemplates any suitable processor.

In particular embodiments, memory 3304 includes main memory for storing instructions for processor 3302 to execute or data for processor 3302 to operate on. As an example and not by way of limitation, computer system 3300 may load instructions from storage 3306 or another source (such as, for example, another computer system 3300) to memory 3304. Processor 3302 may then load the instructions from memory 3304 to an internal register or internal cache. To execute the instructions, processor 3302 may retrieve the instructions from the internal register or internal cache and decode them. During or after execution of the instructions, processor 3302 may write one or more results (which may be intermediate or final results) to the internal register or internal cache. Processor 3302 may then write one or more of those results to memory 3304. In particular embodiments, processor 3302 executes only instructions in one or more internal registers or internal caches or in memory 3304 (as opposed to storage 3306 or elsewhere) and operates only on data in one or more internal registers or internal caches or in memory 3304 (as opposed to storage 3306 or elsewhere). One or more memory buses (which may each include an address bus and a data bus) may couple processor 3302 to memory 3304. Bus 3312 may include one or more memory buses, as described below. In particular embodiments, one or more memory management units (MMUs) reside between processor 3302 and memory 3304 and facilitate accesses to memory 3304 requested by processor 3302. In particular embodiments, memory 3304 includes random access memory (RAM). This RAM may be volatile memory, where appropriate, and this RAM may be dynamic RAM (DRAM) or static RAM (SRAM), where appropriate. Moreover, where appropriate, this RAM may be single-ported or multi-ported RAM. This disclosure contemplates any suitable RAM. Memory 3304 may include one or more memories 3304, where appropriate. Although this disclosure describes and illustrates particular memory, this disclosure contemplates any suitable memory.

In particular embodiments, storage 3306 includes mass storage for data or instructions. As an example and not by way of limitation, storage 3306 may include a hard disk drive (HDD), a floppy disk drive, flash memory, an optical disc, a magneto-optical disc, magnetic tape, or a Universal Serial Bus (USB) drive or a combination of two or more of these. Storage 3306 may include removable or non-removable (or fixed) media, where appropriate. Storage 3306 may be internal or external to computer system 3300, where appropriate. In particular embodiments, storage 3306 is non-volatile, solid-state memory. In particular embodiments, storage 3306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 3306 taking any suitable physical form. Storage 3306 may include one or more storage control units facilitating communication between processor 3302 and storage 3306, where appropriate. Where appropriate, storage 3306 may include one or more storages 3306. Although this disclosure describes and illustrates particular storage, this disclosure contemplates any suitable storage.

In particular embodiments, I/O interface 3308 includes hardware, software, or both, providing one or more interfaces for communication between computer system 3300 and one or more I/O devices. Computer system 3300 may include one or more of these I/O devices, where appropriate. One or more of these I/O devices may enable communication between a person and computer system 3300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 3308 for them. Where appropriate, I/O interface 3308 may include one or more device or software drivers enabling processor 3302 to drive one or more of these I/O devices. I/O interface 3308 may include one or more I/O interfaces 3308, where appropriate. Although this disclosure describes and illustrates a particular I/O interface, this disclosure contemplates any suitable I/O interface.

In particular embodiments, communication interface 3310 includes hardware, software, or both providing one or more interfaces for communication (such as, for example, packet-based communication) between computer system 3300 and one or more other computer systems 3300 or one or more networks. As an example and not by way of limitation, communication interface 3310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 3310 for it. As an example and not by way of limitation, computer system 3300 may communicate with an ad hoc network, a personal area network (PAN), a local area network (LAN), a wide area network (WAN), a metropolitan area network (MAN), body area network (BAN), or one or more portions of the Internet or a combination of two or more of these. One or more portions of one or more of these networks may be wired or wireless. As an example, computer system 3300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 3300 may include any suitable communication interface 3310 for any of these networks, where appropriate. Communication interface 3310 may include one or more communication interfaces 3310, where appropriate. Although this disclosure describes and illustrates a particular communication interface, this disclosure contemplates any suitable communication interface.

In particular embodiments, bus 3312 includes hardware, software, or both coupling components of computer system 3300 to each other. As an example and not by way of limitation, bus 3312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 3312 may include one or more buses 3312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This scope of this disclosure encompasses all changes, substitutions, variations, alterations, and modifications to the example embodiments herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
accessing a first image and a second image, wherein at least part of the first image overlaps with at least part of the second image;
dividing the first image and the second image into portions each being based on a plurality of sets of grid points comprising at least a first set of grid points and a second set of grid points, wherein each grid point corresponds to a portion of the first image or the second image, wherein each grid point is associated with a local window, and wherein a size of the local window for each grid point in the first set is larger than a size of the local window for each grid point in the second set;
determining differences in a region of overlap between the first image and the second image, wherein the differences are determined based on normalized gradients of the region of overlap; and
moving, based on the determined differences, one or more grid points in at least the first or second set of grid points and the corresponding portions of the first image or the second image relative to one or more other grid points in the first or second set of grid points, wherein the one or more grid points in the second set of grid points and the corresponding portions of the first image or the second image are moved relative to the one or more other grid points in the second set of grid points in response to at least one difference being greater than a predetermined threshold.

2. The method of claim 1, further comprising:
after the grid points in the first set of the plurality of sets of grid points and the corresponding portions of the first image or the second image are moved, determining the differences in the region of overlap between the first image and the second image;
determining whether the at least one difference in the region of overlap between the first image and the second image is greater than the predetermined threshold;
in response to a determination that the at least one difference in the region of overlap is greater than the predetermined threshold, adding the second set of grid points from the plurality of sets of grid points to each of the first image and the second image; and
moving, based on the at least one difference in the region of overlap, the one or more grid points in the first or second set and the corresponding portions of the first image or the second image relative to the one or more other grid points in the first or second set.

3. The method of claim 2, further comprising:
in response to a determination that the at least one difference in the region of overlap is less than the predetermined threshold, combining the first image and the second image into a merged image.

4. The method of claim 2, further comprising:
detecting edge lines in each of the first image and the second image,
wherein determining the differences in the region of overlap between the first image and the second image comprises determining differences in edge lines between a feature in the first image and a corresponding feature in the second image.

5. The method of claim 4, wherein the at least one difference in the region of overlap is less than the predetermined threshold when edge lines of the first image and the second image overlap with each other.

6. The method of claim 4, wherein the edges lines are detected using sobel gradients.

7. The method of claim 4, wherein moving the one or more grid points in the first set or the second set comprises moving the grid points to minimize the difference in edge lines between features in the overlapping region of the first image and the second image.

8. The method of claim 7, wherein the grid points of the first image and the second image are moved in parallel.

9. The method of claim 1, wherein a first grid point corresponding to a feature in the first image is moved relative to a second grid point in the second image corresponding to the same feature.

10. The method of claim 1, wherein a first grid point corresponding to a first feature in the first image is moved relative to a second grid point in the first image corresponding to a second feature.

11. The method of claim 1, wherein the grid points are moved based at least in part on a force model for resisting movement of the grid points.

12. The method of claim 11, wherein the force model comprises a set of spring constraints.

13. The method of claim 12, wherein the set of spring constraints limit one or more of:
an amount a first grid point moves relative to a second grid point within the same image;
an amount a grid point in the first image moves relative to a grid point in the second image; or
an amount a grid point in the first image moves relative to its origin position.

14. The method of claim 1, further comprising:
defining the local window for each of the grid points, wherein the movement of each of the one or more grid points is constrained within its respective local window.

15. The method of claim 2, wherein the size of the local window for each of the grid points is reduced when the second set of grid points are added into the first and second images.

16. The method of claim 14, wherein the local window for each of the grid points in the first image and the second image is located in the region of overlap between the first and second images.

17. The method of claim 3, wherein combining the first image and the second image comprises:
identifying a seam line between the first image and the second image; and
blending the first image and the second image along the seam line to produce the merged image.

18. The method of claim 1, further comprising:
before dividing the first image and the second image into the portions each being based on each of the plurality of sets of grid points, rescaling one or more of the first image or the second image.

19. The method of claim 18, wherein rescaling one or more of the first image or the second image comprises lowering the resolution or compressing the size of one or more of the first image or the second image.

20. One or more non-transitory computer-readable storage media embodying instructions that are operable when executed to:
access a first image and a second image, wherein at least part of the first image overlaps with at least part of the second image;
divide the first image and the second image into portions each being based on a plurality of sets of grid points comprising at least a first set of grid points and a second set of grid points, wherein each grid point corresponds to a portion of the first image or the second image, wherein each grid point is associated with a local window, and wherein a size of the local window for each grid point in the first set is larger than a size of the local window for each grid point in the second set;
determine differences in a region of overlap between the first image and the second image, wherein the differences are determined based on normalized gradients of the region of overlap; and
move, based on the determined differences, one or more grid points in at least the first or second set of grid points and the corresponding portions of the first image or the second image relative to one or more other grid points in the first or second set of grid points, wherein the one or more grid points in the second set of grid points and the corresponding portions of the first image or the second image are moved relative to the one or more other grid points in the second set of grid points in response to at least one difference being greater than a predetermined threshold.

21. The media of claim 20, wherein the instructions are further operable to:
after the grid points in the first set of the plurality of sets of grid points and the corresponding portions of the first image or the second image are moved, determine the differences in the region of overlap between the first image and the second image;
determine whether the at least one difference in the region of overlap between the first image and the second image is greater than the predetermined threshold;
in response to a determination that the at least one difference in the region of overlap is greater than the predetermined threshold, add the second set of grid points from the plurality of sets of grid points to each of the first image and the second image; and
move, based on the at least one difference in the region of overlap, the one or more grid points in the first or second set and the corresponding portions of the first image or the second image relative to the one or more other grid points in the first or second set.

22. The media of claim 21, wherein the instructions are further operable to:
in response to a determination that the at least one difference in the region of overlap is less than the predetermined threshold, then combine the first image and the second image into a merged image.

23. An apparatus comprising:
one or more non-transitory computer-readable storage media embodying instructions; and
one or more processors coupled to the storage media and configured to execute the instructions to:
access a first image and a second image, wherein at least part of the first image overlaps with at least part of the second image;
divide the first image and the second image into portions each being based on a plurality of sets of grid points comprising at least a first set of grid points and a second set of grid points, wherein each grid point corresponds to a portion of the first image or the second image, wherein each grid point is associated with a local window, and wherein a size of the local window for each grid point in the first set is larger than a size of the local window for each grid point in the second set;
determine differences in a region of overlap between the first image and the second image, wherein the differences are determined based on normalized gradients of the region of overlap; and
move, based on the determined differences, one or more grid points in at least the first or second set of grid points and the corresponding portions of the first image or the second image relative to one or more other grid points in the first or second set of grid points, wherein the one or more grid points in the second set of grid points and the corresponding portions of the first image or the second image are moved relative to the one or more other grid points in the second set of grid points in response to at least one difference being greater than a predetermined threshold.

24. The apparatus of claim 23, wherein the one or more processors are further configured to:
after the grid points in the first set of the plurality of sets of grid points and the corresponding portions of the first image or the second image are moved, determine the differences in the region of overlap between the first image and the second image;
determine whether the at least one difference in the region of overlap between the first image and the second image is greater than the predetermined threshold;
in response to a determination that the at least one difference in the region of overlap is greater than the predetermined threshold, add the second set of grid points from the plurality of sets of grid points to each of the first image and the second image; and
move, based on the at least one difference in the region of overlap, the one or more grid points in the first or second set and the corresponding portions of the first image or the second image relative to the one or more other grid points in the first or second set.

25. The apparatus of claim 24, wherein the one or more processors are further configured to:
in response to a determination that the at least one difference in the region of overlap is less than the predetermined threshold, then combine the first image and the second image into a merged image.

* * * * *